US010270518B2

(12) United States Patent
Sfar et al.

(10) Patent No.: US 10,270,518 B2
(45) Date of Patent: Apr. 23, 2019

(54) METHOD AND APPARATUS FOR COOPERATIVE WIRELESS COMMUNICATIONS

(71) Applicant: InterDigital Technology Corporation, Wilmington, DE (US)

(72) Inventors: Sana Sfar, Redmond, WA (US); Alexander Reznik, Pennington, NJ (US); Prabhakar Chitrapu, Blue Bell, PA (US); Zinan Lin, Basking Ridge, NJ (US); Mohammed Sammour, Alrabieh-Amman (JO); Ana Lucia A. Pinheiro, Beaverton, OR (US); Mihaela Beluri, Jericho, NY (US); Chunxuan Ye, San Diego, CA (US); Yogendra Shah, Exton, PA (US); Gregg A. Charlton, Collegeville, PA (US); Guodong Zhang, Syosset, NY (US); Khushali N. Manseta, San Diego, CA (US); Ruiyuan Hu, San Diego, CA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 15/381,721

(22) Filed: Dec. 16, 2016

(65) Prior Publication Data

US 2017/0149490 A1 May 25, 2017

Related U.S. Application Data

(63) Continuation of application No. 15/001,386, filed on Jan. 20, 2016, now Pat. No. 9,537,560, which is a
(Continued)

(51) Int. Cl.
*H04B 7/14* (2006.01)
*H04B 7/155* (2006.01)
(Continued)

(52) U.S. Cl.
CPC ......... *H04B 7/15592* (2013.01); *H04B 7/026* (2013.01); *H04B 7/0632* (2013.01);
(Continued)

(58) Field of Classification Search
CPC .................................................... H04B 7/026
See application file for complete search history.

(56) References Cited

U.S. PATENT DOCUMENTS

| 5,907,794 A | 5/1999 | Lehmusto et al. |
| 5,915,212 A | 6/1999 | Przelomiec et al. |

(Continued)

FOREIGN PATENT DOCUMENTS

| CN | 1996786 A | 7/2007 |
| EP | 1 947 782 | 7/2008 |

(Continued)

OTHER PUBLICATIONS 802.11 Working Group of the IEEE 802 Committee, Draft Standard for Information Technology—Telecommunications and information exchange between systems—Local and metropolitan area networks—Specific requirements—Part 11: Wireless LAN Medium Access Control (MAC) and Physical Layer (PHY) specifications, Amendment <number>: Mesh Networking, IEEE P802.11sD1.06 (Jul. 2007).

(Continued)

*Primary Examiner* — John Blanton
(74) *Attorney, Agent, or Firm* — Volpe and Koenig, P.C.

(57) ABSTRACT

Methods and wireless devices are described. A method includes a wireless device transmitting to wireless transmit/receive units (WTRUs) by being scheduled by the base
(Continued)

station or using a pool of radio resources, which is for any of a plurality of wireless devices to use for transmission to WTRUs. On a condition that the wireless device is to be scheduled by the base station, the wireless device receives scheduling information for transmission to a WTRU having a group radio network terminal identifier (RNTI) and transmits to the WTRU in response to the received scheduling information. The scheduling information for transmission to the base station uses a different RNTI. On a condition that the wireless device is to use the pool of radio resources for transmission to a WTRU, the wireless device transmits to the WTRU without being scheduled by the base station using the pool of radio resources.

12 Claims, 43 Drawing Sheets

Related U.S. Application Data continuation of application No. 14/540,653, filed on Nov. 13, 2014, now Pat. No. 9,276,661, which is a continuation of application No. 12/347,689, filed on Dec. 31, 2008, now Pat. No. 8,917,649.

(60) Provisional application No. 61/018,571, filed on Jan. 2, 2008, provisional application No. 61/018,630, filed on Jan. 2, 2008, provisional application No. 61/043,295, filed on Apr. 8, 2008, provisional application No. 61/046,768, filed on Apr. 21, 2008, provisional application No. 61/098,678, filed on Sep. 19, 2008.

(51) Int. Cl.
| | | |
|---|---|---|
| *H04L 5/00* | (2006.01) | |
| *H04J 11/00* | (2006.01) | |
| *H04B 7/026* | (2017.01) | |
| *H04B 7/26* | (2006.01) | |
| *H04B 7/08* | (2006.01) | |
| *H04W 72/14* | (2009.01) | |
| *H04B 7/06* | (2006.01) | |
| *H04L 29/08* | (2006.01) | |
| *H04W 28/02* | (2009.01) | |
| *H04W 4/00* | (2018.01) | |
| *H04W 16/26* | (2009.01) | |
| *H04W 84/04* | (2009.01) | |

(52) U.S. Cl.
CPC ............ *H04B 7/086* (2013.01); *H04B 7/2606* (2013.01); *H04J 11/0053* (2013.01); *H04L 5/0007* (2013.01); *H04L 5/0035* (2013.01); *H04L 67/303* (2013.01); *H04W 28/0278* (2013.01); *H04W 72/14* (2013.01); *H04W 4/006* (2013.01); *H04W 16/26* (2013.01); *H04W 84/047* (2013.01)

(56) References Cited

U.S. PATENT DOCUMENTS

| | | | |
|---|---|---|---|
| 6,725,039 | B1 | 4/2004 | Parmar et al. |
| 7,149,536 | B2 | 12/2006 | Lee |
| 7,359,352 | B2 | 4/2008 | Kim et al. |
| 7,894,383 | B2 | 2/2011 | Ikeda et al. |
| 7,929,994 | B2 | 4/2011 | Kishigami et al. |
| 8,073,446 | B2 | 12/2011 | Ishii et al. |
| 8,274,923 | B2 | 9/2012 | Shen et al. |
| 2003/0135811 | A1 | 7/2003 | Xu et al. |
| 2004/0160943 | A1 | 8/2004 | Cain |
| 2004/0192204 | A1* | 9/2004 | Periyalwar ............ H04W 52/46 455/25 |
| 2004/0219917 | A1 | 11/2004 | Love et al. |
| 2005/0043943 | A1 | 2/2005 | Wang et al. |
| 2005/0053035 | A1 | 3/2005 | Kwak et al. |
| 2005/0111410 | A1 | 5/2005 | Bazar |
| 2005/0143130 | A1 | 6/2005 | Horneman |
| 2006/0215613 | A1 | 9/2006 | Kikuchi |
| 2006/0215689 | A1 | 9/2006 | Liu et al. |
| 2007/0015462 | A1 | 1/2007 | Dean et al. |
| 2007/0097927 | A1 | 5/2007 | Gorokhov et al. |
| 2007/0165581 | A1 | 7/2007 | Mehta et al. |
| 2007/0217432 | A1 | 9/2007 | Molisch et al. |
| 2007/0270112 | A1 | 11/2007 | Sivanesan et al. |
| 2008/0002608 | A1 | 1/2008 | Zheng et al. |
| 2008/0025280 | A1 | 1/2008 | Hsu et al. |
| 2008/0025323 | A1 | 1/2008 | Khan |
| 2008/0032725 | A1 | 2/2008 | Usuda et al. |
| 2008/0113616 | A1 | 5/2008 | Kim et al. |
| 2008/0120445 | A1* | 5/2008 | Jang ........................ H04L 47/10 710/52 |
| 2008/0137581 | A1 | 6/2008 | Doppler et al. |
| 2008/0137585 | A1 | 6/2008 | Loyola et al. |
| 2008/0144562 | A1 | 6/2008 | Draper et al. |
| 2008/0144626 | A1 | 6/2008 | Bertinelli et al. |
| 2008/0146166 | A1 | 6/2008 | Khan et al. |
| 2008/0186950 | A1* | 8/2008 | Zhu ........................ H04B 7/2606 370/350 |
| 2008/0240014 | A1 | 10/2008 | Chang et al. |
| 2008/0248793 | A1 | 10/2008 | Chang et al. |
| 2009/0003371 | A1* | 1/2009 | Cheng ................. H04L 12/5693 370/412 |
| 2009/0201885 | A1 | 8/2009 | Kuroda et al. |
| 2009/0233544 | A1 | 9/2009 | Oyman et al. |
| 2009/0252079 | A1* | 10/2009 | Zhang .................... H04B 7/155 370/315 |
| 2009/0254790 | A1 | 10/2009 | Pi et al. |
| 2009/0262678 | A1 | 10/2009 | Oyman et al. |
| 2010/0046413 | A1* | 2/2010 | Jin ........................ H04W 72/042 370/315 |
| 2010/0275086 | A1 | 10/2010 | Bergquist et al. |

FOREIGN PATENT DOCUMENTS

| | | |
|---|---|---|
| JP | 2004129085 A2 | 4/2004 |
| KR | 2007-0034408 | 3/2007 |
| WO | 02/37771 | 5/2002 |
| WO | 03/003672 | 1/2003 |
| WO | 03/103232 | 12/2003 |
| WO | 2005/064872 A1 | 7/2005 |
| WO | 07/032823 | 3/2007 |
| WO | 07/053950 | 5/2007 |
| WO | 07/053954 | 5/2007 |
| WO | 2007/064249 A1 | 6/2007 |
| WO | 07/108299 | 9/2007 |
| WO | 07/109679 A2 | 9/2007 |
| WO | 07/131347 | 11/2007 |
| WO | 09/088937 | 7/2009 |

OTHER PUBLICATIONS

Castura et al., "Rateless Coding for Wireless Relay Channels," International Symposium on Information Theory, pp. 810-814 (Sep. 2005).

Cover et al., "Capacity Theorems for the Relay Channel," IEEE Transactions on Information Theory, vol. IT-25, No. 5 (Sep. 1979).

Erez et al., "Rateless Coding for Gaussian Channels," Submitted to IEEE Transactions on Information Theory (Aug. 2007).

Fitzek et al., "Cooperation in Wireless Networks: Principles and Applications. Real Egoistic Behavior is to Cooperate!," Springer (2006).

Florea et al., "On the Optimal Number of Hops in Infrastructure-Based Fixed Relay Networks," IEEE Globecomm, vol. 6, pp. 3342-3247 (Dec. 2005).

Hamiti, "The Draft IEEE 802.16m System Description Document," IEEE 802.16 Broadband Wireless Access Working Group, IEEE 802.16m-08/003r3 (Jun. 16, 2008).

(56) References Cited

OTHER PUBLICATIONS

Holma et al., "HSDPA/HSUPA for UMTS: High Speed Radio Access for Mobile Communications," John Wiley & Sons, Ltd., ISBN: 0-470-01884-4 (2006).
Hu et al., "Protocols and System Capacity of Relay-Enhanced HSDPA Systems," 42nd Annual Conference on Information Sciences and Systems, pp. 179-184 (Mar. 19-21, 2008).
IEEE Computer Society and the IEEE Microwave Theory and Techniques Society, "IEEE Standard for Local and Metropolitan Area Networks Part 16: Air Interface for Broadband Wireless Access Systems", IEEE Std 802.16j—2009, (Jun. 12, 2009).
IEEE Computer Society and the IEEE Microwave Theory and Techniques Society, "IEEE Standard for Local and Metropolitan Area Networks Part 16: Air Interface for Fixed Broadband Wirless Access Systems", IEEE Std 802.16j/D5—2008, (May 30, 2008).
IEEE Computer Society and the IEEE Microwave Theory and Techniques Society, "IEEE Standard for Local and Metropolitan Area Networks Part 16: Air Interface for Fixed Broadband Wireless Access Systems", IEEE Std 802.16m—2008, (Jun. 16, 2008).
Katz et al., "Transmitting to Colocated Users in Wireless Ad Hoc and Sensor Networks," IEEE Transactions on Information Theory, vol. 51, No. 10, pp. 3540-3563 (Oct. 2005).
Kramer et al., "Cooperative Strategies and Capacity Theorems for Relay Networks," IEEE Transactions on Information Theory, vol. 51, No. 9, pp. 3037-3063 (Sep. 2005).
LAN/Man Standards Committee of the IEEE Computer Society and the IEEE Microwave Theory and Techniques Society, "DRAFT Amendment to the IEEE Standard for Local and Metropolitan Area Networks Part 16: Air Interface for Fixed and Mobile Broadband Wireless Access Systems", 802.16m-09/0010r1 (Mar. 2008).
LAN/Man Standards Committee of the IEEE Computer Society and the IEEE Microwave Theory and Techniques Society, "Draft Amendment to the IEEE Standard for Local and Metropolitan Area Networks Part 16: Air Interface for Fixed and Mobile Broadband Wireless Access Systems; Multihop Relay Specification", IEEE P802.16j/D5 (May 30, 2008).
Laneman et al., "Cooperative Diversity in Wireless Networks: Efficient Protocols and Outage Behavior,"Transactions on Information Theory, vol. 50, pp. 3062-3080 (Dec. 2004).
Laneman et al., "Distributed Space-Time-Coded Protocols for Exploiting Cooperative Diversity in Wireless Networks," IEEE Transactions on Information Theory, vol. 49, No. 10 (Oct. 2003).
Laneman, "Cooperative Diversity in Wireless Networks: Algorithms and Architectures," PhD Thesis, Massachusetts Institute of Technology, Cambridge, MA (2002).
Lin et al., "Cooperative Regions and Partner Choice in Coded Cooperative Systems," IEEE Transactions on Communications, vol. 54, No. 7 (Jul. 2006).
Lin et al., "Multihop Cellular: A New Architecture for Wireless Communications," IEEE Infocomm, pp. 1273-1282 (2000).
Liu et al., "Cooperative Wireless Communications: A Cross-Layer Approach," IEEE Wireless Communications, vol. 13, No. 4, pp. 84-92 (Aug. 2006).
Luby, "LT Codes," Proceedings of the 43rd Annual IEEE Symposium on Foundations of Computer Science (2002).
Molisch et al., "WLC41-6: Cooperative Relay Networking Using Fountain Codes," Proceedings of Global Telecommunications Conference, pp. 1-6 (Nov. 27-Dec. 1, 2006).
Nokia, "Minutes of Ad Hoc on Further Improved Performance Requirements for UMTS/HSDPA UE (FDD),"TSG RAN WG4 meeting # 38, R4-060364, Denver, Colorado, USA (Feb. 13-17, 2006).
NTT Docomo et al., "Throughput Evaluations Using MIMO Multiplexing in Evolved UTRA Downlink," 3GPP TSG RAN WG1 Ad Hoc on LTE, R1-050617, Sophia Antipolis, France (Jun. 20-21, 2005).
NTT Docomo, "Text proposal for RAN1 TR on LTE-Advanced ," 3GPP TSG RAN WG1 Meeting #54, R1-083410, Jeju, Korea (Aug. 18-22, 2008).

Ochiai et al., "Collaborative Beamforming for Distributed Wireless Ad Hoc Sensor Networks," IEEE Transactions on Signal Processing, vol. 53, Issue 11, pp. 4110-4124 (Nov. 2005).
Pabst et al., "Relay-based deployment concepts for wireless and mobile broadband radio," IEEE Communications Magazine, vol. 42, Issue 9 (Sep. 2004).
Philips, "Comparison between MU-MIMO codebook-based channel reporting techniques for LTE downlink," 3GPP TSG RAN WG1 Meeting #46bis, R1-062483, Seoul, South Korea (Oct. 9-13, 2006).
Sendonaris et al., "User Cooperation Diversity—Part I: System Description," IEEE Transactions on Communications, vol. 51, No. 11 (Nov. 2003).
Sendonaris et al., "User Cooperation Diversity—Part II: Implementation Aspects and Performance Analysis," IEEE Transactions on Communications, vol. 51, No. 11 (Nov. 2003).
Sfar et al., "Relays for Improved Cellular Coverage," submitted to Globecomm (2008).
Shokrollahi, "Raptor Codes," International Symposium on Information Theory (Jun. 2004).
Soldani et al., "Wireless relays for broadband access [radio communications series]," IEEE Communications Magazine, vol. 45, No. 3, pp. 58-66 (Mar. 2008).
Tafazolli, "Technologies for the Wiresless Future: Wireless World Reseach Forum (WWRF)," John Wiley & Sons, Ltd. (2006).
Third Generation Partnership Project, "Technical Specification Group Radio Access Network; Requirements for support of radio resource management (FDD) (Release 1999)," 3GPP TS 25.133 V3.22.0 (Sep. 2005).
Third Generation Partnership Project, "Technical Specification Group Radio Access Network; Requirements for support of radio resource management (FDD) (Release 4)," 3GPP TS 25.133 V4.17.0 (Mar. 2006).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.20 (Sep. 2007).
Third Generation Partnership Project, "Technical Specification Group Radio Access Network; Physical layer procedures (FDD) (Release 1999)," 3GPP TS 25.214 V3.120 (Mar. 2003).
Third Generation Partnership Project, "Technical Specification Group Radio Access Network; Physical layer procedures (FDD) (Release 4)," 3GPP TS 25.214 V4.6.0 (Mar. 2003).
Third Generation Partnership Project, "Technical Specification Group Radio Access Network; Physical layer procedures (FDD) (Release 5)," 3GPP TS 25.214 V5.11.0 (Jun. 2005).
Third Generation Partnership Project, "Technical Specification Group Radio Access Network; Physical layer procedures (FDD) (Release 6)," 3GPP TS 25.214 V6.11.0 (Dec. 2006).
Third Generation Partnership Project, "Technical Specification Group Radio Access Network; Requirements for support of radio resource management (FDD) (Release 5)," 3GPP TS 25.133 V5.18.0 (Sep. 2007).
Third Generation Partnership Project, "Technical Specification Group Radio Access Network; Opportunity Driven Multiple Access (3G TR 25.924 version 1.0.0)," 3G TR 25.924 V1.0.0 (Dec. 1999).
Third Generation Partnership Project, "Technical Specification Group Radio Access Network; Requirements for support of radio resource management (FDD) (Release 8)," 3GPP TS 25.133 V8.1.0 (Dec. 2007).
Third Generation Partnership Project, "Technical Specification Group Radio Access Network; Requirements for support of radio resource management (FDD) (Release 6)," 3GPP TS 25.133 V6.23.0 (Sep. 2008).
Third Generation Partnership Project, "Technical Specification Group Radio Access Network; Requirements for support of radio resource management (FDD) (Release 7)," 3GPP TS 25.133 V7.10.0 (Dec. 2007).
Third Generation Partnership Project, "Technical Specification Group Radio Access Network; User Equipment (UE) radio transmission and reception (FDD) (Release 7)," 3GPP TS 25.101 V7.8.0 (Jun. 2007).

(56) References Cited

OTHER PUBLICATIONS

Third Generation Partnership Project, "Technical Specification Group Radio Access Network; Requirements for support of radio resource management (FDD) (Release 6)," 3GPP TS 25.133 V6.20.0 (Dec. 2007).
Third Generation Partnership Project, "Technical Specification Group Radio Access Network; Requirements for support of radio resource management (FDD) (Release 7)," 3GPP TS 25.133 V7.13.0 (Sep. 2008).
Third Generation Partnership Project, "Technical Specification Group Radio Access Network; Requirements for support of radio resource management (FDD) (Release 8)," 3GPP TS 25.133 V8.5.0 (Dec. 2008).
Third Generation Partnership Project, "Technical Specification Group Radio Access Network; Physical layer procedures (FDD) (Release 7)," 3GPP TS 25.214 V7.7.0 (Nov. 2007).
Third Generation Partnership Project, "Technical Specification Group Radio Access Network; Physical layer procedures (FDD) (Release 7)," 3GPP TS 25.214 V7.10.0 (Dec. 2008).
Third Generation Partnership Project, "Technical Specification Group Radio Access Network; Physical layer procedures (FDD) (Release 8)," 3GPP TS 25.214 V8.0.0 (Nov. 2007).
Third Generation Partnership Project, "Technical Specification Group Radio Access Network; Physical layer procedures (FDD) (Release 8)," 3GPP TS 25.214 V8.4.0 (Dec. 2008).
Third Generation Partnership Project, "Technical Specification Group Radio Access Networks; User Equipment (UE) radio transmission and reception (FDD) (Release 1999)," 3GPP TS 25.101 V3.19.0 (Dec. 2006).
Third Generation Partnership Project, "Technical Specification Group Radio Access Networks; User Equipment (UE) radio transmission and reception (FDD) (Release 4)," 3GPP TS 25.101 V4.13.0 (Dec. 2006).
Third Generation Partnership Project, "Technical Specification Group Radio Access Network; User Equipment (UE) radio transmission and reception (FDD) (Release 5)," 3GPP TS 25.101 V5.20.0 (Dec. 2006).
Third Generation Partnership Project, "Technical Specification Group Radio Access Network; User Equipment (UE) radio transmission and reception (FDD) (Release 8)," 3GPP TS 25.101 V8.10 (Dec. 2007).
Third Generation Partnership Project, "Technical Specification Group Radio Access Network; User Equipment (UE) radio transmission and reception (FDD) (Release 8)," 3GPP TS 25.101 V8.4.0 (Sep. 2008).
Third Generation Partnership Project, "Technical Specification Group Radio Access Network; User Equipment (UE) radio transmission and reception (FDD) (Release 7)," 3GPP TS 25.101 V7.14.0 (Dec. 2008).
Third Generation Partnership Project, "Technical Specification Group Radio Access Network; User Equipment (UE) radio transmission and reception (FDD) (Release 6)," 3GPP TS 25.101 V6.15.0 (Sep. 2007).
Third Generation Partnership Project, "Technical Specification Group Radio Access Network; User Equipment (UE) radio transmission and reception (FDD) (Release 7)," 3GPP TS 25.101 V7.10.0 (Dec. 2007).
Third Generation Partnership Project, "Technical Specification Group Radio Access Network; User Equipment (UE) radio transmission and reception (FDD) (Release 6)," 3GPP TS 25.101 V6.18.0 (Sep. 2008).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.6.0 (Sep. 2008).
Third Generation Partnership Project, "Technical Specification Group Radio Access Network; Evolved Universal Terrestrial Radio Access (E-UTRA); Physical layer procedures (Release 8)," 3GPP TS 36.213 V8.1.0 (Nov. 2007).
Third Generation Partnership Project, "Technical Specification Group Radio Access Network; Evolved Universal Terrestrial Radio Access (E-UTRA); Physical layer procedures (Release 8)," 3GPP TS 36.213 V8.50 (Dec. 2008).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.1.0 (Nov. 2007).
Third Generation Partnership Project, "Technical Specification Group Radio Access Network; Evolved Universal Terrestrial Radio Access (E-UTRA); Multiplexing and channel ceding (Release 8)," 3GPP TS 36.212 V8.5.0 (Dec. 2008).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.1.0 (Nov. 2007).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.5.0 (Dec. 2008).
Third Generation Partnership Project, "Technical Specification Group Radio Access Network; Evolved Universal Terrestrial Radio Access (E-UTRA); User Equipment (UE) radio transmission and reception (Release 8)," 3GPP TS 36.101 V8.0.0 (Dec. 2007).
Third Generation Partnership Project, "Technical Specification Group Radio Access Network; Evolved Universal Terrestrial Radio Access (E-UTRA; User Equipment (UE) radio transmission and reception (Release 8)," 3GPP TS 36.101 V8.4.0 (Dec. 2008).
Valentin et al., "Cooperative wireless networking beyond store-and-forward: Perspectives for PHY and MAC design," WWRF WGB Whitepaper (2006).
Yoo et al., "On the Optimality of Multiantenna Broadcast Scheduling Using Zero-Forcing Beamforming," IEEE Journal on Selected Areas in Communications, vol. 24, No. 3 (Mar. 2006).

* cited by examiner

METHOD AND APPARATUS FOR COOPERATIVE WIRELESS COMMUNICATIONS

CROSS REFERENCE TO RELATED APPLICATIONS

This application is a continuation of U.S. patent application Ser. No. 15/001,386, filed Jan. 20, 2016, which is a continuation of U.S. patent application Ser. No. 14/540,653, filed Nov. 13, 2014, which issued as U.S. Pat. No. 9,276,661 on Mar. 1, 2016, which is a continuation of U.S. patent application Ser. No. 12/347,689, filed Dec. 31, 2008, which issued as U.S. Pat. No. 8,917,649 on Dec. 23, 2014, which claims the benefit of U.S. Provisional Application Nos. 61/018,571 filed on Jan. 2, 2008, 61/018,630 filed on Jan. 2, 2008, 61/043,295 filed on Apr. 8, 2008, 61/046,768 filed on Apr. 21, 2008, and 61/098,678 filed on Sep. 19, 2008, which are incorporated by reference as if fully set forth.

TECHNOLOGY FIELD

The present disclosure is related to wireless communications.

BACKGROUND

Cooperative communication enables wireless transmit/receive units (WTRUs) to assist each other in transmission of information to their desired destination. Such an approach enables mitigation of several issues facing modern wireless communication systems without the cost associated with extensive wired infrastructure. Using cooperation, it is also possible to exploit the spatial diversity associated with traditional multiple-input multiple-output (MIMO) techniques without requiring each node to have multiple antennas. Finally, regenerative relaying, a basic cooperative technique, may reduce the effects of path loss and shadowing on coverage and throughput.

A challenge in incorporating cooperation into modern wireless systems is the need to evolve the system architecture to enable cooperation. Effective cooperative techniques, especially in wireless systems, usually involve advanced algorithms at the lower layers of the communications stack, for example layer 1 (physical layer, or PHY) and layer 2/3 (medium access control (MAC), radio link control (RLC), or logical link control (LLC)—depending on the system). However, such algorithms require advanced techniques in receiver design, error-correction lisecode design, automatic repeat request (ARQ) and hybrid automatic repeat request (HARQ) processes and scheduling in multi-user systems.

There is therefore a need to consider the impact of cooperation on cellular systems, including system-architecture aspects. The downlink and uplink, separately and in each case, consider several cooperation schemes which result in different architectures. In each case, the impact on the system operation is considered, with emphasis on ARQ/HARQ and scheduling and solutions are proposed.

With the evolution of users' needs for various high quality and data rate services and applications, the capacities of wireless communication links are being exhausted. Single antenna systems are now being found to be unable to address these needs, and operators are now moving to multiple antennas systems. Despite their unprecedented achievable data rates, multiple antenna systems do not provide significant gain at far range or low signal-to-noise ratio (SNR) applications.

Relayed communication seems to address such an issue and is now the focus of many research activities. Unlike conventional point-to-point communication techniques, relaying introduces a third entity called a "relay" that assists in the communication between the source and the destination.

When assisting the source, the relay and the source agree to various protocols to deliver the intended message to its destination, for example hopping and diversity protocols. With hopping, the message is sent by the source, received by the relay and then retransmitted to the destination. With diversity protocols, the relay and the source simultaneously transmit to the destination using some diversity schemes.

The versatility introduced by the relay in terms of deployment and providing additional virtual antennas, are the key advantages of relaying systems. For example, multiple antennas are limited in size and cost, and thus are difficult to implement with more than four antennas. However, with relaying, the number of antennas in a link may be increased in a distributed manner, and thus can introduce higher gains in data rates. Also, by adjusting relay locations or by selecting the ones with the appropriate channel conditions, low SNR and far-range links receive a significant boost. Further, cell edge users are generally disfavored due to the high interference they experience. Relaying in this case can be used to increase and redistribute the throughput throughout the cell and enhance the disfavored links.

Notwithstanding these significant advantages of relaying and the extensive theoretical development in cooperative communication, little work has been performed towards introducing the benefits of cooperative communications to practical cellular systems. Some of the reasons for this are lack of efficient cooperation protocols with demonstrated benefits in real world scenarios and expensive implementations. Consequently, there is a need for cooperative communication protocols that are appropriate for cellular communications systems.

Relay communications has shown much promise recently in improving communications on weak communications links. By allowing the relay to transmit the full message to the destination in a multi-hop fashion, extremely remote communicating ends have been provided connectivity. However, multiple-hops result in communication delays that may be unacceptable in certain real-time applications.

A more improved structure for relayed communications is cooperative communications. Unlike multi-hopping, the source and the relay or multiple relays collaborate to provide diversity or multiplexing gains. As an example, the source and the relay could transmit in an Alamouti scheme. Relays are provided the option of decoding the message before helping or simply forwarding it after adapting its power to the channel. These techniques are called decode and forward (DF) and amplify and forward (AF), respectively.

The main disadvantage of these techniques is that delays are introduced by the relays when DF is assumed. One way to avoid this is to use a form of coding that allows the destination to collect data from the beginning of the communications while relays are receiving. By doing so, delays due to the DF protocols are reduced. The destination thus sees a continuous transmission throughout.

In another scheme, fountain codes, a special case of rateless codes optimally built for erasure channels, have been used for broadcast applications. However, there is a need for efficient use of rateless coding for practical relay systems.

Due to the propagation delay between the RS and BS, the frequency offset between the BS and RS local oscillators, as well as the processing delays in the RS, the timing of the RS transmissions to the WTRU may be different from the timing of the BS transmissions to the WTRU. During the cooperation phase, misalignment of the streams received by the WTRU from the BS and RS respectively may cause interference with each other. The inter-stream interference reduces the data rate that can be achieved by the WTRU, thus reducing the potential benefit from cooperation.

It would therefore be desirable to mitigate this problem by synchronizing the BS and the RS DL transmissions. Using synchronized BS and RS DL transmissions would help reduce the interference between the RS and the BS transmissions to the WTRU and enable the use of various diversity schemes (e.g. Alamouti or MIMO schemes) while avoiding complex WTRU receiver design.

Prior art solutions show that adjusting the timing of the uplink (UL) WTRU's transmission may be achieved through a timing adjust (TA) mechanism. While the TA concept is commonly used for the UL, so far it has not been used for the DL which is needed in the context of cooperative networks.

It would also be desirable to improve link performance through an intelligent use of relays. However, simple multi-hop relaying (i.e. one where the relay just forwards the same data that it receives) is not likely to result in significant gains. Instead, more sophisticated cooperative techniques may be employed. Among these are cooperative coding schemes, such as distributed beam-forming and distributed spatial multiplexing techniques. It would therefore be desirable to use a multi-user detector, more precisely a successive interference canceller (SIC), to optimize the performance of joint reception of transmissions from the source and relay. A minimum mean squared error successive interference canceller (MMSE-SIC) receiver is formally a candidate receiver for use in the Third Generation Partnership Project's (3GPP's) Long Term Evolution (LTE) technology for separating between spatial streams emanating from the same transmitter. Thus, it would be desirable to place the source and relay transmissions into separate transmission streams and use a SIC to receive these transmissions. In fact, at least for OFDM MIMO technologies, it may not even require additional receiver structures.

Specifically, the SIC receiver would be able to take advantage of apparent practicability and demonstrate that once such a receiver is introduced into a communication system, much of the advantage of cooperative diversity may be relegated to the MAC layer. Instead of collaborative transmission and coding, a well scheduled combination of direct transmission and simple multi-hop would be desirable to achieve the benefits of cooperative relays and, in some cases, even exceed what can be delivered by a well designed PHY-layer scheme.

SUMMARY

A method and apparatus for wireless communications is disclosed. Channel state information (CSI) for a plurality of network nodes is transmitted. Grant information is received from at least one network node of the plurality of network nodes. The grant information is based on the transmitted CSI and includes an indication of a cooperative scheme. A plurality of beam-formed signals, including data from each of the plurality of network nodes, is received in response to the received grant information. The same data is received from each of the plurality of network nodes.

BRIEF DESCRIPTION OF THE DRAWINGS

A more detailed understanding of the disclosure may be had from the following description of embodiments, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment. When referred to hereafter, the terminology "relay station" may be referred to as a relay or a RS.

Although this disclosure is described in the context of a Third Generation (3G) cellular wireless system, it should not be construed as limited to that system, the 3G system serves only as an example.

Relay Physical Architectures

Figure 2:
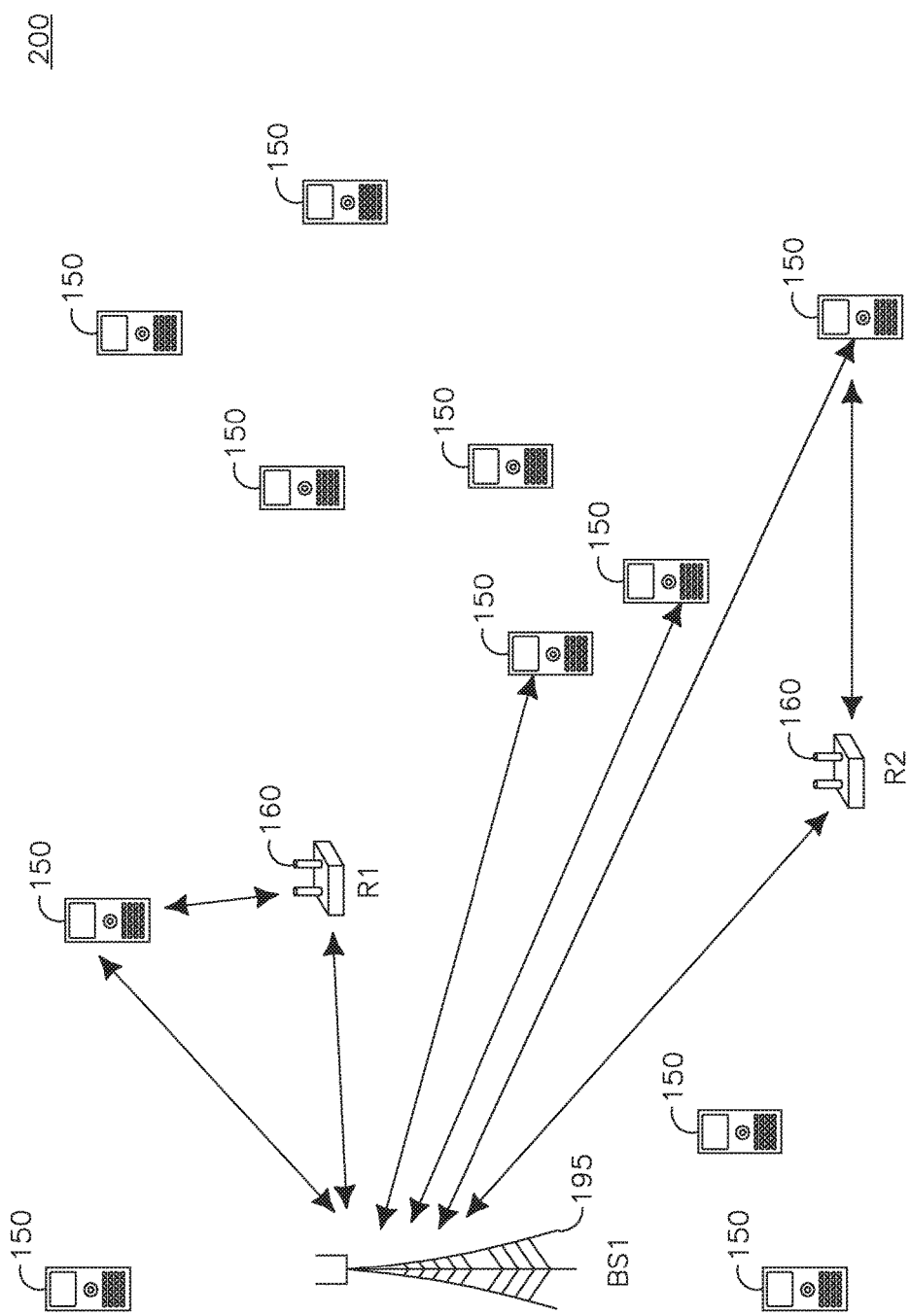
FIG. 2 is a diagram of an example cooperative relay architecture.
Figure 3:
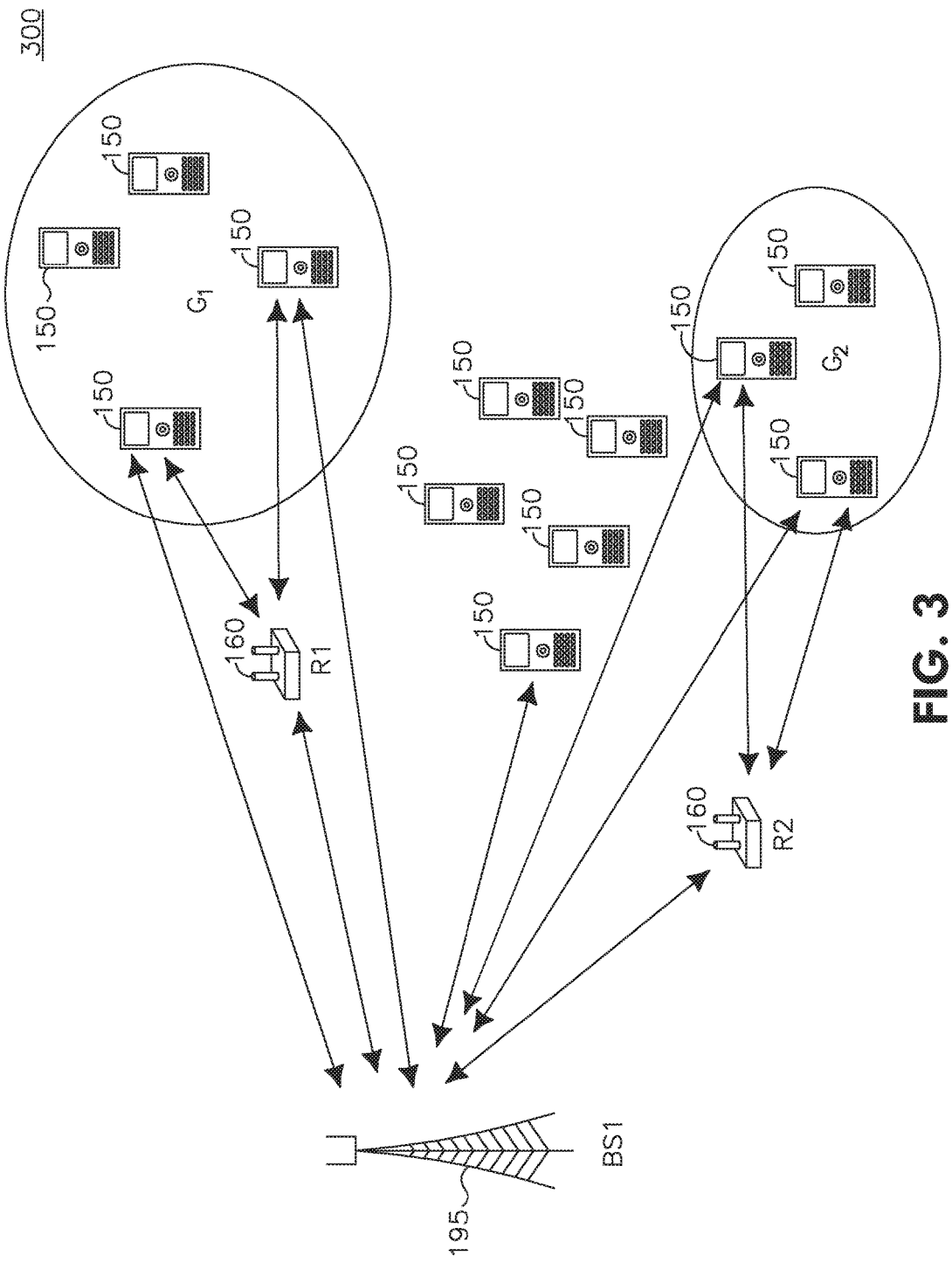
FIG. 3 is a diagram of an example multiple-WTRU-serving-relay Architecture.

Relays may be used in Cellular Systems in a number of ways. In this section, 4 major architectures are described and depicted in FIG. 1. These 4 example architectures may be used alone or in any combination. These example architectures are referred to as Architecture-1: forwarding relay architecture 110; Architecture-2: multiple-WTRU-serving-relay architecture 120 (also shown in more detail in FIG. 3); Architecture-3: cooperative relay architecture 130 (also shown in more detail in FIG. 2); and Architecture-4: multiple-BS-shared-relay architecture 140. Each example architecture includes at least one WTRU 150, at least one relay station (RS) 160, and a base station (BS) 195.

Each WTRU 150 may contain a transmitter 165, a receiver 170, and a processor 175. Each RS 160 may contain a transmitter 180, a receiver 185, and a processor 190.

Various signals may be transmitted and received by the various nodes in each of these architectures and are described in detail below. In fact, several signaling embodiments may exist per each architecture. We shall refer to these embodiments collectively as "relay transmission schemes" or simply as "transmission schemes". The advantages and applications of the above 4 architectures are discussed below.

Figure 4:
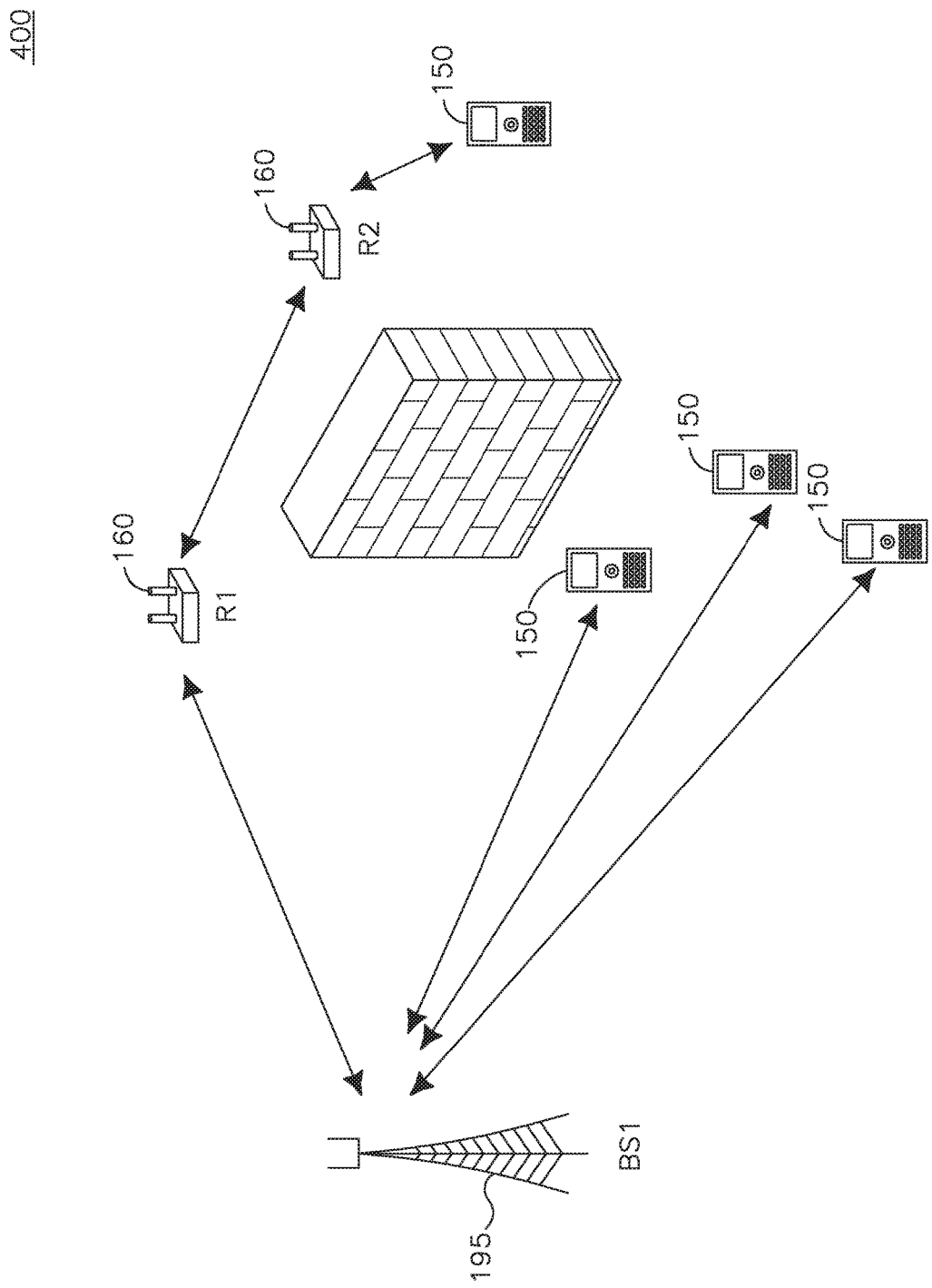
FIG. 4 is a diagram of a variation to the forwarding relay architecture when multiple relays are wirelessly connected in series.

In Architecture-1 110, the WTRU may receive signals only from the RS 160, but not directly from the BS 195. In other words, the WTRU 110 is in a deeply shadowed region of the BS coverage or simply in a BS coverage hole. It is also an architecture useful to serve WTRUs at the edge of a cell, where the inter-cell interference from adjacent cells can be large. In such cases, the forwarding relay 160 receives the DL data from the BS 195 and simply forwards it to the WTRU 150 and vice versa for UL data. A variation to the forwarding relay architecture is one where there are multiple relays connected (wirelessly) in series. This is depicted in FIG. 4.

In Architecture-2 120, the RS 160 serves multiple WTRUs 150, that are located in the coverage region of the RS 160. The advantage of this architecture is that the BS-RS data communication may be pooled together, to reduce overhead. For example, the overhead associated with various packet headers may be reduced by defining a combined header for the pooled packets.

In Architecture-3 130, the WTRU 150 may also be able to receive and process signals directly from the BS 195, although typically weaker than the signals received from the RS 160. Such a configuration has two important implications. First, as the BS 195 is sending DL data to the RS 160, the WTRU 150 may monitor and receive some of the data or all of the data with a certain probability of error. This type of data is often referred to as 'soft' data. This reduces the amount of data to be 'forwarded' by the RS 160 or it increases the probability of successful reception of the data 'forwarded' by the RS 160. Second, the BS 195 and the RS 160 may simultaneously transmit two 'cooperative' signals to the WTRU 150, emulating a multiple antenna scenario. Since the 'multiple antennas' in this case are not collocated, we refer to this as 'distributed MIMO' configuration. The advantages of this Architecture are similar to the benefits of using MIMO.

Architecture-4 140 allows multiple RSs 160 to assist a WTRU 150. This example may also be viewed as a distributed-MIMO configuration, with its consequent improvements in performance.

Combining two or more of the 4 basic architectures in a technically straight-forward manner may yield practical configurations to overcome the problems discussed above.

Figure 1:
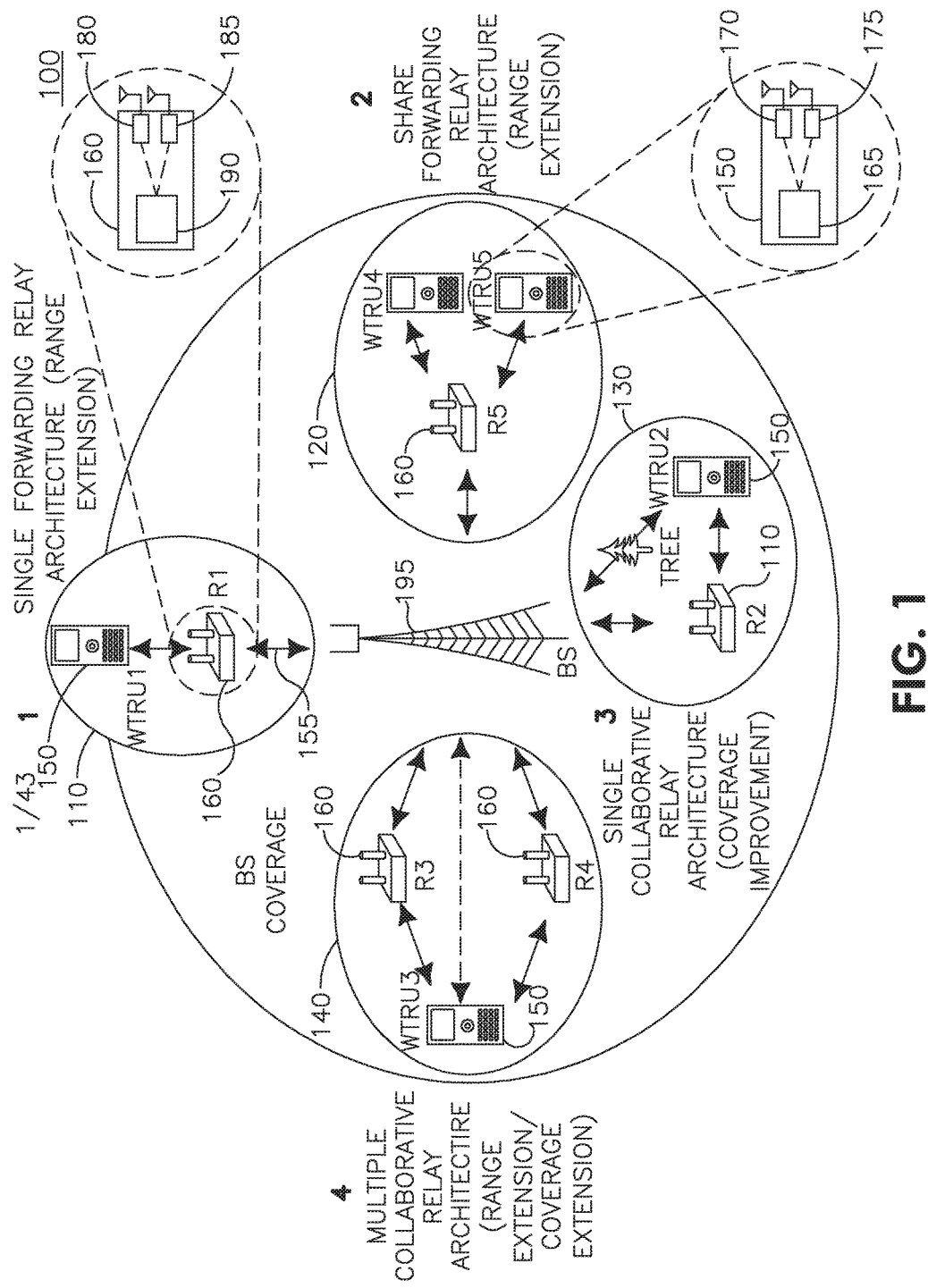
FIG. 1 is a diagram of four relay architectures for use in cellular systems.
Figure 5:
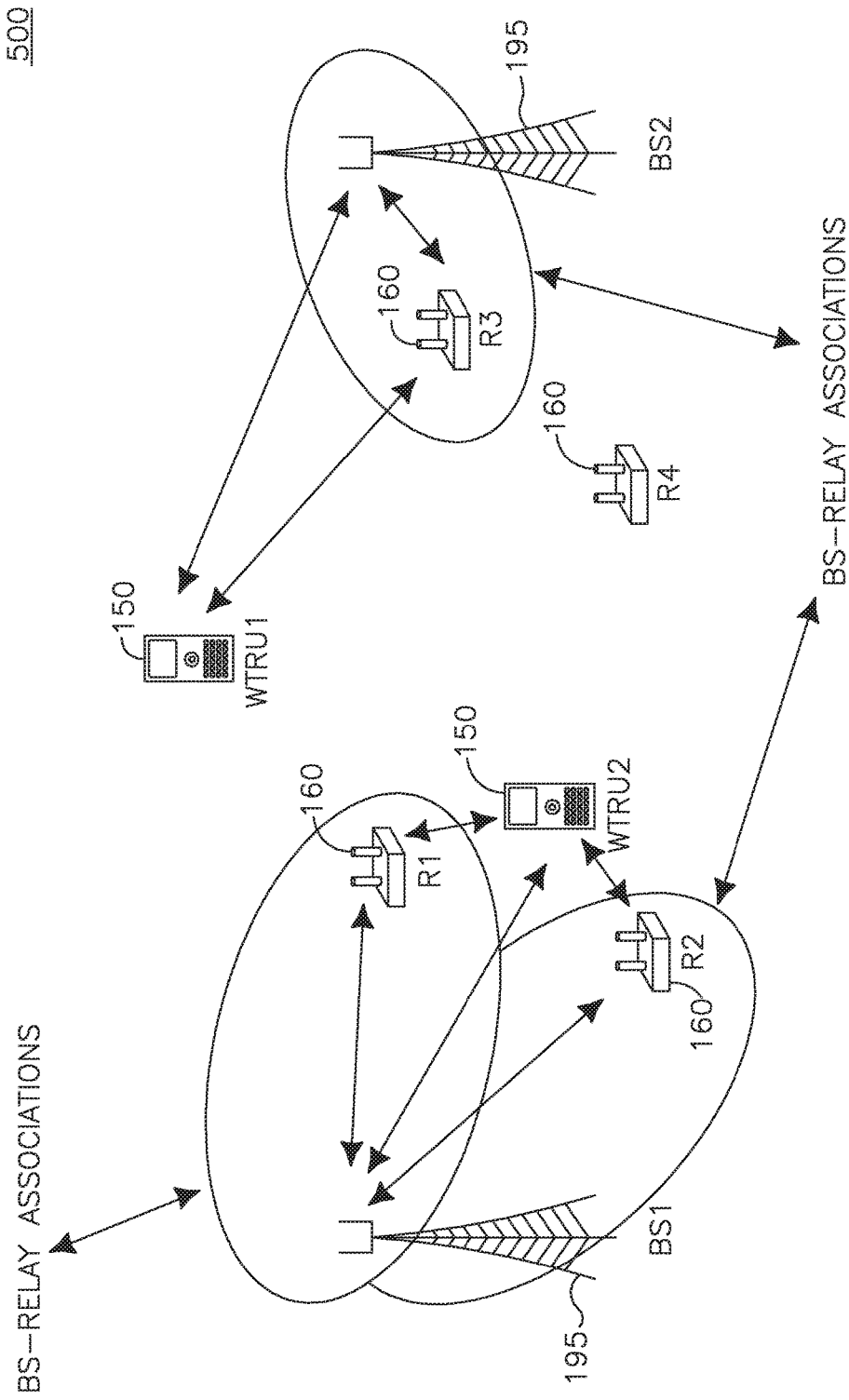
FIG. 5 is a diagram of multiple cells in a system where the association between the RS and the BS may be static or dynamic.
Figure 6:
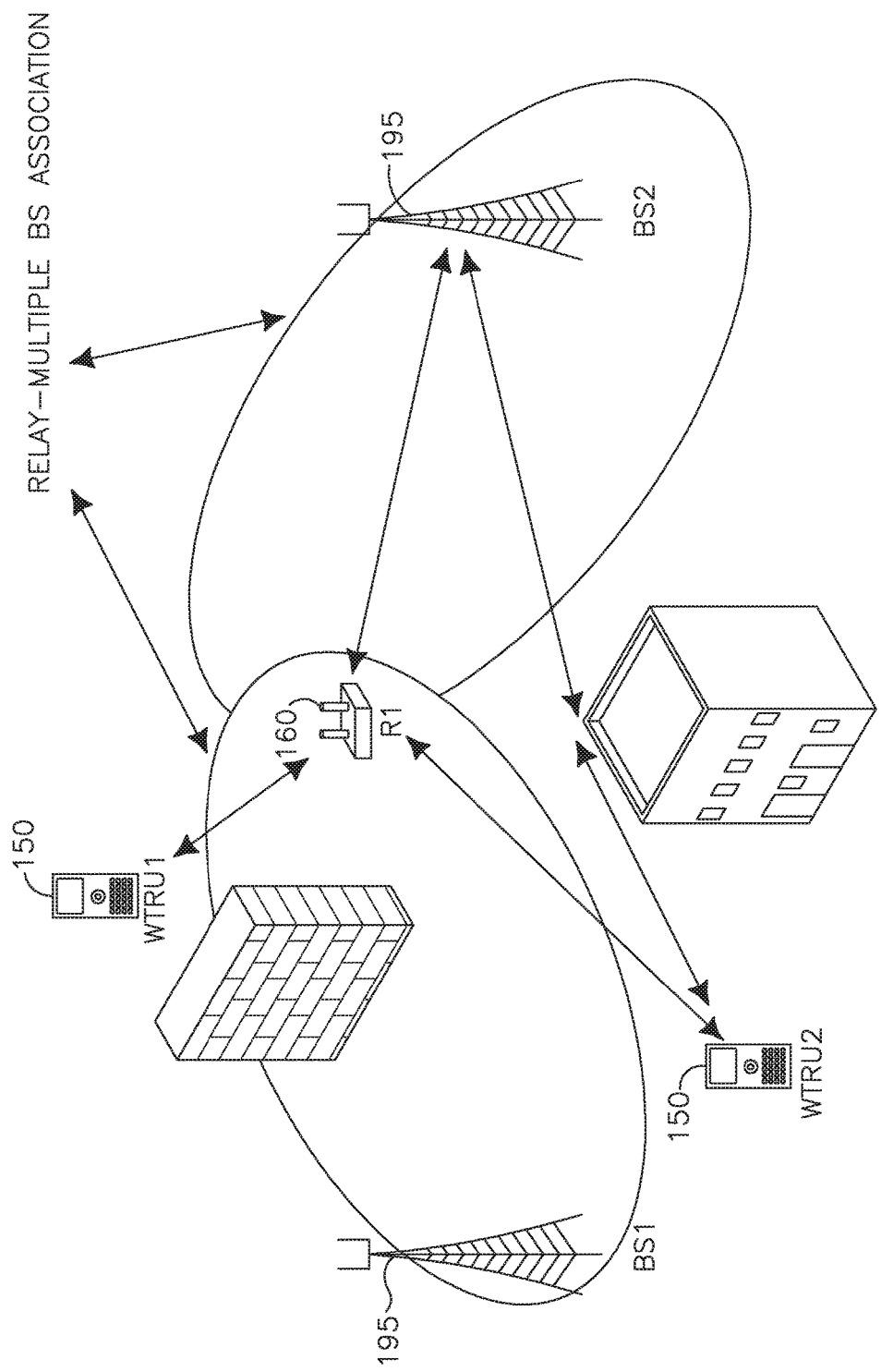
FIG. 6 is a diagram of an example architecture where the RS may be associated with more than one BS.

In each of the architectures in FIG. 1, RSs 160 are shown to be associated with the given cell. When there are multiple cells in a system, this association between the RS 160 and the BS 195 may be static or dynamic, as shown in FIG. 5. In other embodiments, a RS 160 may be associated with more than one BS 195, as shown in FIG. 6. This allows for coordination among multiple cells and the capability to serve a group of WTRUs effectively via a set of shared RSs.

Referring to FIG. 1, when a single BS-RS Channel 155 is serving a Single WTRU 150, a technical issue that needs to be solved is how the WTRUs 150 are informed about the RSs 160. For example, this may be done by the BS 195 broadcasting information about the RSs 160. Alternately, the RSs 160 may broadcast their presence. Another technical issue is how a WTRU 150 selects a RS 160 and how it associates itself to the selected RS 160. An added complexity is that this association information should also be sent to the BS 195.

Regarding synchronization, the delay incurred in the relay adds to the bulk transmission delay between the BS 195 and the WTRU 150. In turn, the round trip time (RTT) is also affected, which may affect the performance of certain protocols, such as TCP and ARQ. As a consequence, the buffer requirements at the BS 195 and the WTRU 150 may also increase.

A minimum amount of signaling information must be exchanged between the WTRU-relay, BS-relay and WTRU-relay-BS. It must therefore be determined what these signaling needs are and how they are communicated. For example, the power control messages and timing advance messages need only go between the WTRU 150 and the RS 160, and need not be transmitted to the BS 195.

Relay Transmission Schemes (RTSs)

Figure 7:
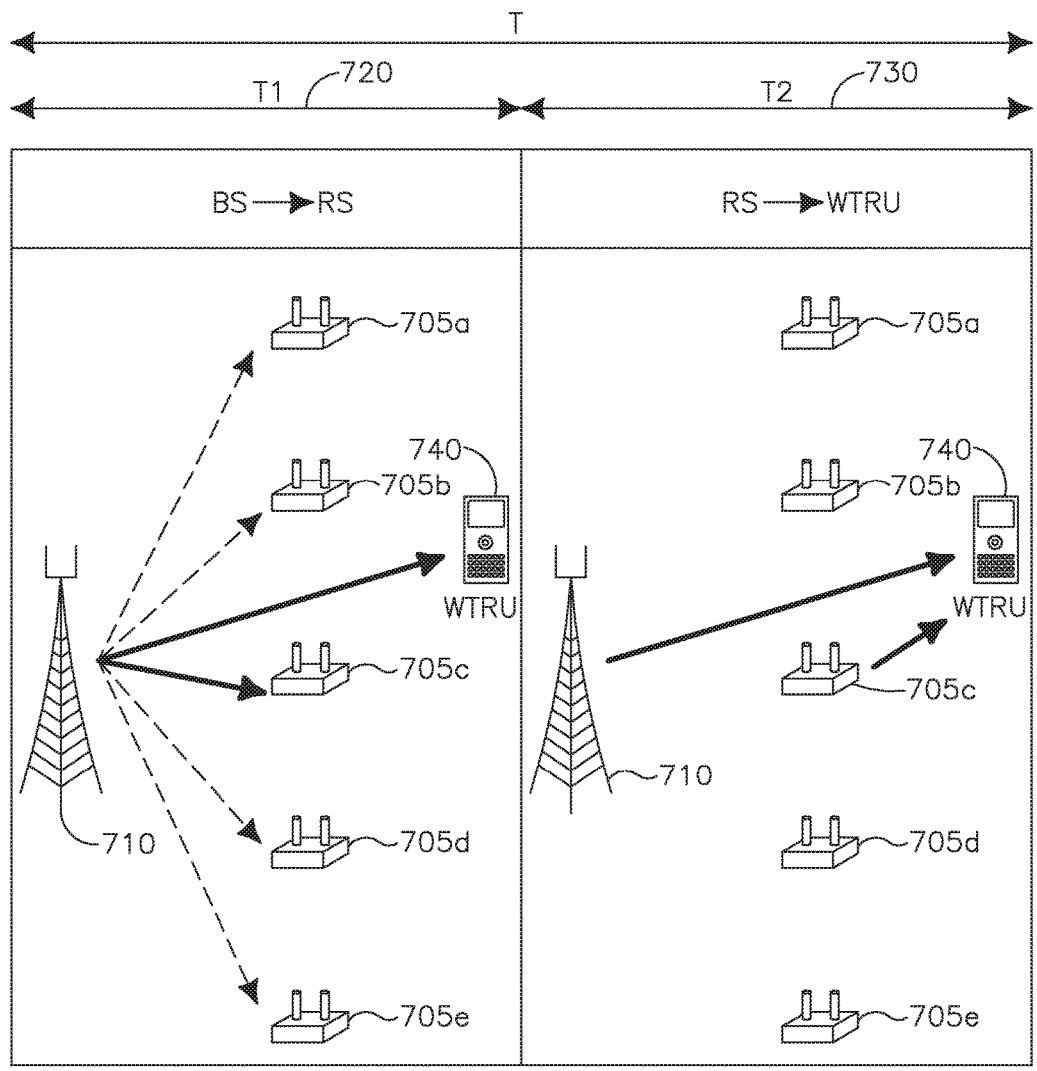
FIG. 7 is a diagram showing example TDM relays that essentially transmit and receive signals in different time intervals.

The previous section introduced various physical architectures for using RSs in a cellular network, noting that each architecture could support different choices of signals for transmission and reception by different nodes. This section describes a number of such 'transmission schemes' and analyzes their performance. FIG. 7 is a diagram of example TDM relays that transmit and receive signals in different time intervals. For example, in the DL, a TDM-relay 705a . . . 705j would receive signals from the BS 710 in one time interval and transmit it to the WTRU in a subsequent time interval. These time intervals are referred to as phases or transmission time intervals (TTIs), T1 720 and T2 730. Although T1 720 and T2 730 are drawn contiguously in FIG. 7, T2 does not need to be contiguous to T1. In fact, in some embodiments, T2 730 will probably not be contiguous to T1 720, possibly due to scheduling constraints. Furthermore, the durations of T1 720 and T2 730 are flexible and depend upon the channel conditions, which in turn determine the time taken for successful reception of a given block of data. In one example, the transmission medium is slotted into TTIs of fixed size, so that T1 720 and T2 730 may be integer multiples of a fixed TTI. However TTI size may also be variable or changed dynamically. T1 720 and T2 730 may differ in size from each other.

It is also possible to design other types of relays, for example, FDM relays, which would transmit and receive in different frequency bands. These designs are general and apply to types of relays other than TDM-relays. For simplicity, only the details of various designs within the context of TDM-relays will be discussed. Although the designs are discussed in the context of DL data transmission, the designs apply to UL data transmission as well.

Referring again to FIG. 7, the basic principle of a TDM-relay 705 is that it receives the DL data transmitted from the BS 710 during Phase 1, denoted as T1 720 and transmits it in the DL direction to the WTRU 740 in Phase 2, denoted as T2 730. These transmissions are referred to as a "simple" Phase 1 transmission and a "forwarding" Phase 2 transmission. It is possible that during Phase 1, the WTRU 740 also receives and attempts to decode the DL data transmitted from the BS 710. This is referred to as a "multicast" Phase 1 transmission. Similarly, during Phase 2, it is possible that the BS 710 also transmits DL data to the WTRU 740. This is referred to as a "cooperative" Phase 2 transmission. These variations to Phase 1 and Phase 2 now produce 4 basic TDM-relay transmission schemes referred to as simple-forwarding relay transmission scheme, multicast-forwarding relay transmission scheme, simple-cooperative relay transmission scheme, and multicast-cooperative relay transmission scheme.

In a simple-forwarding relay transmission scheme, the BS may transmit DL data, using channel codes, including forward-error-correction codes such as convolutional or turbo or LDPC codes and error-detection codes, such as CRC-Block codes; modulation schemes such as M-ary QAM etc.; and multi-antenna (MIMO) mapping schemes. The forwarded signal in Phase 2 may be based on the received baseband signal, the received demodulated signal, or the received decoded data. The resulting schemes are referred to as "amplify-and-forward", "demodulate-and-forward" and "decode-and-forward," respectively. In the latter two cases, the new modulation and/or the new channel code used for forwarding may be different than the modulation and/or channel code used in Phase 1, because the quality of the RS-WTRU link differs from the quality of the BS-RS link.

Figure 8:
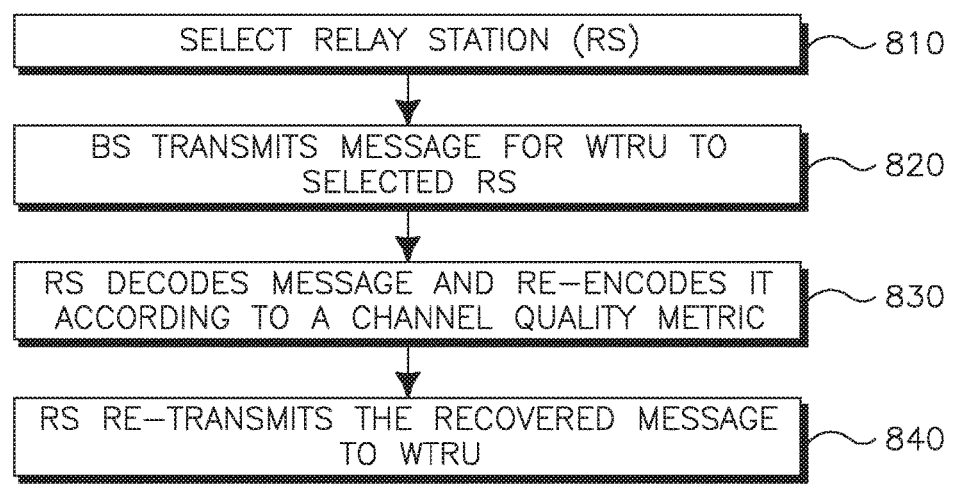
FIG. 8 is a flow diagram showing the sequence of actions involved in a decode-and-forward scheme.

FIG. 8 is a flow diagram of the sequence of actions involved in a decode-and-forward scheme 800, where the BS selects an RS 810 and transmits a message for a WTRU to the selected RS 820. The RS decodes the message and re-encodes it according to a channel quality metric 830. If necessary the BS retransmits the DL data to the RS, until the RS receives it without any errors (not shown). ARQ and/or HARQ protocols may be used for achieving this error-free transmission. In such a case, Phase 1 is essentially defined by the time taken for the RS to correctly receive the data sent by the BS. Similarly, during Phase 2, the RS transmits, and possibly retransmits, the DL data until the WTRU correctly decodes it 840.

In the multicast-forwarding relay transmission scheme, the signals transmitted by the BS are received not only by the RS, but also by the WTRU in Phase 1. In Phase 2, the RS forwards the received signals to the WTRU, which the WTRU would 'combine' with the BS signals received during Phase 1 to correctly receive the BS data. The 'combining' process enables this relay transmission scheme to outperform the simple-forwarding scheme. While the RS may forward the received BS data using one of the three possible forwarding schemes (namely amplify-and-forward or demodulate-and-forward or decode-and-forward), only the decode-and-forward scheme will be discussed for simplicity. In this case, again, the BS transmits and possibly retransmits DL data until the RS correctly decodes it, which indicates the end of Phase 1.

The transmitted signal in Phase 1 may be channel coded using forward error correction & detection codes, in which case the WTRU will have at the end of Phase 1, a soft-decoded version of the DL data sent by the BS. Indeed, the WTRU typically will not be able to correctly decode the DL data during Phase 1 (since the poorer BS-WTRU channel degrades the BS signal more than the BS-RS channel) and has to decode the data with associated reliability metric (i.e. soft data). During Phase 2, the WTRU soft-combines the Phase 1 soft-data with the data forwarded by the RS and correctly decodes the RS transmitted data, possibly after some retransmissions.

Alternately, the transmitted signals in Phase1 may be coded using rateless-codes. These codes essentially are channel codes that are suited for use in single transmitter and multiple receiver communication scenarios. One advantage with these codes is that at the end of Phase1, while the RS has decoded all the DL data correctly, the WTRU (due to poorer channel conditions) would have decoded only a subset of the complete DL data. Since this is 'hard' data (i.e. correct with probability 1), the Phase 2 data transmission by the RS may be limited to transmitting only the remaining DL data (which was not correctly decoded by the WTRU) and the WTRU may simply concatenate the DL data decoded correctly in Phase 1 and Phase 2, avoiding the need for 'soft-combining'. Finally, the transmitted signals may be channel coded using any of the existing point-to-multipoint optimal channel codes.

In the simple-cooperative relay transmission scheme, Phase 1 transmission details are identical to that of simple-forwarding relay transmission scheme. At the end of Phase 1, the relay has successfully decoded the DL data transmitted by the BS. In Phase 2, the BS and RS may transmit signals in a 'cooperative' manner and enhance the efficiency of the data transfer to the WTRU. There are different ways in which the BS and RS can cooperate, which include diversity transmission of identical signals (which can be used for multipath diversity reception), coordinated transmission of signals for beam-forming at the WTRU (which requires channel state information at the transmitters), diversity transmission of distributed space-time coded signals (for example, Alamouti coding), and higher-rate transmission using distributed spatial multiplexing schemes (for example pre-coding techniques).

The effective data rates that may be achieved by using these various transmission schemes is discussed below. To calculate the effective data rates, the the achievable rates on each link (BS-RS, RS-WTRU and BS-WTRU) during each of the two phases may be combined to obtain an effective achievable rate for each relay transmission scheme. This combined rate is referred to as "effective throughput $TP_{eff}$". The achievable rates for each link may be understood to be the theoretical information capacity rates or SINR vs. Rate curves computed from link-level simulations.

$TP_{eff}$ for Simple-Forwarding RTS

This RTS is also referred as '2-hop' scheme for brevity. In this example, the BS transmits b information bits to the selected RS until it fully decodes the bits. The RS may then transmit the decoded bits. Only then does the WTRU start the decoding process. The effective throughput in this case is illustrated by the equation:

$$TP_{eff}(2-\text{hop}) = \frac{b}{T_{RS} + T_U} = \frac{R_{BS-RS} \times R_{RS-U}}{R_{BS-RS} + R_{RS-U}} \quad \text{Equation (1)}$$

where $$T_{RS} = \frac{b}{R_{BS-RS}} \text{ and } T_U = \frac{b}{R_U(2)} = \frac{b}{R_{RS-U}}.$$

$TP_{eff}$ for Multicast-Forwarding RTS

As described above, channel codes and rateless codes may be used for the Multicast-Phase 1. In this example, rateless codes are used. In a theoretical sense, rateless codes are an infinitely long stream of encoded bits that make the decoding process independent of the channel conditions. The WTRU may begin decoding the DL data being sent from the BS to the RS at the start of the communication by the BS. Hence, the WTRU decodes some of the bits being sent from the BS in the first phase with a rate $R_U(1)=R_{BS-U}$. In the second phase, the RS resumes the transmission from the BS by sending only the remaining bits that the WTRU did not decode yet at a rate $R_U(2)=R_{RS-U}$. It follows that:

$$T_{RS} = \frac{b}{R_{BS-RS}}; \text{ and} \quad \text{Equation (2)}$$

$$T_U = \frac{b}{R_{RS-U}}\left(1 - \frac{R_{BS-U}}{R_{BS-RS}}\right) \quad \text{Equation (3)}$$

The effective throughput in this example satisfies the equation:

$$TP_{eff}(\text{Rateless}) = \frac{1}{\frac{1}{R_{BS-RS}} + \frac{1}{R_{RS-U}}\left(1 - \frac{R_{BS-U}}{R_{BS-RS}}\right)} \quad \text{Equation (4)}$$

$TP_{eff}$ for Simple-Cooperative RTS

As described earlier, DL cooperative transmission from the BS and RS in Phase 2 may be viewed as a distributed antenna array transmission. Accordingly, this scheme also is referred to as Simple-DAA, (DAA scheme). The DAA scheme enables the BS and the RS to send different information bits to the WTRU simultaneously. Their signals are thus inevitably interfering with each other. The WTRU uses successive interference cancellation (SIC) to distinguish between the interfering signals. Assuming perfect interference cancellation at the WTRU, the rate achieved at the WTRU in the second phase satisfies the equation:

$$R_U(2)=R_{BS-U}(2)+R_{RS-U} \quad \text{Equation (5)}$$

where $R_{BS-U}(2)$ is the transmission rate of the BS in the second phase and $R_{BS-U}(1)$ is the BS rate in the first phase.

The effective throughput is now given by Equations (1) and (5) as:

$$TP_{eff}(DAA) = \frac{R_{BS-RS} \times (R_{BS-U}(2) + R_{RS-U})}{R_{BS-RS} + R_{BS-U}(2) + R_{RS-U}} \quad \text{Equation (6)}$$

$TP_{eff}$ for Multicast-Cooperative RTS

As described above, channel codes and rateless codes may be used for Multicast-Phase 1. In this example, rateless codes are used. The BS and RS will split only the bits that the WTRU did not recover during Phase 1. The effective throughput $TP_{eff}$(Rateless-DAA) is derived from the equations above as:

$$TP_{eff}(\text{Rateless}) = \frac{1}{\frac{1}{R_{BS-RS}} + \frac{1}{(R_{BS-U}(2) + R_{RS-U})}\left(1 - \frac{R_{BS-U}(1)}{R_{BS-RS}}\right)} \quad \text{Equation (7)}$$

An alternate, but more detailed, example of this RTS, which is referred to as protocol 1 (P1), will now be described.

Figure 9:
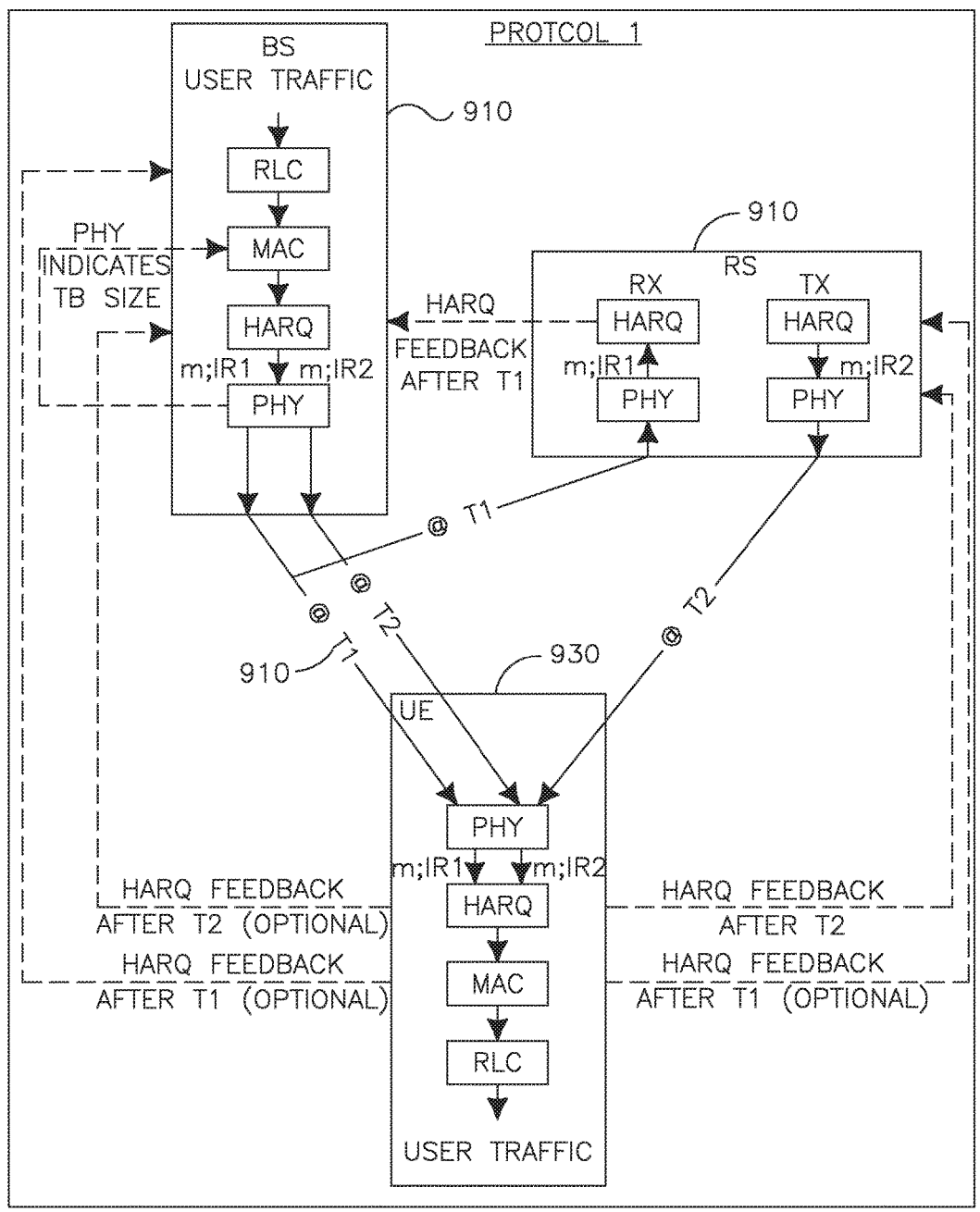
FIG. 9 is a flow diagram of protocol 1 (P1) which is defined for the downlink (DL) as follow.

FIG. 9 is a flow diagram of protocol 1 (P1) 900 which is defined for the downlink (DL) as follows. Assuming a message of in bits, the BS 910 encodes the in bits at a rate $R_1$:BS,RS and transmits these in Phase 1. Since the RS 920 must successfully decode all data, in must follow the equation, in $\leq R_{1,BS,RS}T_1$. During T1, the WTRU 930 also receives the signal and attempts to decode it.

In Phase 2, the BS 910 and RS 920 utilize a distributed space-time code layered with an incremental redundancy encoding of the data to transmit the data to the WTRU 930. The WTRU 930 uses its optimal space time decoder and then combines the two incrementally redundant transmissions to fully decode the data at the end of Phase 2. The WTRU 930 combines data from 2 transmissions to successfully decode the data. In this example, $R_{1,BS,US}$ is the maximal rate at which the reliable transmission from the BS 910 to the WTRU is possible in Phase 1. Let $R_{2,COOP}$ be the maximal rate at which reliable transmission to WTRU 930 is possible by cooperation of the RS 920 and the BS 910 in Phase 2. Assuming ideal incremental redundancy combining, the WTRU 930 possesses $R_{1,BS,UE}T1$ bits of information about the message from the first transmission and $R_{2,COOP}T_2$ bits of information about the message from the second transmission. To successfully decode the data, in must therefore have $m \leq m \leq R_{1,BS,RS}T_1 + R_{2,COOP}T_{2,2}$. The maximum amount of data that can be transmitted during the TTI (time T) is then given by $$m^* = \max \min(R_{1,BS,RS}T_1, R_{2,coop}T_2 + R_{1,BS,UE}T_1) \quad \text{Equation (8)}$$

To maximize equation (8), $$R_{1,BS,RS}T_1 = R_{2,coop}T_2 + R_{1,BS,UE}T_1 \quad \text{Equation (9)}$$

This rate-balancing equation allows determination of both the split of the TTI into Phase 1 and Phase 2 and the maximal achievable transmission rate. The maximal achievable rate is:

$$R_{P1} = \frac{m^*}{T} = \frac{R_{1,BS,RS} R_{2,coop}}{R_{1,BS,RS} + R_{2,coop} - R_{1,BS,UE}} \quad \text{Equation (10)}$$

$$= \frac{1}{R_{1,BS,RS}} + \frac{1}{R_{2,coop}}\left(1 - \frac{R_{1,BS,UE}}{R_{1,BS,UE}}\right) \quad \text{Equation (11)}$$

Protocol 1 (P1) is also applicable for Uplink (UL). The UL example is similar to that shown in FIG. 8, but with the BS 910 and the WTRU 930 roles switched (not shown). Protocol 1 (P1) is described next for the UL case. The WTRU 930 creates a message/packet in. Such message/packet may be in the form of a MAC protocol data units (PDU), or in any other form. In Phase 1, for example in a first TTI, the WTRU transmits in to the RS 920 and the BS 910, using a modulation and coding scheme (MCS) suitable for the WTRU-RS link. The BS also monitors this transmission in Phase 1. In Phase 2, for example in a later TTI, the WTRU 930 and the RS 920 transmit in to the BS 910 using a distributed space-time code, and transmit a different Incremental Redundancy (IR) version than the one transmitted in Phase 1.

The BS 910 may use an appropriate receiver, for example an optimal space time decoder in Phase 2. Since in may have received multiple IR versions in Phase 1 and Phase 2, the BS 910 combines the received versions (e.g. Hybrid Automatic Repeat Request (HARQ) combining) in order to improve the decoding of m.

Split RTS or MAC-level Cooperative RTS

A split RTS uses the Multicast-Forwarding RTS in conjunction with a direct transmission to improve performance. In any of the 4 RTSs introduced earlier, a key element that determines the effective throughput is the duration of Phase 1 (T1), during which the DL data is moved from the BS to the RS. In these examples, the effective throughput increases if the time taken to do so is decreased. In one example of the split RTS, the first phase may be shortened such that the BS splits the DL data b bits into two streams of data $b_{RS}$ and $b_{BS}$. The BS will forward only $b_{RS}$ to the RS in Phase 1, and will transmit $b_{BS}$ to the WTRU in Phase 2, assuming that $b = b_{BS} + b_{RS}$. In this embodiment, the BS will require knowledge ahead of the start of Phase 1 regarding how the original b bits will be split in 2 portions, $b_{RS}$ and $b_{BS}$ following the multiplexing mode in Phase 2. Splitting the b bits may be executed at the MAC level or the PHY level. The original data dedicated to the WTRU from the beginning may be split according to the channel conditions and to accommodate simultaneous transmissions. Another embodiment concatenates two different messages intended for the WTRU and transmit using $b_{RS}$ and $b_{BS}$ for each in accordance with the channel constraints. These constraints are translated in terms of $b_{RS}$ to $b_{BS}$ ratio or $T_1$ to $T_2$ ratio.

Two variations of the split RTS are possible, depending on whether the Phase 1 data transmission is 'simple' (for example using channel coding) or 'multicast' (for example, using rateless coding).

In a simple-split RTS embodiment, assuming that the Phase 1 transmission is 'simple' as described above, the BS will transmit $b_{RS}$ bits to the RS in Phase 1 using a coding technique that allows only the RS to decode the transmitted codeword. The supported rate on the BS-RS link is denoted by $R_{BS-RS}$ where:

$$b_{RS} = T_1 \times R_{BS-RS} \text{ or also } T_1 = \frac{b_{RS}}{R_{BS-RS}} \quad \text{Equation (12)}$$

In Phase 2, the RS will forward the $b_{RS}$ bits successfully decoded to the WTRU at the rate $R_{RS-U}$. The BS will simultaneously transmit $b_{BS}$ bits with rate $R_{BS-U}(2)$. This provides:

$$b_{BS} = T_2 \times R_{BS-U}(2)$$

$$b_{RS} = T_2 \times R_{RS-U} \quad \text{Equation (13)}$$

Therefore $$T_2 = \frac{b_{BS}}{R_{BS-U}(2)} = \frac{b_{RS}}{R_{RS-U}}. \quad \text{Equation (14)}$$

The split in data satisfies $$b_{BS} = R_{BS-U}(2) \frac{b_{RS}}{R_{RS-U}} \quad \text{Equation (15)}$$

In time, we have $$T_2 = T_1 \times R_{BS-RS} \quad \text{Equation (16)}$$

In a multiplexing mode transmission in Phase 2 where there is perfect successive interference cancellation at the WTRU, the overall rate achieved at the WTRU satisfies:

$$R_U(2) = R_{BS-U}(2) + R_{RS-U} = \log_2\left(1 + \frac{P_{BS}(2)[g_{BS-U}^2 + \alpha \times g_{RS-U}^2]}{N_0 + I_U}\right) \quad \text{Equation (17)}$$

The effective throughput achieved at the WTRU may be expressed as $$TP_{Conv-Split} = \frac{b_{RS} + b_{BS}}{T_1 + T_2} = \frac{R_{BS-RS}(R_{BS-U}(2) + R_{RS-U})}{R_{RS-U} + R_{BS-RS}} \quad \text{Equation (18)}$$

In a multicast-split RTS embodiment, assuming that the Phase 1 transmission is 'multicast', the BS may transmit $b_{RS}$ bits to the RS in Phase 1 using a rateless coding technique. In this example, the RS will be able to fully decode the transmitted message but will also enable other receivers to decode some parts of it. $b_1$ denotes the bits that the WTRU is able to intercept and successfully extract from the BS-RS transmission in Phase 1. $b_2$ denotes the bits that the WTRU receives in Phase 2, such that $b=b_1+b_2$.

The supported rate on the BS-RS link is denoted by $R_{BS-RS}$, and the BS-WTRU link rate, $R_{BS-U}$; where $$b_{RS} = T_1 \times R_{BS-RS} \text{ and } b_1 = T_1 \times R_{BS-U} \text{ or also} \qquad \text{Equation (19)}$$

$$T_1 = \frac{b_{RS}}{R_{BS-RS}}, T_1 = \frac{b_1}{R_{BS-UE}} \text{ and } b_{RS} = \frac{b_1 \times R_{BS-RS}}{R_{BS-UE}} \qquad \text{Equation (20)}$$

In Phase 2, the BS may transmit $b_{BS}$ bits at rate $R_{BS-u}(2)$, and the RS will simultaneously forward the $b_{RS}-b_1$ bits to the WTRU at the rate $R_{RS-U}$.

$$b_{BS} = T_2 \times R_{BS-U}(2)$$

$$b_{RS} - b_1 = T_2 \times R_{RS-U}$$

$$b_2 = b_{BS} + b_{RS} - b_1 \qquad \text{Equation (21)}$$

therefore $$T_2 = \frac{b_{RS}}{R_{BS-U}(2)} \text{ and } T_2 = \frac{b_{RS} - b_1}{R_{RS-U}} = b_{RS} \frac{R_R - R_{BS-U}}{R_R \times R_{RS-U}}$$

The split in data satisfies $$b_{BS} = b_{RS} \times R_{BS-U}(2) \frac{R_{BS-RS} - R_{BS-U}}{R_R \times R_{RS-U}} \qquad \text{Equation (22)}$$

Which can be translated in time as follows $$T_2 = T_1 \times \frac{R_{BS-RS} - R_{BS-U}}{R_{RS-U}} \qquad \text{Equation (23)}$$

Assuming a multiplexing mode transmission in Phase 2 and a perfect successive interference cancellation at the receiver, the overall rate achieved at the WTRU satisfies:

$$R_U(2) = R_{BS-U}(2) + R_{RS-U} = \log_2\left(1 + \frac{P_{BS}(2)[g_{BS-U}^2 + \alpha \times g_{RS-U}^2]}{N_0 + I_U}\right) \qquad \text{Equation (24)}$$

and, the effective throughput achieved at the WTRU can be expressed as:

$$TP_{Rateless\_Split} = \frac{b_1 + b_2}{T_1 + T_2} = \frac{R_{BS-RS}(R_{BS-U}(2) + R_{RS-U}) - R_{BS-U}(2)R_{BS-U}}{R_{RS-U} + R_{BS-RS} - R_{BS-U}} \qquad \text{Equation (25)}$$

Data Flow Analysis of Multicast-Split RTS

Figure 10:
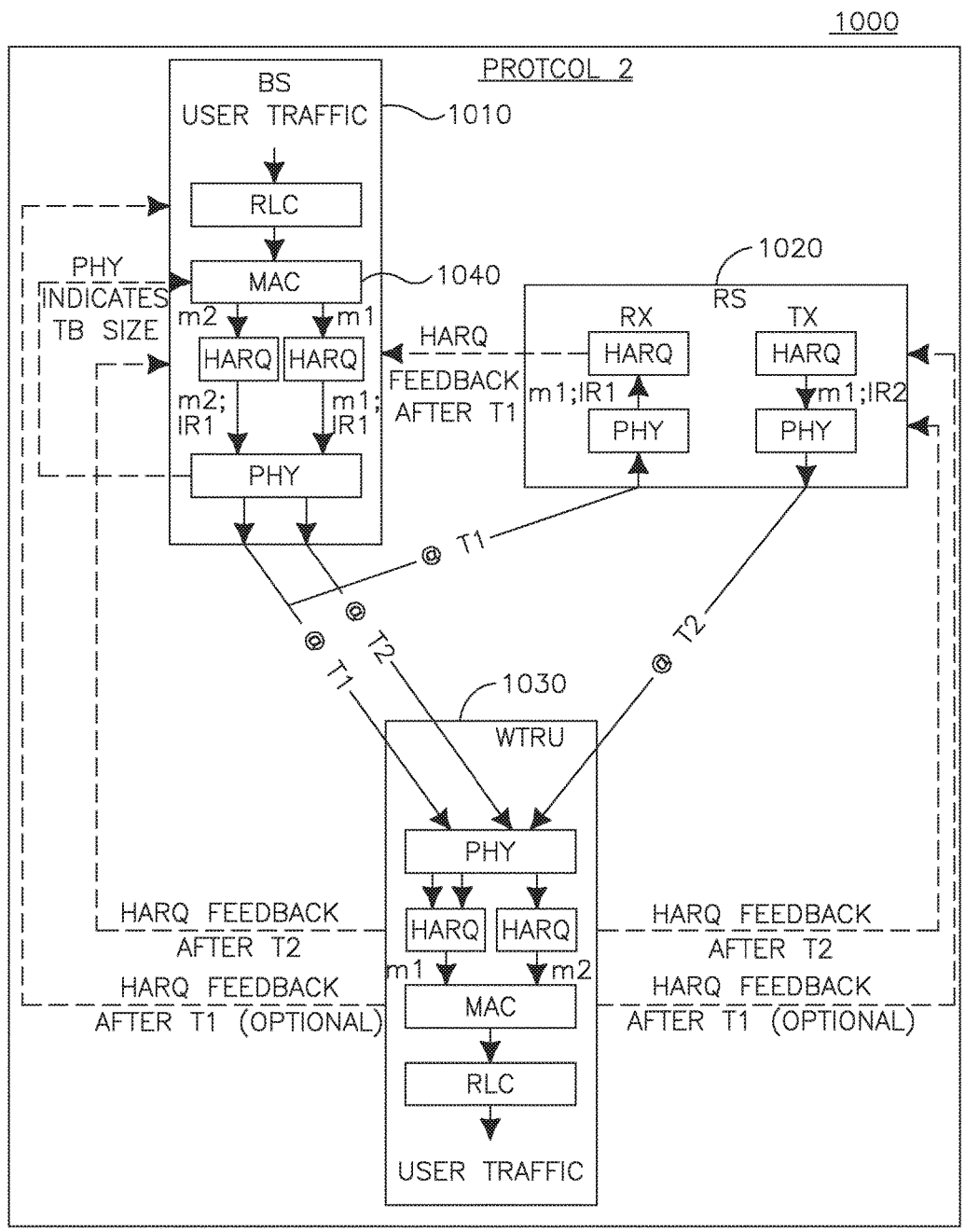
FIG. 10 is a flow diagram showing and example multi-cast-split RTS referred to as protocol 2 (P2) and defined as follows for the DL case.

FIG. 10 is a flow diagram showing a multicast-split RTS embodiment referred to as protocol 2 (P2) 1000 and defined as follows for the DL case. The BS 1010 creates two messages of $m_1$ and $m_2$ bits. In Phase 1, the BS 1010 transmits the first message ($m_1$ bits) to the RS 1020 at a rate $R_{1,BS,RS}$, thus $m_1 \leq R_{1,BS,RS}T_1$. As in P1, the WTRU 1030 monitors to this transmission. In Phase 2, the RS 1020 forwards the information it received in Phase 1 to the WTRU 1030. This is performed at a rate $R_{2,RS,UE}$. The BS 1010 simultaneously sends the second message ($m_2$ bits) to the WTRU 1030. This is performed at a rate $R_{2,BS,UE}$. The WTRU 1030 uses a multi-user detector (not shown), for example a SIC, in Phase 2 and in conjunction with an incremental redundancy for the first message to receive the data. To analyze the performance of this protocol, various constraints exist. First, as for P1, transmitting the first message efficiently may occur in accordance with the following rate-balancing equation:

$$R_{1,BS,RS}T_1 = R_{2,RS,UE}T_2 + R_{1,BS,UE}T_1 \qquad \text{Equation (26)}$$

The rates $R_{2,RS,UE}$ and $R_{2,BS,UE}$ are, however, dependent on each other as well. In addition to satisfying individual per-link capacity constraints, the rates must also satisfy the MAC capacity constraint:

$$R_{2,RS,UE} + R_{2,BS,UE} \leq R_{2,coop} \qquad \text{Equation (27)}$$

The assumed rate $R_{2,COOP}$ as defined for P1 is the optimal transmitter cooperation rate. Although cooperation at the PHY layer is not part of P2 (see above), the close relationship between achievable throughput for P1 and P2 is shown herein. Clearly, maximizing the throughput would require equation (27) to be satisfied with equality. Accordingly, together with equation (26) and the constraint $T=T_1+T_2$:

$$R_{P2} = \frac{m_1 + m_2}{T} = \frac{R_{1,BS,RS}R_{2,coop} - R_{1,BS,UE}R_{2,BE,UE}}{R_{1,BS,RS} + R_{2,RS,UE} - R_{1,BS,UE}} \qquad \text{Equation (28)}$$

In interference limited cellular deployments, P2 provides slightly better performance than P1. Both provide a significant improvement over a no-relay case or a simple 2-hop relaying and P2 performs better than P1. The key difference is in the management of cooperation. In P1, a single flow is transmitted by the MAC during (T1+T2), while P2 creates and transmits 2 MAC flows.

In order to schedule the data, the MAC is aware of the quality of a compound link comprises the three constituent PHY links (BS-to-RS, RS-to-WTRU and BS-to-WTRU). Moreover, to ensure cooperation between the BS 1010 and the RS 1020 in Phase 2, the RS 1020 must be centrally scheduled by the BS 1010 and the PHY at the BS 1010 and the RS 1020 must be tightly synchronized to the channel symbol level.

P2 manages the transmission of the two flows almost independently and without tight PHY layer synchronization. A constraint on the two flows is that the sum rate at the WTRU 1030 does not exceed its sum rate constraint. Provided this constraint is satisfied, the BS MAC 1040 manages the RS transmission only in a limited fashion. The BS MAC 1040 schedules data to the RS 1020 (based only on the BS-to-RS link quality) to ensure that the RS buffer (not shown) does not become empty. The BS and RS MACs 1040 (RS MAC not shown) must agree on how the rates are repartitioned in Phase 2 such that the combined rate to the WTRU 1030 does not violate the sum rate constraint. However, the BS MAC 1040 does not need to specify to the RS MAC (not shown) which particular packet is to be scheduled for the transmission. Once the RS 1020 indicates reception of a packet, HARQ management for that packet may be relinquished to the RS.

The RS MAC scheduler (not shown) may act independently from the BS MAC scheduler (not shown) such that the BS 1010 control of the RS 1020 occurs at a slower rate. The PHY layer operations of P2 require no coordination since the BS 1010 and RS 1020 simply transmit different flows in Phase 2 in a non-cooperative fashion.

P2 is also applicable to the UL. The UL scenario is similar to that shown in FIG. 10, but with the BS 1010 and the WTRU 1030 roles switched (not shown). P2 is described herein for the UL case.

In this embodiment, the WTRU 1030 creates any two messages/packets m1 and m2. m1 and m2 may be created at different times. These two messages may be in the form of 2 MAC PDUs, or in any other form. In Phase 1, for example in a first TTI, the WTRU 1030 transmits m1 to the RS 1020 and the BS 1010 using an MCS suitable for the WTRU-RS link. The BS 1010 also monitors this transmission in Phase 1. In Phase 2, for example in a later TTI, the RS 1020 forwards the information it received in Phase 1 to the BS 1010 using an MCS suitable for the RS-BS link, and transmitting a different IR version than the one it received from the WTRU 1030. In Phase 2, for example in a later TTI, the WTRU 1030 also sends a second message m2 to the BS 1010 using an MCS suitable for the WTRU-BS link.

The BS 1010 may use an appropriate receiver, for example a multi-user detector or a SIC (not shown), in Phase 2 to receive m1 and m2. Since some messages, such as m1, may have received multiple IR versions (e.g. in Phase 1 and Phase 2), the BS 1010 combines the received versions (e.g. HARQ combining) in order to improve the decoding of the message.

Relay Transmission Schemes for OFDM-Like Systems

The frequency dimension may be exploited in cooperative relay schemes. Although the following example embodiments apply to the DL, only the UL is discussed for simplicity.

The frequency band assigned for transmission between the WTRU and the BS are divided into two frequency bands, W11 and W12. W11 is used for transmission from the WTRU to the BS and W12 is used for transmission from the WTRU to the RS. Generally, the WTRU may use different subcarriers to transmit the data to different receivers, RSs and BSs. This embodiment assumes that the channel between the WTRU and the relay station is better than the one between the WTRU and the BS. For the full and partial information relay examples below, it is assumed that the relay is operated in TDM mode, which implies that the relay cannot receive and transmit the signal at the same time. For the continuous transmission example, it is assumed that the relay is operated in FDM mode, which implies that the relay cannot receive and transmit the signal in the same frequency band.

Full Information Relay

Figure 11:
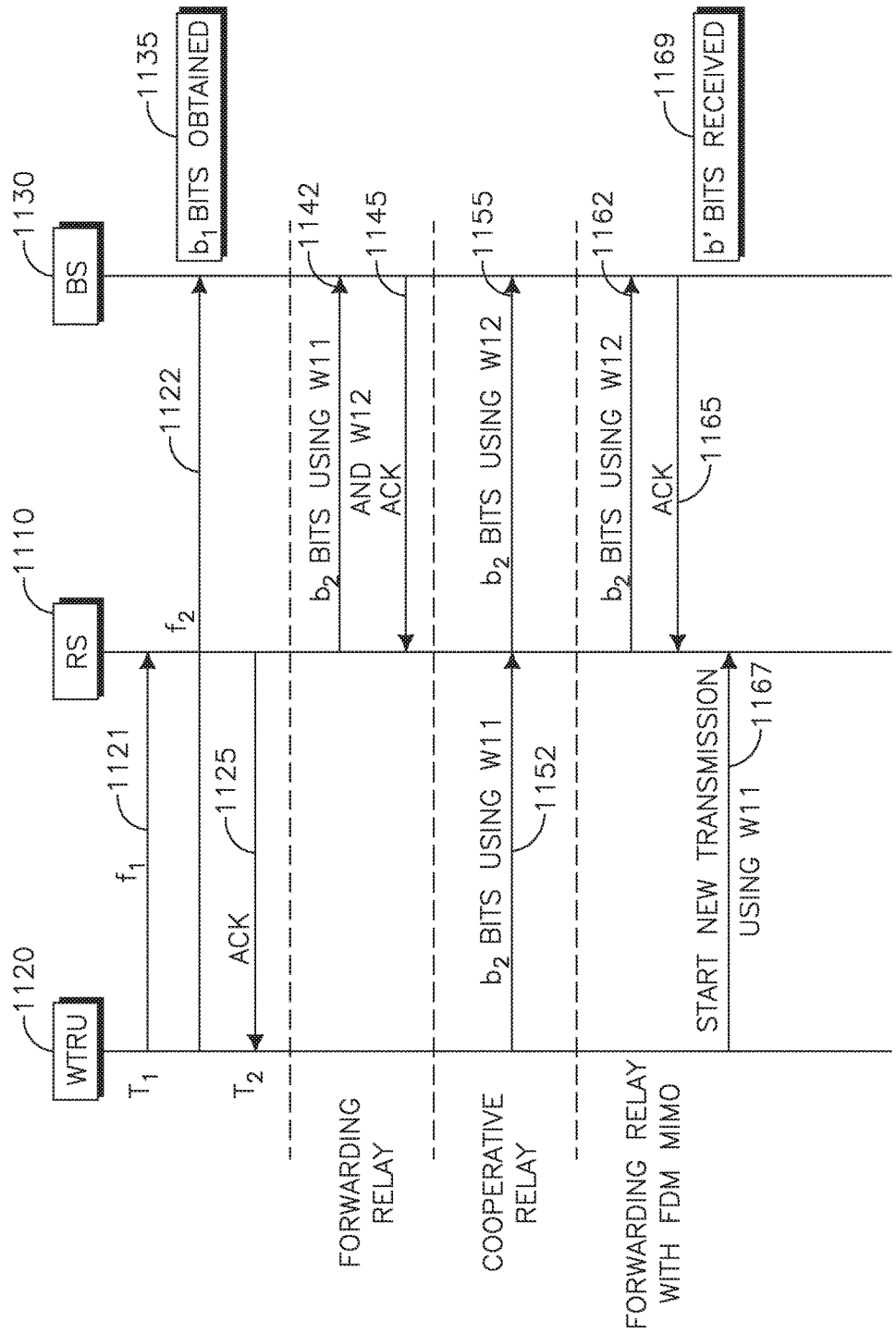
FIG. 11 is a diagram of an example full information relay.

FIG. 11 is an example diagram of a full information relay 1100 embodiment. In this embodiment, the RS 1110 has full information during an uplink transmission, and the following describes a sequence of signaling between the WTRU 1120, RS 1110 and BS 1130.

The WTRU 1120 transmits the packet to the RS 1110 and the BS 1130 at the same time but in different frequencies ($f_1$ and $f_2$) 1121, 1122 and the RS 1110 will get the packet correctly before the BS 1130 does. After the RS 1110 receives the signal successfully from the WTRU 1120, the RS 1110 sends an ACK 1125 to the WTRU 1120. The BS 1130 now has obtained b1 bits correctly from the WTRU's 1120 direct transmission 1135. There are three options for transmitting the remaining b2 bits.

The first option is the forwarding relay 1140. In this option, the WTRU 1120 stops transmission in W11 and the RS 1110 forwards b2 bits to the BS 1130 using W11 and W12 1142 until it receives an ACK 1145 from the BS 1130. The advantages under this option include power saving in the WTRU 1120 since the WTRU 1120 only transmits its packet after the RS 1110 successfully receives the transmission resulting in less signaling required in the WTRU 1120. The required signaling includes an ACK 1125 from the RS 1110 to the WTRU 1120, and an ACK 1145 from the BS 1130 to the RS 1110. However, the BS 1130 needs to be informed that the transmission is coming from the RS 1110 after the RS 1110 sends an ACK 1125 back to the WTRU 1120. The effective rate is as follows:

$$T_1 = \frac{b}{R_{UE-RS}} \qquad \text{Equation (29)}$$

$$T_2 = \frac{b - R_{UE-BS}T_1}{R_{RS-BS}}$$

$$TP_{eff} = \frac{b}{T_1 + T_2} = \frac{R_{UE-RS}R_{RS-BS}}{R_{UE-RS} + R_{RS-BS} - R_{UE-BS}}$$

where $$R_{UE-RS} = \frac{W_{12}}{2}\log_2\left(1 + \frac{SINR_{UE-RS}}{W_{12}}\right)$$

$$R_{UE-BS} = \frac{W_{11}}{2}\log_2\left(1 + \frac{SINR_{UE-BS}}{W_{11}}\right)$$

$$R_{RS-BS} = \frac{W_1}{2}\log_2\left(1 + \frac{SINR_{RS-BS}}{W_1}\right)$$

The second option is a cooperative relay 1150. In this option, the WTRU 1120 does not stop transmission in W12. The WTRU 1120 and the RS 1110 coordinately transmit b2 bits to the BS in W11 1152 and W12 1155 respectively using either predetermined Distributed MIMO mode or predetermined Cooperative Diversity. Note that "predetermined" in this example means that no signaling is required between the RS and the WTRU regarding how distribution or cooperative diversity is performed.

The advantage of this option is that it requires a shorter time for successful transmission, hence, resulting in a possibly higher effective rate compared with the first option above. To achieve this higher effective rate however, more power consumption in the WTRU 1120 is required compared with the first option and more signaling is required for an ACK 1125 from the RS 1110 to the WTRU 1120, synchronization between the RS 1110 and the WTRU 1120, an ACK 1145 from the BS 1130 to the RS 1110 and the WTRU 1120, the BS 1130 needs to be informed that the transmission is coming from the WTRU 1120 and the RS 1110, and the BS 1130 needs to be informed of the transmission mode as well.

The effective rate is as follows. For cooperative diversity in Phase 2, the RS 1110 and the WTRU 1120 cooperatively transmit the same bits (b2 bits) to the BS but use different frequency bands such that the increased frequency diversity strengthens the reliability of communications of b2 bits. For distributed MIMO in Phase 2, the RS 1110 and the WTRU 1120 independently transmit different bits to the BS and the total number of bits transmitted by the RS 1110 and the WTRU 1120 is b2.

$$T_1 = \frac{b}{R_{UE-RS}}$$ Equation (30)

$$T_2 = \frac{b - b_1}{R_{UE-BS}(2) + R_{RS-BS}}$$

$$b_1 = T_1 R_{UE-BS}(1)$$

$$R_{\textit{eff}}(\text{full}) = \frac{b}{T_1 + T_2} = \frac{R_{UE-RS}(R_{UE-BS}(2) + R_{RS-BS})}{R_{UE-BS}(2) + R_{RS-BS} + R_{UE-RS} - R_{UE-BS}(1)}$$

The third option is a forwarding relay with FDM MIMO 1160. In this third option, the RS 1110 forwards all the remaining bits (b2 bits) 1162 to the BS 1130 in W12 until it receives an ACK 1165 from the BS 1130 and the WTRU 1120 starts a new transmission in W11 1167. During this duration, there are b' bits successfully transmitted 1169 from the WTRU 1120 and the BS 1130.

The advantages of this option include that it is an efficient transmission, hence, resulting in a possibly higher overall throughput compared with the first and second options above. However, more signaling is required for an ACK from the RS to the WTRU and an ACK from the BS to the RS, the BS needs to be informed that the RS forwards the remaining bits and the WTRU starts a new transmission after RS sends ACK back to WTRU. To maximize the throughput, the bandwidth allocation in Phase 1 and Phase 2 could be different.

Partial Information in Relay

For the previously described embodiment regarding a relay with full information, several schemes may be used to describe how a relay may be used in FDM mode to help the WTRU transmit the information to the BS. In these schemes, before the RS starts to relay the information to the BS (this duration is defined as Phase 1), only an ACK is required to be sent from the RS to the WTRU after the RS succeeds in receiving all the bits from the WTRU, which reduces the signaling overhead. In this embodiment however, the WTRU sends all the bits to the RS, some of which are redundant as the WTRU has sent some bits to the BS in Phase 1. To save power in the WTRU, it would be more efficient to avoid transmitting those bits to the RS which have been sent by the WTRU to the BS in Phase 1.

Figure 12:
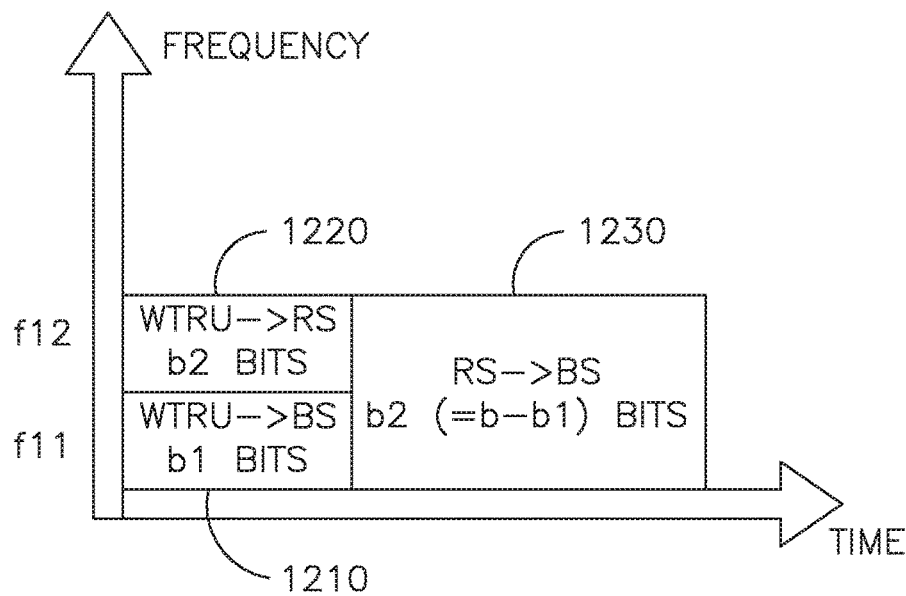
FIG. 12 is a diagram of an example forwarding relay.
Figure 13:
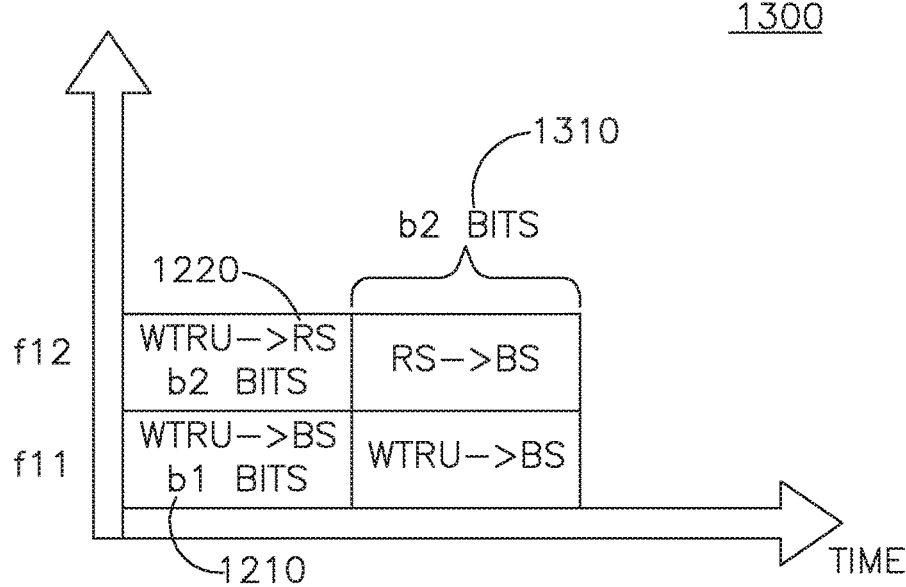
FIG. 13 is a diagram of an example cooperative relay.
Figure 14:
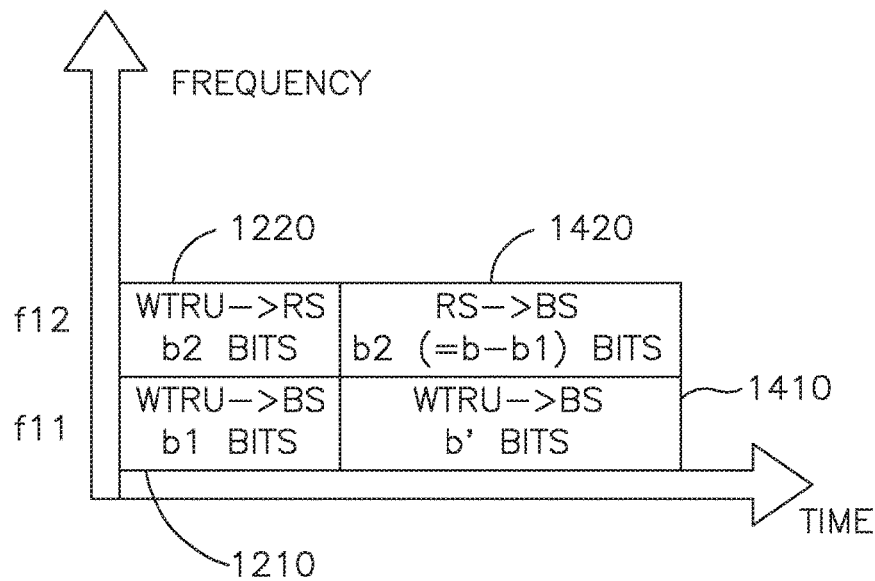
FIG. 14 a diagram of an example forwarding relay with FDM MIMO.

Hence, in this embodiment, some examples are described in which the RS receives some bits from the WTRU before it starts to forward the bits to the BS. In FIGS. 12-14, the WTRU transmits b1 bits 1210 and b2 bits 1220 in different frequencies (f11 and f12) to the BS and the RS respectively. Proper design of bits allocation/bandwidth allocation between transmissions WTRU-RS and WTRU-BS is such that the BS and the RS successfully detect their bits at the same time. After the RS receives the b2 bits successfully, similar to the full information relay embodiment, there are three options for transmitting the b2 bits from the RS to the BS.

FIG. 12 is a diagram of an example forwarding relay 1200. After the WTRU transmits b1 bits 1210 and b2 bits 1220 to the BS and the RS respectively, the RS forwards the b2 bits to the BS 1230 in Phase 2.

FIG. 13 is a diagram of an example cooperative relay 1300. Using cooperative diversity in Phase 2, the RS and the WTRU cooperatively transmit the same bits (b2 bits) 1310 to the BS, but use different frequency bands such that the frequency diversity is increased. Using cooperative MIMO in Phase 2, the RS and the WTRU independently transmit different bits to the BS and the total number of bits transmitted by the RS and the WTRU is b2. The effective rate for cooperative MIMO is as follows:

$$T_1 = \frac{b_2}{R_{UE-RS}} = \frac{b_1}{R_{UE-BS}(1)}$$

$$T_2 = \frac{b_2}{R_{UE-BS}(2) + R_{RS-BS}}$$

Therefore, $$b_1 = T_1 R_{UE-BS}(1) = \frac{b_2}{R_{UE-RS}} R_{UE-BS}(1)$$ Equation (31)

$$R_{\textit{eff}}(\text{full} - MAC) = \frac{b_1 + b_2}{T_1 + T_2} = \frac{(R_{UE-BS}(1) + R_{UE-RS})(R_{RS-BS} + R_{UE-BS}(2))}{R_{RS-BS} + R_{UE-BS}(2) + R_{UE-BS}}$$

FIG. 14 is a diagram of an example forwarding relay with FDM MIMO 1400. After the WTRU transmits b1 bits 1210 and b2 bits to the BS and the RS respectively, the WTRU transmits b' bits to the BS 1410 and the RS transmits b2 bits to the BS 1420.

To maximize the throughput, the bandwidth allocation in Phase 1 and Phase 2 could be different.

Continuous Transmission

In this section, it is assumed that the RS is a forwarding relay operated in FDM mode. The RS and the WTRU continuously transmit the packet to the BS, making full use of radio resource. All nodes transmit all the time—i.e. no TDM. Yet, Phase 1 and Phase 2 are distinguished to distinguish the BS transmission and the RS assistance phases. Table 1 shows WTRU and RS actions in continuous transmission.

TABLE 1

| Time | RS Action | WTRU Action |
|---|---|---|
| T11 (i.e. Phase 1 of Timeslot 1) | N/A | WTRU transmits B1 (i.e. data block 1) on f11 |
| T12 (i.e. Phase 2 of Timeslot 1) | RS forwards B1 on f12 | WTRU transmits new data block, B2, on f11 |
| T21 (Phase 1 of Timeslot 2) | RS forwards B2 on f12 | WTRU transmits new data block, B3, on f11 |
| T22 (Phase 2 of Timeslot 2) | RS forwards B3 on f12 | WTRU transmits new data block, B4, on f11 |
| TN1 (Phase 1 of Timeslot N) | RS forwards B2 on f12 | WTRU transmits new data block, B(N + 1), on f11 |
| TN2 (Phase 2 of Timeslot N) | RS forwards B(N + 1) on f12 | WTRU transmits new data block, B(N + 2), on f11 |

As a consequence, the WTRU is continually sending data on f11 and the RS is always forwarding the data on f12. Just as time is split into 2 phases for the WTRU and the RS transmissions, here frequencies are split into 2 segments for the WTRU and the RS transmissions.

Relay Transmission Schemes for Multiple WTRUs

In the following example RTSs, a cell may contain one or more WTRUs and one or more RSs. Depending upon the condition of the channel between a WTRU and the BS and RSs, a direct transmission scheme between the BS and RS or a specific RTS involving one or more RSs may be optimal. In this section, a number of protocols are discussed for serving multiple WTRUs in a cell with multiple RSs using one of the RTSs described earlier. Three fundamentally different methods are described below.

The first method (Method-1) is referred to as TDDR & FTDDR. In this example, the BS serves different WTRUs in different time 'slots'. In the TDDR, Phase 1 DL transmissions are received only by the RS. In FTDDR, the Phase 1 DL transmissions are received by the RS as well as the WTRU. See FIGS. 15 and 16.

The second method (Method-2) is referred to as PTDDR. In this example, the BS may serve multiple WTRUs in Phase 2 of the TDM-relay operation scheme. See FIG. 18.

Figure 19:
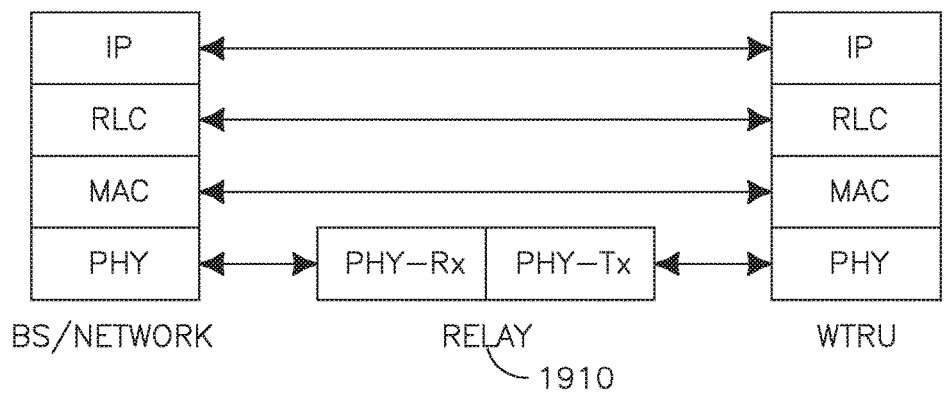
FIG. 19 is a diagram of an example protocol stack.

The third method (Method-3) is referred to as STDDR and FSTDDR. In this example, the BS serves multiple WTRUs in both Phase 1 and Phase 2 of TDM relay Schemes. FIG. 19 is an example diagram for STDDR 1900. FSTDDR is described later.

TDDR Solutions

Figure 15:
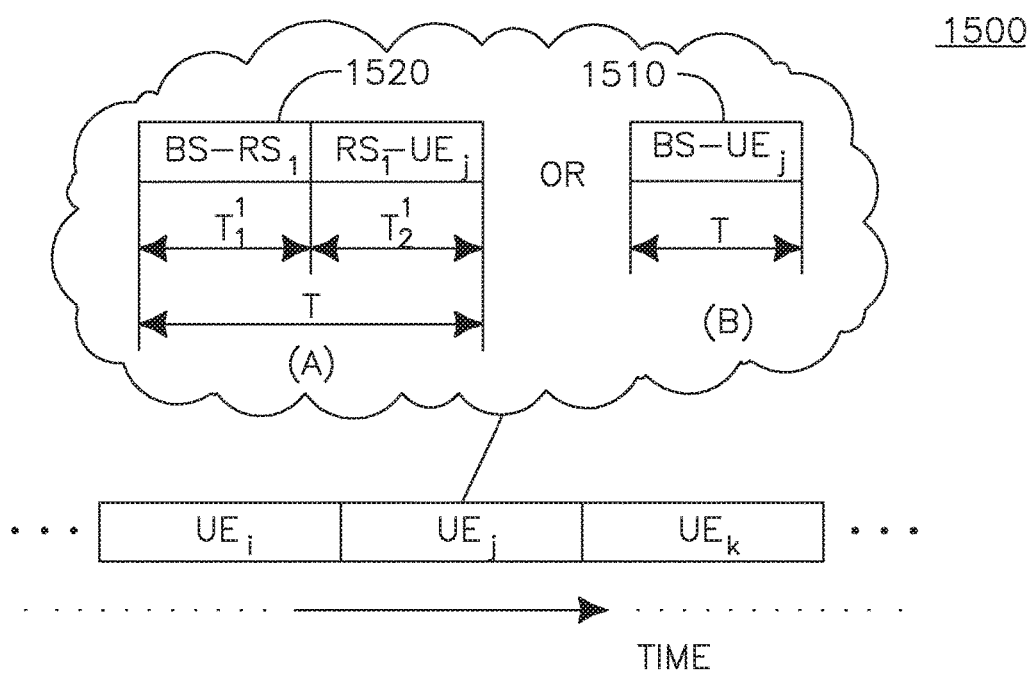
FIG. 15 a diagram of an example TDDR solution.

FIG. 15 is a diagram of an example TDDR solution 1500. Given L relays in a cell, there are a number of options available in getting the data to the WTRU. The BS may communicate to the WTRU directly 1510. Alternatively, the BS may select a particular relay, send the data to this relay and allow the relay to forward the data 1520. Finally, this method may involve several relays simultaneously, in which case they all act identically, as a distributed multi input multi output (MIMO) antenna array in the relaying stage. Whether a particular WTRU is transmitted to directly, through a single relay or a through a set of relays, depends on, for example, the availability of relays, the location of the WTRU, and the relative channel qualities between the WTRU and relative transmitters.

A decision protocol on how to transmit to a particular WTRU may be based on maximizing the resulting throughput to the WTRU as follows. For example, let $R_{B-R}$ denote the data rate achievable between the BS and the RS, $R_{R-U}$ denotes the data rate achievable between the RS and the WTRU, and $R_{B-U}$ denotes the data rate achievable between the BS and the WTRU.

In the case when the WTRU is transmitted to directly by the BS, its throughput is computed directly:

$$T_{PB-U}^R = R_{B-U} \quad \text{Equation (32)}$$

In the case when a single relay is utilized, the throughput is computed as follows:

$$TP_{B-R-U}^R = \frac{R_{R-U} T_2}{T_2 + T_1} = \frac{R_{R-U} \cdot R_{B-R}}{R_{R-U} + R_{B-R}} \quad \text{Equation (33)}$$

where Equation (22) is determined by discounting the relay-to-WTRU throughput by taking into account the time needed to get data to the relay and balancing the two portions. Values $T_1$ and $T_2$ denote time durations corresponding to $R_{R-U}$ and $R_{B-R}$, respectively.

In the case of multiple relays there are several options. In one option, the multiple relays may be treated as a single multiple-antenna relay and the rates $R_{B-R}$ and $R_{R-U}$ are computed accordingly. In another option, the throughput may be computed for each relay as in Equation (33) then added for the group. Equation (33) is determined by discounting the relay-to-WTRU throughput by taking into account the time needed to get data to the relay and balancing the two portions.

The transmission direction decision is then made as follows (for simplicity we ignore the case of "grouped relays", but the extension is obvious). Whether the WTRU is served by the BS directly or served by the BS via the RS depends on discounted throughput $TP_{B-RI-U}^R$ l∈{1, 2, . . . , L}, where L is the number of RSs, and direct link throughput $T_{PB-U}^R$. Maximum throughput among these throughputs is denoted as $TP_{E2E}^R = \max(TP_{B-U}^R, TP_{B-RI-U}^R, \ldots TP_{B-RL-U}^R)$, which is the end-to-end throughput that may be achieved. That is, the station that could achieve the highest throughput will be serving the WTRU directly. For multiple WTRU scenarios, $TP_{E2E}^R$ is adopted as the input of the scheduler.

Scheduler

Whether or not a WTRU is transmitted to in a particular TTI, depends on the scheduling function (e.g. the HSDPA scheduler in the BS). The scheduling function may use a decision variable as an input (e.g., $TP_{E2E}^R$), as computed above, as well as other inputs, like buffer occupancy, fairness options, etc.

In accordance with the described protocol, the decision variable is based on the channel quality conditions (i.e., $R_{R-U}$, $R_{B-R}$, $R_{B-R}$ are computed based on channel conditions) for HARQ scheduling. A typical HARQ scheduler is then used to determine scheduling.

Feedback

Channel state may be reported to the BSs using feedback (e.g., CQI using HSDPA). It should be noted that the quality of the relay-to-WTRU channel may be reported to the BS directly from the WTRU or by the relay. When reported by the relays, feedback from multiple WTRUs may be aggregated into a single transmission.

The ACK/NACK may be sent directly or forwarded via the relay by uplink, in which case different ACK/NACKs may or may not be aggregated across the WTRUs and the TTIs.

FTDDR Solutions

Figure 16:
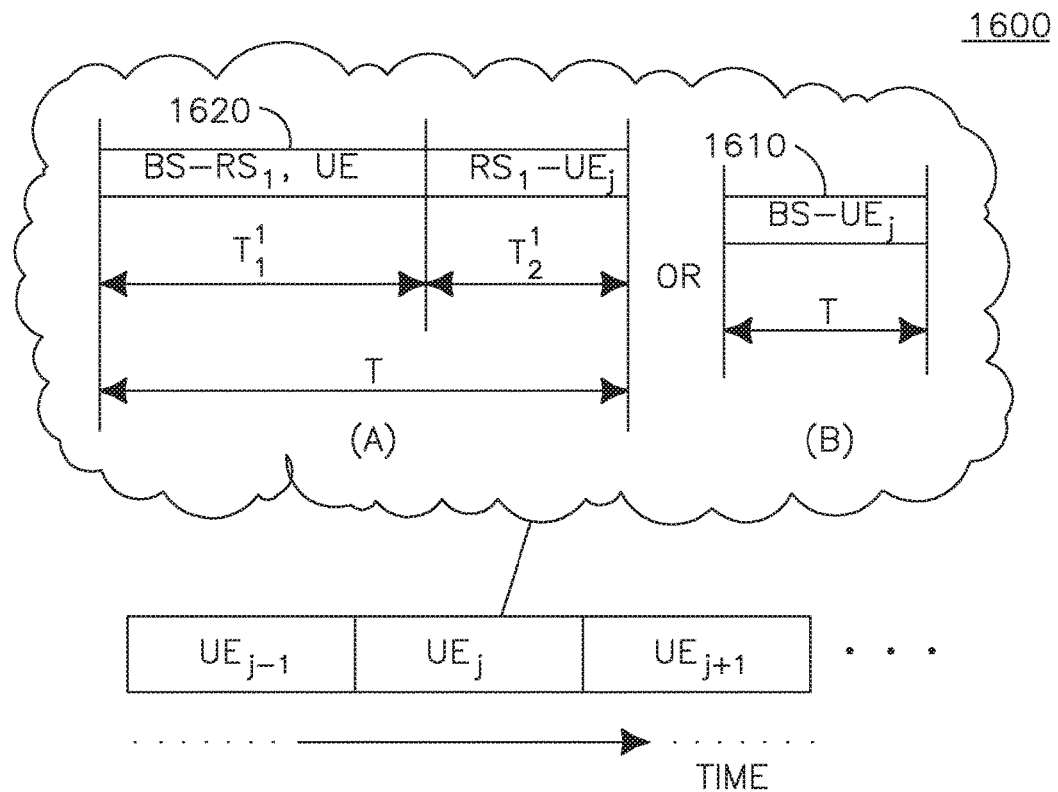
FIG. 16 is a diagram of another example embodiment using a fountain extended time division duplex relaying (FTDDR) scheme.

FIG. 16 is a diagram of another example embodiment using a fountain extended time division duplexed relaying (FTDDR) scheme 1600. In all previous schemes, the WTRUs to be communicated through a relay must wait for that relay to start its transmission in order for them to start collecting useful data. Delays are thus introduced and throughput gains are reduced. One way to overcome such an issue is to use fountain encoding at each transmitter.

Fountain codes refer to a type of code capable of driving the outage probability to zero without channel state information at the source. The transmitter encodes data into infinite length code stream (in packets), like a fountain that produces an endless supply of water drops. The receiver collects the information until it recovers the data perfectly, similar to holding a bucket under a fountain to collect drops until the bucket is full. One of the points regarding fountain codes is that the source data may be recovered from any set of sufficiently encoded packets.

A relaying protocol based on fountain codes and TDD is shown in FIG. 16. Data is transmitted from the BS to the WTRU directly 1610 or with the help of the RS 1620 depending on whether $R_{B-RI}^F > R_{B-U}^F$. Here $R_{B-RI}^F$ denotes the data rate achievable between BS and RS, and $R_{B-U}^F$ denotes the data rate achievable between the BS and the WTRU directly. The notation $[^F]$ at the upper right corner indicates that this is for a system with FTDDR. If $R_{B-RI}^F \leq R_{B-U}^F$, then $TP_I^F \leq R_{B-U}^F$, where $TP_I^F$ indicating the throughput achievable between the BS and the WTRU. In this case, all the data is transmitted to the WTRU directly without RS's help. If $R_{B-RI}^F > R_{B-U}^F$, then $$\begin{cases} TP_I^F \leq \dfrac{R_{B-U}^F T_1^l + R_{RI-U}^F T_2^l}{T_1^l + T_2^l} \\ (R_{RI-U}^F - R_{B-U}^F) T_1^l = R_{RI-U}^F T_2^l \end{cases} \quad \text{Equation (34)}$$

In this case, in $T_1^l$, the BS broadcasts information to both the RS and the WTRU, and the RS receives some "new" information as $R_{B-RI}^F > R_{B-U}^F$. In $T_2^l$, the RS relays the "new" information to the WTRU. The term "new" here means the information broadcasted from the BS is received by the RS, but not received by the WTRU in $T_1^l$. Maximizing over a selection of all L RSs, $T_{E2E}^F = \max(TP_I^F, \ldots, TP_L^F)$, is obtained, where $T_{E2E}^F$ is the throughput achievable with the FTDDR scheme.

In accordance with the HARQ scheduling protocol, unlike previous schemes, the BS does not dedicate relays before hand. Relays in this method only send an ACK to the BS. Once received, the first relay ACKing may be selected for scheduling, or the BS will allow a time observation frame to collect enough relay ACKs and select between them according to a chosen criterion.

If more then one relay is selected, the relays may be scheduled using cellular schedulers. If more then one WTRU will be served by one relay, data to those WTRUs may be "pooled" into a single transmission, or scheduled separately. Scheduling between the WTRUs may be accomplished using similar types of schedulers as a regular cellular system, e.g., HSDPA. In accordance with this method, channel state feedback is not required with FTDDR, since the codes used are rateless.

Relays need to send only an ACK to the BS to allow further scheduling. WTRU ACK/NACKs need to be available at the BS only. This may be sent directly or forwarded via the relay by uplink, in which cases different ACK/NACKs may or may not be aggregated across WTRUs and TTIs.

PTDR Solutions

Figure 17:
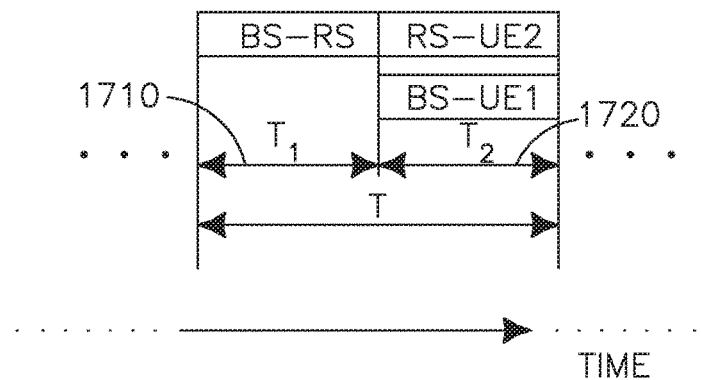
FIG. 17 is a diagram of an example parallel transmission duplex relaying (PTDR) protocol.

FIG. 17 is an example diagram showing a parallel transmission 1700 duplexed relaying (PTDR) protocol. In accordance with this protocol, a cell has L relays. For each WTRU, one of the following L+1 transmission options are selected: transmit through relay L or transmit directly from a BS. In this example, the scheduling is based on the channel conditions, as expressed, for example in the achievable rate to the WTRU and may be changed periodically.

In each TTI, a transmission is partitioned into 2 sub-TTIs (phases). During Phase 1 1710, the BS transmits to the relays. These transmissions include information that the relays must deliver to the WTRUs. During Phase 2 1720, the relays and the BS transmit (simultaneously) to the WTRUs. It should be noted that in each phase not all the WTRUs (or relays) may be scheduled. The scheduling within each phase and at each transmitter (BS/ready for Phase 2) is performed according to a scheduling process, such as in the current HSDPA, downlink LTE, etc. The decision on how to transmit to a particular WTRU may be based on maximizing the resulting throughput to the WTRU which may be computed as above i.e., in Equations (33) or (34), or through a discounting formula customized for this particular protocol.

Unlike TDDR, HARQ scheduling may be conducted independently by the base station and by each relay. In Phase 1 1710, the base station schedules transmissions to relays as follows. WTRU data for WTRUs associated with the same relay are "pooled" into a single transmission, or scheduled separately. Scheduling is performed using the same types of schedulers as for a regular cellular system, e.g. HSDPA. In Phase 2 1720, each relay and BS independently schedules transmissions of data to the WTRU as in a regular protocol, e.g. HSDPA.

Channel state information is reported back to the base stations using feedback, as in current systems (e.g. CQI using HSDPA). The relay however, must also be aware of the quality of the relay-to-WTRU channel in order to perform its own independent scheduling. Therefore, while the quality of the relay-to-WTRU channel may be reported to the BS directly by the WTRU, a reporting via the relay is preferable. When reported by the relays, feedback from multiple WTRUs may be aggregated into a single transmission.

Phase 1 and Phase 2 require separate ACK/NACK processes (relay-to-BS in Phase 1) and (WTRU-to-transmitter (relay or BS) in Phase 2). Accordingly, each operates independently in accordance with its respective operation in relay-less HARQ systems. Depending on the structure of control and signaling protocols, the relay may or may not need to forward its WTRU's ACK/NACK back to the BS.

STDDR Solutions

Figure 18:
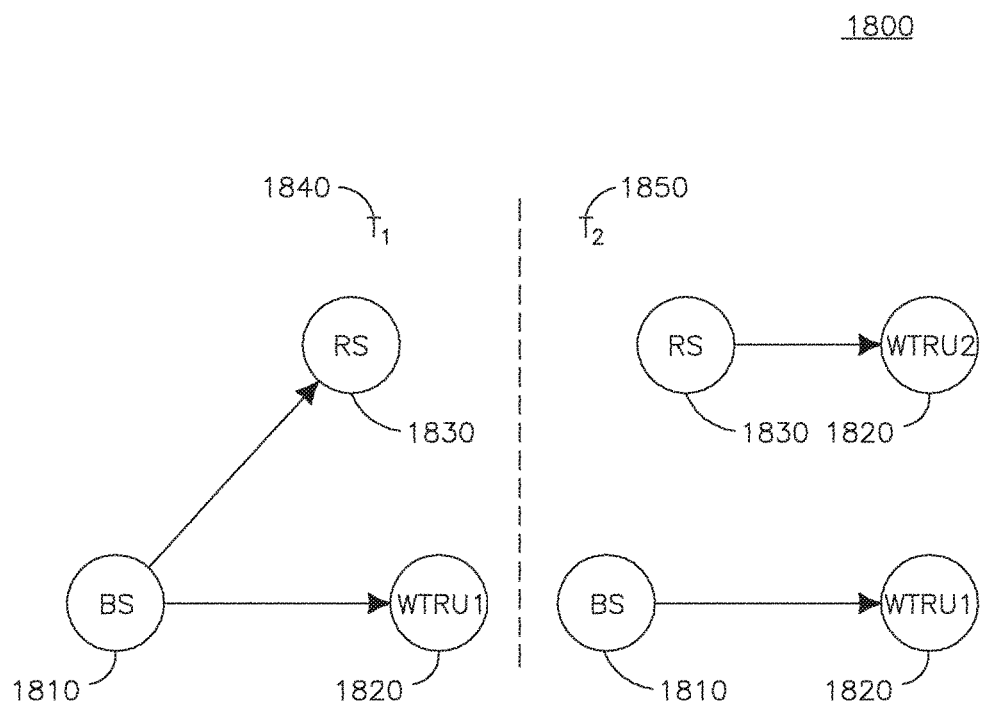
FIG. 18 is a diagram of an example STDDR.

FIG. 18 is an example timing diagram for a superposition time division duplexed relaying (STDDR) relay scheme 1800. This method is an extension of the PTDDR protocol described above. In accordance with this STDDR protocol, the BS 1810 schedules different WTRUs 1820 based on their needs and channel conditions. In this example, these schedules are communicated to the WTRU 1820 either directly or through a relay 1830. As described above, the TTIs are split in two phases. In Phase 1 1840, the BS 1810 simultaneously transmits to the relays and to the WTRUs 1820 directly using superposition coding. Resources, such as power, may be shared either equally or according to known power allocation algorithms. In the second phase 1850, relays 1830 may take over part of the communication to forward the data they received to their intended WTRUs 1820, while the BS 1810 continues to serve those WTRUs 1820 scheduled on the direct link at full power.

In accordance with this method, let $R_{B-R}^{S1}$ denote the achievable data rate between BS and RS, and $R_{B-U1}^{S1}$ denote the achievable data rate between BS and WTRU1 in Phase 1. In Phase 2, let $R_{B-U1}^{S2}$ denote the achievable data rate between the BS and WTRU1, and $R_{B-U2}^{S2}$ denote the achievable data rate between the RS and WTRU2. Thus, for WTRU1, $$\begin{cases} TP_{UE1}^S = \dfrac{R_{B-UE1}^{S1} T_1 + R_{B-UE1}^{S2} T_2}{T_1 + T_2} \\ R_{B-R}^{S1} T_1 = R_{R-U2}^{S2} T_2 \end{cases} \quad \text{Equation (35)}$$

and for WTRU2, $$\begin{cases} TP_{U2}^S = \dfrac{R_{B-R}^{S1} T_1}{T_1 + T_2} \\ R_{B-R}^{S1} T_1 = R_{R-U2}^{S2} T_2 \end{cases} \quad \text{Equation (36)}$$

FSTDDR Solutions

In another embodiment, a fountain & superposition coding time division duplexed relaying (FSTDDR) protocol may be used. In accordance with this method, FTDDR and STDDR are combined. By doing so, the WTRUs that do not need to be communicated through a relay are scheduled transmission at the start of the communication and therefore, do not wait for the relays to complete servicing. In addition, all data streams are fountain-type encoded, thus avoiding feedbacks.

Accordingly, assuming L relays, M WTRUs may be communicated through these relays, and N other WTRUs may be communicated directly. Communication in each TTI is performed in 2 phases as with STDDR. Communication through each relay is performed as in FTDDR. Thus, in Phase 1, relays and the N WTRUs are scheduled simultaneously, assuming a power sharing scenario. In Phase 2, relays schedule and serve the M WTRUs, while the other N WTRUs continue to be serviced by the BS at a higher power level.

For HARQ scheduling, communication through relays is scheduled as in FTDDR example discussed above. Direct communication is scheduled as a typical cellular system, e.g., HSDPA, and relays and WTRUs may be serviced on direct link are scheduled as in STDDR. Channel state feedback is not required with FTDDR, since the codes used are rateless. For ACK/NACK delivery, relays send only an ACK to the BS to allow further scheduling. The ACK/NACK is available at the BS only, which may be sent directly or forwarded via the relay by uplink, in which cases different ACK/NACKs may or may not be aggregated across WTRUs and TTIs.

Relay Protocol Architectures

The following example operations in the user plane may be used in single cell-single relay cooperation in both two-hop mode and diversity mode. In the two-hop mode a dedicated BS-RS channel may be used. Assume a single cell (i.e. single BS), M relays and multiple WTRUs. The relays are designed to improve the link quality between base station (BS) and users (WTRUs). Each WTRU is served by a single relay.

The BS treats the relay as a WTRU and communicates with it. The relay, on the other hand, acts as a BS towards the WTRU and conducts the communication. In order to describe the next level of communication actions, it is necessary to assume the protocol layers supported by the relay.

Consider the BS-side of the RS. Since this side simulates the WTRU, there are choices in terms of how much of the WTRU protocol stack is implemented. Following are various alternatives.

FIG. 19 shows a first alternative 1900. The BS-side of the relay 1910 implements the WTRU protocol stack up to the PHY level. The PHY processing at the RS may be performed in alternative ways. A first alternative, denoted amplify and forward (AF) relay, involves simple amplification at the RF level and forwarding. A second alternative is demodulate-remodulate-and-forward. In this alternative noise may be removed or suppressed but only in those cases when the link to the relay is of very high fidelity (i.e. a channel code is effectively not necessary). A third alternative is decode-reencode-and-forward (DF) relay. Here there is further processing of the signal such that the errors are corrected at the RS.

During the relaying process, the radio signal characteristics on the BS-RS link and the RS-WTRU link need not be the same. In a first option, the RS-WTRU link may use different frequencies or codes compared to the BS-RS link. In a second option, the modulations on the RS-WTRU link may be different from the modulation on the BS-RS link. In a third option, the error protection (i.e. detecting and/or correcting) codes may be different on the BS-RS and RS-WTRU links.

Another type of relaying technique may be called compress and forward (CF) relay. This technique requires that there is an alternate signal path between the BS and the WTRU, so that, for example in the downlink, the compressed signal sent from the relay can assist the direct signal from the BS. This configuration is addressed below in connection with diversity mode.

Figure 20:
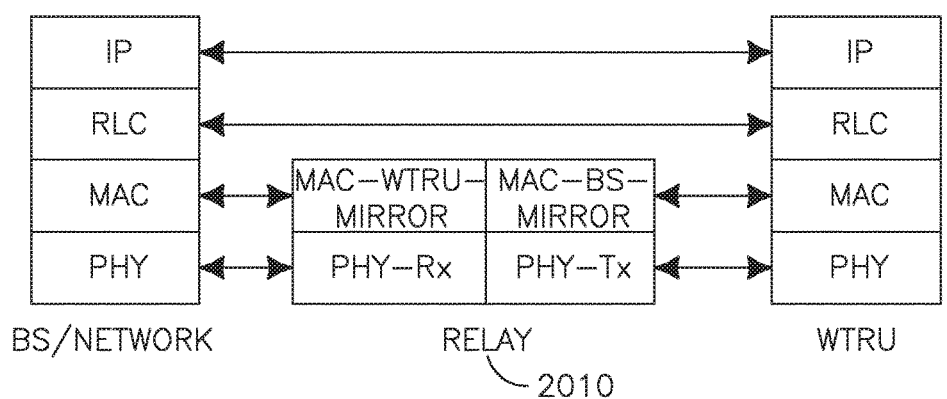
FIG. 20 is a diagram of a second alternative for implementing the WTRU protocol stack.

FIG. 20 shows a second alternative for implementing the WTRU protocol stack 2000. In this alternative, the BS-side of the relay 2010 implements the WTRU protocol stack up to the MAC level. This scheme provides flexibility in the allocation of resources on the BS-RS and RS-WTRU links, due to the incorporation of the MAC protocol in the RS. It also allows for HARQ schemes separately for retransmission of incorrectly received radio blocks between the BS-RS and RS-WTRU.

This example approach is highly transparent from a network/BS point of view, as well as the WTRU point of view. Impacts include a modification in the RLC protocol and an awareness on the part of the BS scheduler of the relay's DRX intervals.

The user-plane protocol stack in the relay (and therefore the complexity of the relay) is minimized. Beyond the necessary PHY-layer capabilities, the relay is required to maintain a "mirror" of the MAC for the WTRU (to emulate the WTRU in communicating with the BS) and a "mirror" of the MAC for the BS (to emulate the BS in communicating with the WTRU).

Figure 21:
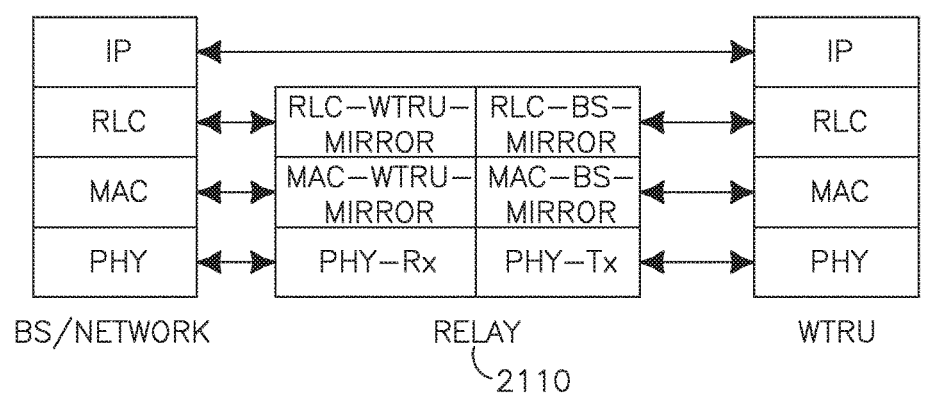
FIG. 21 is a diagram of a third alternative for implementing the WTRU protocol stack.

FIG. 21 show a third alternative for implementing the WTRU protocol stack 2100. In this alternative the BS-side of the relay 2110 implements the WTRU protocol stack up to the RLC level. This example allows for various radio link control (RLC) functions, such as link adaptation and retransmissions between the RS and the BS/WTRU.

The RLC protocol may be operating in any of acknowledged mode, unacknowledged mode, transparent mode or persistent mode. Furthermore, the modes of the RLC protocol between the BS and the RS and the RS and the WTRU may be different.

Figure 22:
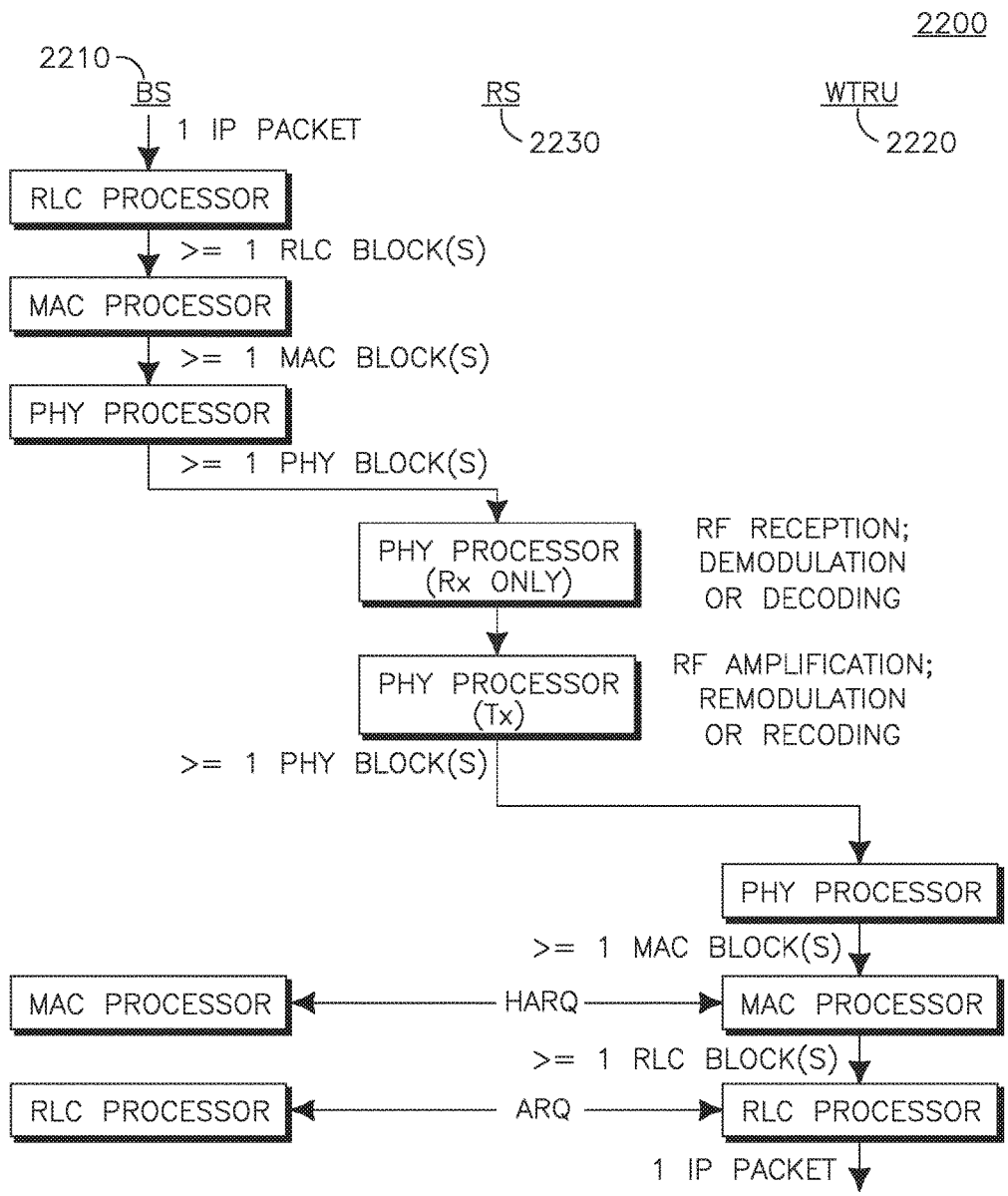
FIG. 22 is a flow diagram of the sequence of events involved in transferring an IP packet from the BS to the WTRU via the RS.
Figure 23:
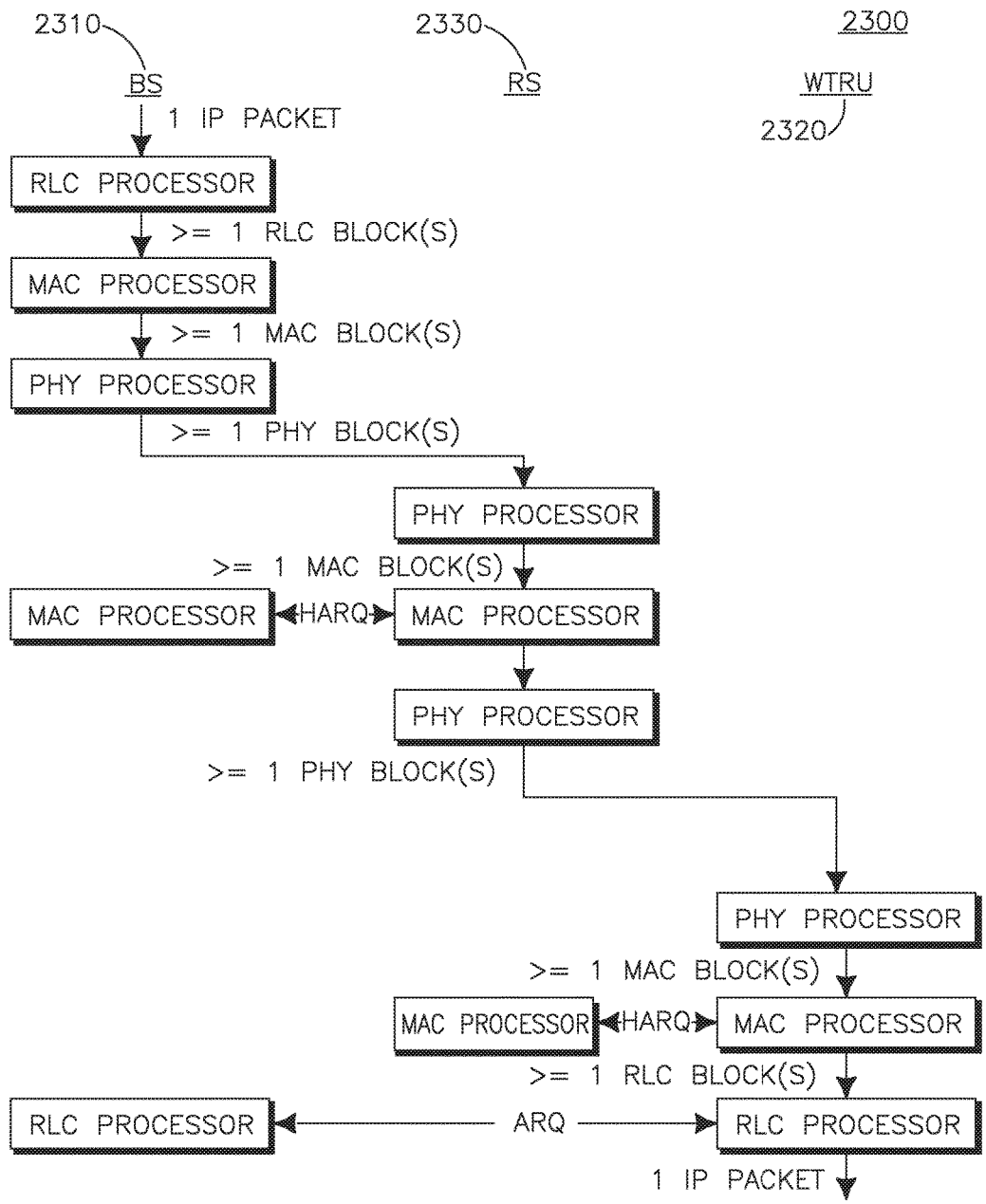
FIG. 23 is a flow diagram of the sequence of events involved for a MAC-level RS.

The transfer of data between the BS and the WTRU via the RS(s) is now described by considering the transport of a single IP block. FIGS. 21-23 are sequence diagrams showing various alternatives.

A first alternative is a PHY-level relay station. FIG. 22 illustrates the sequence of events 2200 involved in transferring an IP packet from the BS 2210 to the WTRU 2220 via the RS 2230. The RS 2220 is assumed to be a simple PHY-level variant of the amplify-and-forward or decode-and-forward type.

The PHY processing at the RS 2220 may be performed in alternative ways. A first way, denoted as amplify-and-forward (AF) relay involves simple amplification at the RF level and forwarding. A second way is demodulate-remodulate-and-forward. In this way, noise may be removed or suppressed but only in those cases when the link to the relay is of very high fidelity (i.e. a channel code is effectively not necessary). A third way is decode-reencode-and-forward (DF) relay. In this example, there is further processing of the signal such that the errors are corrected at the RS 2230. A fourth way is denoted an adaptive scheme. In this scheme, the relay can switch between any of the above three schemes adaptively. For example, if the relay successfully decodes the message, it applies the decode-and-forward scheme. Otherwise, it may apply any of the remaining schemes, for example, the AF scheme. Another example is that if the relay is heavily loaded, it may apply the AF scheme as it consumes less resources. Otherwise, it may apply any of the other schemes, such as the DF scheme.

During the relaying process, the radio signal characteristics on the BS-RS link and the RS-WTRU link need not be the same. In a first option the RS-WTRU link may use different frequencies or codes compared to the BS-RS link. In a second option the modulations on the RS-WTRU link may be different from the modulation on the BS-RS link. In a third option the error protection (i.e. detecting and/or correcting) codes may be different on the BS-RS and RS-WTRU links.

A second alternative for data transfer involves a MAC-level relay station. In this example, the BS treats the relay as the WTRU and schedules to it accordingly, however this "relay-WTRU" has DRX cycles that the BS is aware of.

An ACK from the relay-WTRU is treated as a MAC-level (HARQ) ACK by the BS. The relay-WTRU then acts as a BS for the WTRUs it communicates with. One specific problem is what to do if the relay has ACK'ed a packet to the BS, but is unsuccessful in delivering it to the WTRU.

One example of a general strategy that addresses this problem is as follows. The relay (acting as a BS) attempts to deliver the packet a few more times, as per a MAC (HARQ) protocol. At some point, though, the relay has to give up. The relay cannot perform HARQ-NACK anymore since it has already ACK'ed (pretending to be the WTRU). So the NACK, if needed, has to take place at the RLC level. The WTRUs RLC is likely to do this already, provided that the RLC is running in an acknowledged mode. Addressing the problem of the impossible MAC NACK cannot be effectively addressed by delaying the MAC-level ACK. If such a delay occurs, in principle, the relay could ask the BS for a re-transmission. Such a re-transmission however, would contain nothing but the data which the relay already possesses, therefore there is no reason to ask for it. In this example, the relay could just delay its HARQ time-out.

If the RLC is in an unacknowledged mode the packet is considered lost, which is acceptable (by definition of the unacknowledged mode). However, the network's RLC may need to be modified such that it is aware that a MAC-layer ACK is no longer an indication that a packet has indeed been delivered.

FIG. 23 is a diagram of an example illustrating the sequence of events 2300 involved for a MAC-level RS. FIG. 23 shown does not address the problem of potential buffer overflows at the relay's MAC. Specifically, because the BS 2310 does not know when the relay has successfully (or un-successfully) forwarded the data to the WTRU 2320, it may attempt to push more data than the RS's buffer can handle. To prevent this, one or more of the following options may be used. These options are not exclusive and may be combined.

In a first embodiment, the BS 2310 autonomously maintains an estimate as to the state of the relay buffer by knowing the maximal number of attempts the RS 2330 makes to transmit data and how long it takes. It can also take into account the average time to deliver packets from the RS 2330 to the WTRU 2320, which can be periodically updated by the relay.

In a second embodiment, the RS 2330 periodically communicates buffer occupancy status to the BS 2310. This may be performed by introducing a new MAC-level feedback signaling. This feedback signaling may be combined with other RS MAC-level feedback into a relay feedback channel (RFCH).

In a third embodiment, the RS 2330 incorporates buffer occupancy status into the feedback (together with, e.g. channel state information) that the BS 2310 uses to schedule its transmissions. There are a number of options to do so. Frequently, standards provide a method for the WTRU 2320 to report its ability to receive data via channel quality indicators (CQIs). Such information may also be provided by the RS 2330 to the BS 2310. By artificially reducing CQI, the RS 2330 may reduce the amount of data it receives, although in this case the BS 2310 never actually knows whether the reduction is due to buffer occupancy issues or channel conditions.

In a fourth embodiment, if its buffer is full, the RS 2330 responds with a special "buffer full" NACK whenever the BS 2310 attempts to push data to it. This is performed at the time of first BS-to-relay attempt and prevents the BS 2310 from re-transmitting until either a specified back-off time period has elapsed, or the relay issues a special data request communication to the BS 2310, or a free buffer is reported above.

A fifth embodiment, similar to the fourth, is to have a special ACK that indicates that the buffer is almost full. In this example, the RS 2330 will accept this packet, but not the next one. The BS 2310 behavior is then similar to above—it can back off and/or wait for the RS 2330 to report that its buffer is OK.

A sixth embodiment introduces a delayed secondary ACK/NACK from the RS 2330 to the BS 2310 that may report to the BS 2310 when a delivery of particular packet to the WTRU 2320 succeeded or was abandoned. This allows the BS 2310 to maintain the state of the relay buffer and schedule accordingly.

Figure 24A:
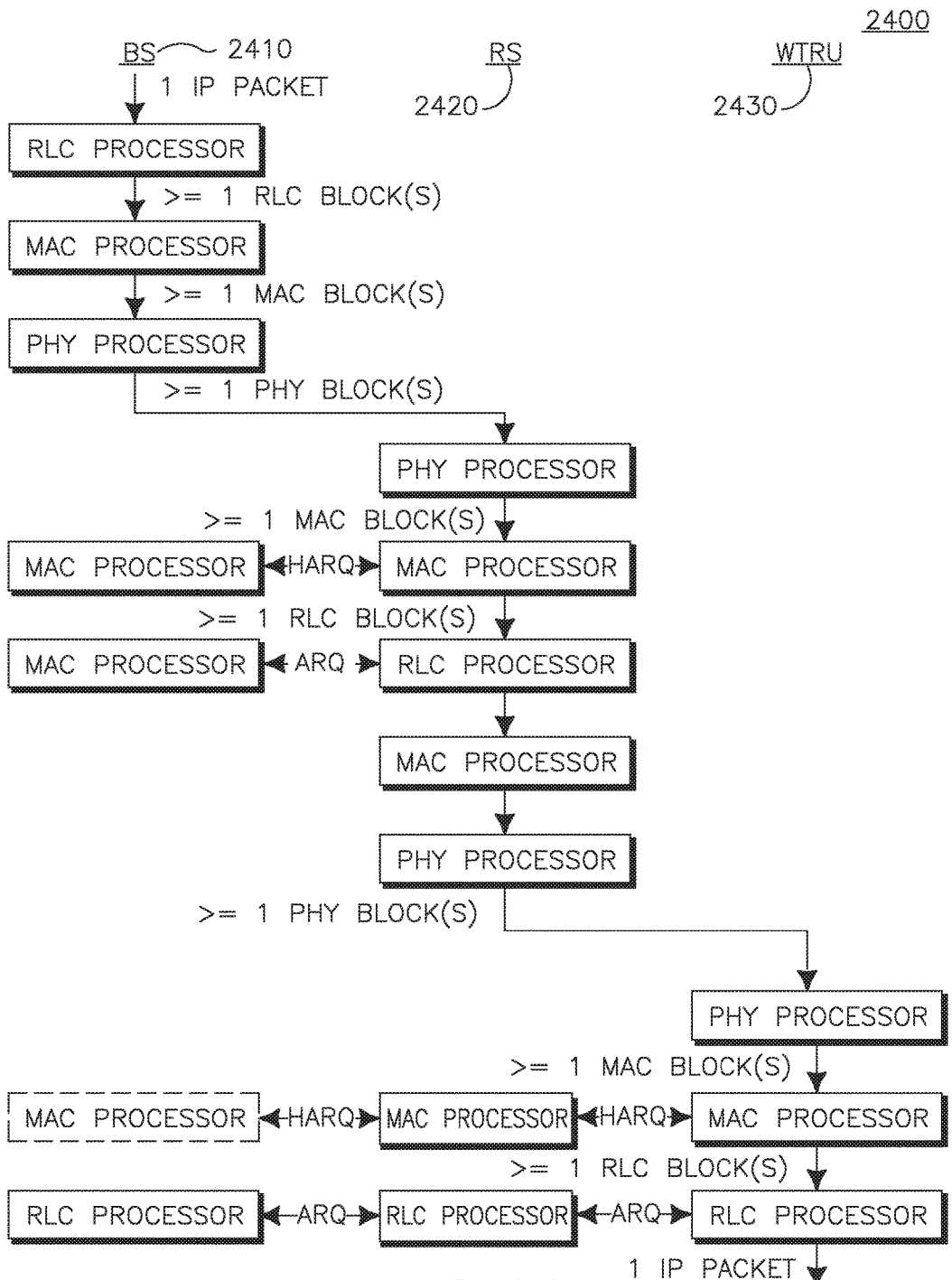
FIGS. 24a and 24b are diagrams of alternate embodiments for data transfer using an RLC-level RS.
Figure 24B:
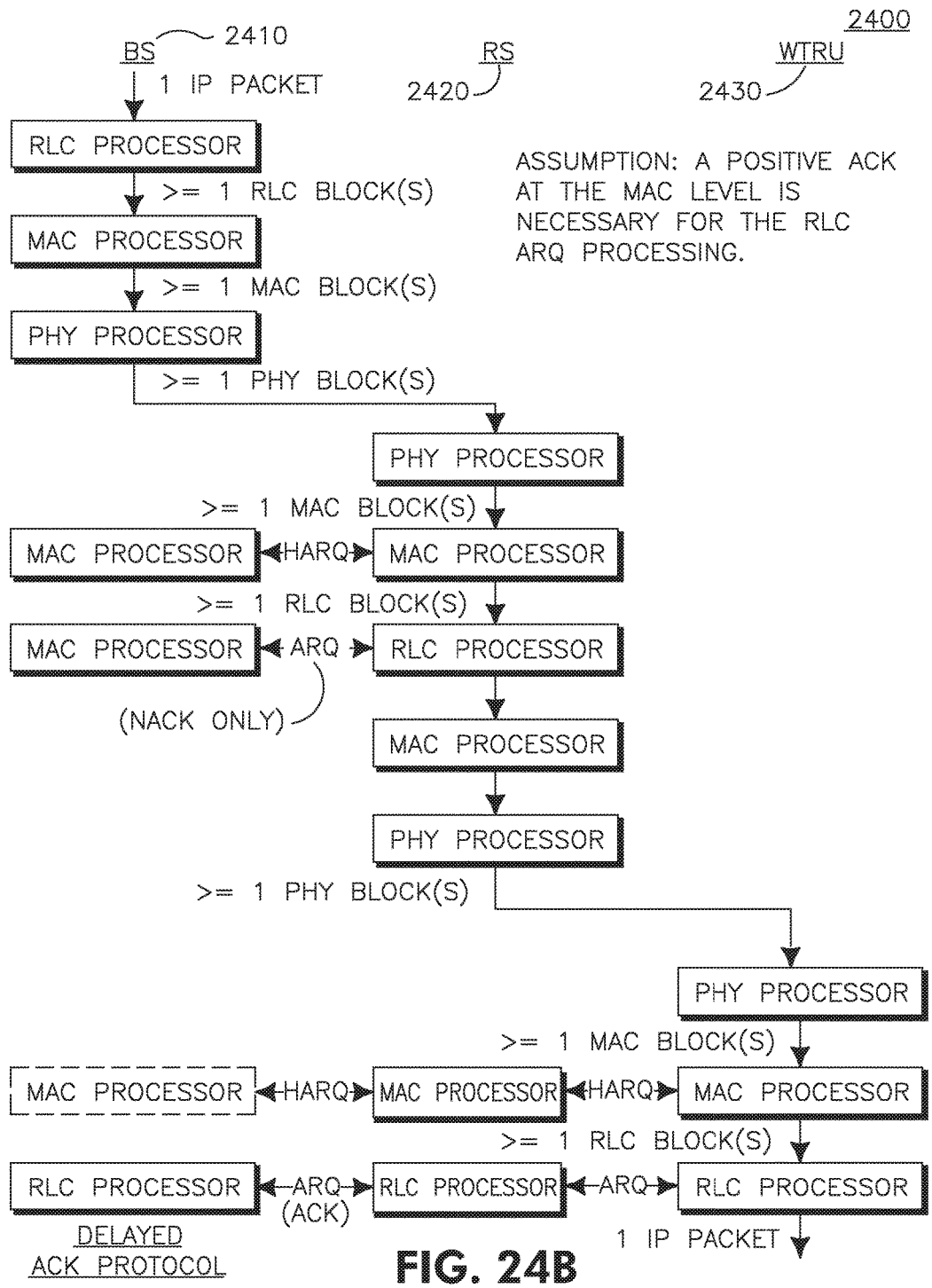

A third alternative for data transfer involves an RLC-level RS. FIGS. 24a and 24b illustrate the sequences of events 2400 involved in this alternative. As shown in FIGS. 24a and 24b, the RS receives (and if necessary, acknowledges) the data packet before forwarding it to the WTRU. The BS considers this delivered and the RS is then responsible for the delivery to the WTRU. No fallback mechanism is provided, nor is needed. However, because of the RLC-level operation, the delay associated with this process may be significantly larger than the delay associated with MAC-level relaying.

RS-WTRU Channel

Figure 25:
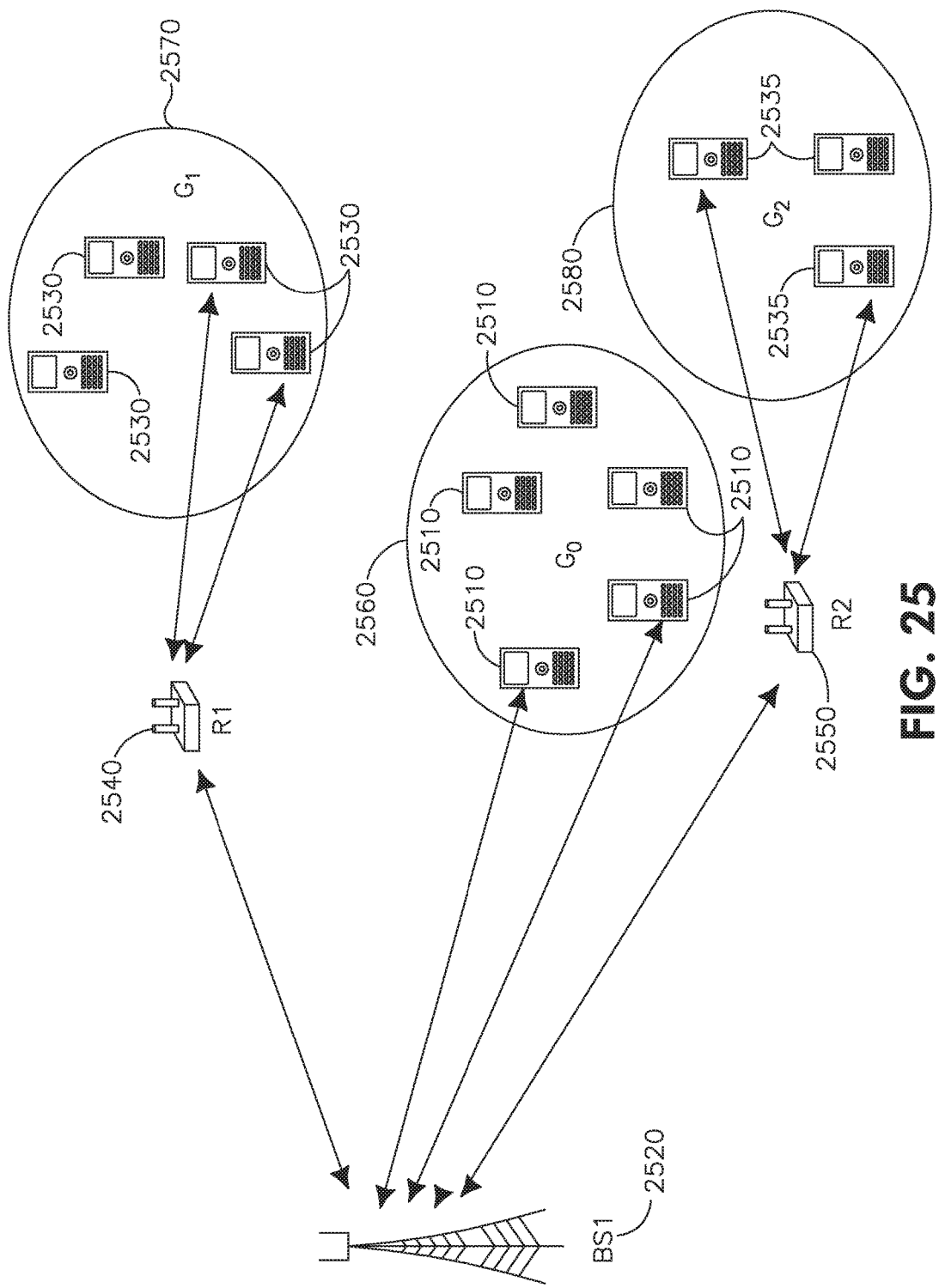
FIG. 25 is a diagram of operations in the user plane in two-hop mode.

To understand how WTRU assignment to relays is performed in two-hop mode, the use of a dedicated RS-WTRU channel is now considered. Again, assume a single cell (i.e. single BS 2410), M RSs 2420 and multiple WTRUs 2430. The RSs 2420 are designed to improve the link quality between the BS 2410 and the users (WTRUs 2430). The WTRUs 2430 are divided into two categories. One category includes those WTRUs 2430 that are connected to the BS 2410 and can communicate with the BS 2410 without any assistance from a RS 2420. The other category includes those WTRUs 2430 that are disadvantaged in their connectivity to the BS 2410 and require the assistance of the RS 2420. Furthermore, it is assumed that each WTRU 2430 is associated with only a single RS 2420 at any given time. Since there are M RSs 2420, we can now define (M+1) WTRU groups $\{G_m, m=0, 1 \ldots M\}$, as shown in FIG. 25.

WTRUs 2510 belonging to group $G_0$ communicate directly with the BS 2520, whereas the WTRUs 2530, 2535 belonging to group $G_m$ communicate with the BS 2520 via RS in 2540, 2550. For example, in the downlink, the packets sent to the WTRUs in group 0 2560 follow the regular direct transmission, which is from the BS 2520 to the WTRUs 2510. Similarly, the packets sent to the WTRUs 2530, 2535 in groups 1, . . . , M need to go through a two-hop route, which is from the BS 2520 to the RS 2540, 2550 and the RS 2540, 2550 to the WTRU 2530, 2535.

Which group each WTRU is in may be determined by different alternative criteria. According to a first criterion, WTRUs in cell center belong to Group 0 2560, while the WTRUs at the cell edge belong to Group 1, . . . M 2570, 2580. The cell edge/cell center differentiation may be made using one of the following techniques (or other methods): at the base station, using round-trip time delay to/from the WTRU as evaluated during connection setup or while the connection is on-going. Such a delay may be evaluated because the WTRU in any system is required to synchronize its transmission to a predefined BS signal in a predefined way. The BS may then measure how out-of-sync the signal received from the WTRU is, such that the delay must be due to the round-trip delay. If the BS has issued timing adjustment commands to the WTRU, these are taken into account as well. At the WTRU, using estimated path loss, which may be computed by taking the difference between the received BS power on some reference channel for which the transmitted power is signaled (most systems include at least one such channel). The cell edge/cell center differentiation may also be made using an auxiliary location estimation device, such as GPS.

According to a second criterion the RS 2540, 2550 may monitor the communication between the WTRU 2530, 2535 and the BS 2520 as well as the channel metrics they report to each other. The RS 2540, 2550 compares these metrics to its own observations of the relative channels and determines which WTRUs 2530, 2535 would benefit from communicating indirectly through itself. The RS 2540, 2550 then manages the indirect connection setup.

According to a third criterion, the RS 2540, 2550 periodically sends out a beacon signal which permits the WTRUs 2530, 2535 to determine whether they would benefit from using the relay and communicates this information to the BS 2520. The WTRUs may send a response to the beacons signals.

According to a fourth criterion, the WTRU 2530, 2535 periodically updates its location (or other CELL_DCH and CELL_FACH signaling are used). The RS 2540, 2550 and BS 2520 may determine which group the WTRU 2530, 2535 belongs to after they exchange their respective information on WTRU's location or signaling.

Another technical issue is how handovers are executed as a WTRU comes into the coverage region of a RS, moves out of the RS coverage region into the coverage region of another RS, or to the coverage region of the BS. Due to the WTRU's mobility, there is a need to enable changing the WTRU group dynamically (a sort of intra-cell inter-relay handover). Possible signaling strategies for enabling this are described in the examples below.

Pooled Relay Transmissions

In some instances it may be beneficial for the BS to treat the RS 2540, 2550 as a super-WTRU by pooling transmissions for all WTRUs associated with the RS. In this case, both the network and the WTRUs must be aware that there is a RS (thus, it is not transparent)—and which WTRUs (or more specifically, which RNTI's—there may be several per WTRU and also common/shared ones) the relay handles. The network/BS pools these into a single transmission, thus utilizing air interface more efficiently and lets the relay break them up.

To enable a pooled-relay transmission, additional and/or modified functionalities are required compared to a standard BS MAC. These include an RNTI pool manager, a MAC buffer manager, and modified scheduler. An RNTI pool manager entity maintains the RNTI groups and associations between the actual RNTIs and the group RNTI allocated for the purposes of communication with the relay. The MAC SDU arrive at the MAC associated with each individual data stream (each RNTI), however these need to be multiplexed into the common stream by a MAC buffer manager.

To affect the best possible operation, it may be necessary to provide a scheduling preference to the grouped transmission to the relay. The amount of preference is likely to depend on how many individual data streams are grouped into the relay. A modified scheduler needs to be able to take all of this information into account. Because there is no 1-1 correspondence between the BS-RS physical resources (shared) and RS-WTRU physical resources (dedicated), PHY-level cooperation is not feasible in this case.

On the other hand, RLC-level resources are likely to remain dedicated even if they are mapped to a shared physical resource (witness, e.g. HSPA in WCDMA). Therefore, RLC-level cooperation is also not likely to change from the previous case, provided that the MAC operation is well defined.

Figure 26:
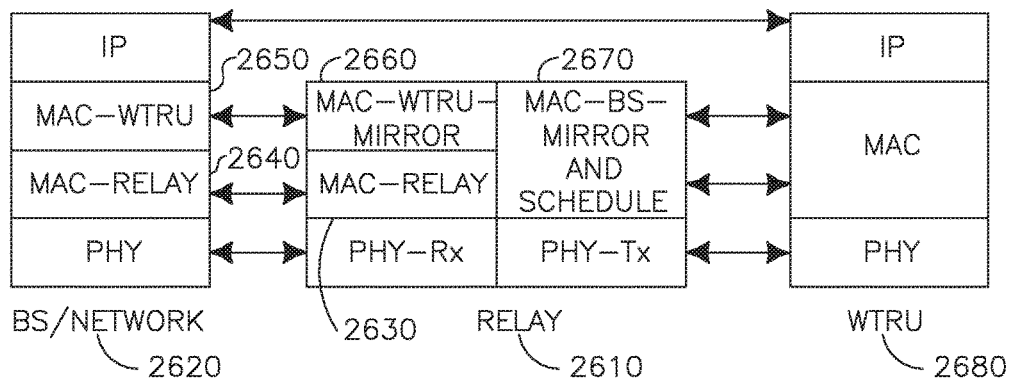
FIG. 26 is an example diagram of a MAC-relay sublayer of the MAC situated between the RS and the BS.

FIG. 26 is an example diagram of a MAC-relay sublayer of the MAC 2600 situated between the RS 2610 and the BS 2620. This layer handles transmissions of the data on the grouped RNTI. The HARQ responses can be handled in alternative ways. In a first alternative a single ACK/NACK is generated by MAC-relay 2630 at the RS 2610. This is interpreted as an ACK/NACK for all data included in the HARQ TTI and passed by a MAC-relay 2640 to a MAC-WTRU 2650 in the BS/network 2620. In a second alternative, a separate ACK/NACK is generated for each data packet. This is also passed by a MAC-relay 2640 to a MAC-WTRU 2650 in the BS/network 2620. In both cases the MAC-WTRU-mirror 2660 in the relay is effectively transparent, it performs virtually no tasks.

On the transmit side, the RS 2610 now includes a more complex MAC entity 2670 which may perform a number of tasks. It may schedule transmissions for RSs within a group. It may continue to schedule transmission for relays between groups as before. It may maintain HARQ with the WTRU 2680 (i.e. ACK/NACK exchange). The above protocol stack architecture can be extended to multi-hop relaying case. The data transfer operation in this example is the same as in the case of matched BS-RS and RS-WTRU resources. This was considered above.

The use of shared RS-WTRU channels is now described. If the RS-WTRU channel is shared then the situation is similar to either the dedicated BS-RS or dedicated RS-WTRU resource case (if the sharing is the same across both hops). Alternatively, scenarios where the sharing strategies are not the same would result in operation similar to the example where the BS-RS link is shared and the RS-WTRU link is dedicated.

User plane system operations in diversity mode are disclosed in the following. Considered first is dedicated BS-RS channels. In this mode, all WTRUs may dynamically switch its connection with the relay or the BS. The WTRUs may be also linked to the BS and the RS simultaneously, such that cooperative transmitter diversity is obtained. Since the WTRUs in such a mode have more flexibility and the connections between the BS and the WTRU and the BS and the RS are more dynamic, the scheduling algorithm and system set up becomes more complicated. In particular, it is no longer possible for the RS to simply mirror the BS for the WTRU and the WTRU for the BS. The WTRU and the BS must be directly aware of each other as well as of the RS.

As in the case of a two-hop operation, the RS protocol stack must be considered. The system operation will be defined based on the RS protocol stack, which can terminate at the PHY, the MAC or the RLC layer.

Figure 27:
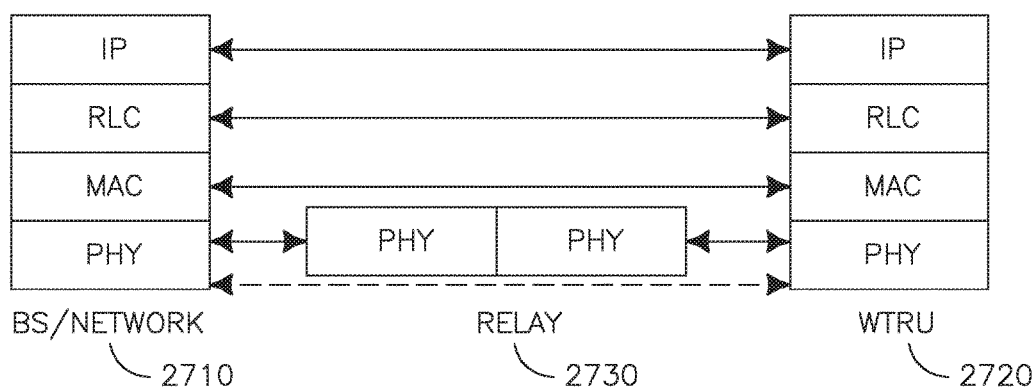
FIG. 27 is diagram of an example protocol architecture for a PHY-level RS.

FIG. 27 is diagram of an example protocol architecture for a PHY-level RS 2700. The dotted line indicates a direct connection between the BS 2710 and the WTRU 2720. The PHY-relay operation only depends on the transport format of PHY messages and L1 control (e.g. TPC). The protocol layers at the MAC and higher levels are unchanged at the BS and the WTRU.

This example represents a RS 2730. Such a RS assists in the data transmission, but is not able to make any decision itself. The PHY processing at the RS 2730 may be performed in alternative ways.

A first alternative, denoted amplify & forward (AF) relay involves simple amplification at the RF level and forwarding. A second alternative is demodulate-remodulate and forward. In this alternative noise may be removed or suppressed but only in those cases when the link to the relay is of very high fidelity (i.e. a channel code is effectively not necessary). A third alternative is decode-reencode-and-forward (DF) relay. Here there is further processing of the signal such that the errors are corrected at the RS. A fourth alternative is compress-and-forward. Such a method may be used when the link to the relay is poor and data cannot be demodulated even using a channel code. However, partial information about the data may still be obtained through the design of appropriate codes. This partial (i.e. "compressed") information is forwarded by the relay to the destination.

A fifth alternative is Adaptive scheme. In this scheme, the relay can switch between any of the above four schemes adaptively. For example, if the relay successfully decodes the message, it applies the decode-and-forward scheme. Otherwise, it may apply any of the remaining schemes, for example, the amplify-and-forward scheme. Another example is that if relay is heavily loaded, it may apply the amplify-and-forward scheme as it consumes less resources. Otherwise, it may apply any of the other schemes, such as the decode-and-forward scheme.

During the relaying process, the radio signal characteristics on the BS-RS link and the RS-WTRU link need not be the same. In a first option, the RS-WTRU link may use different frequencies or codes compared to the BS-RS link. In a second option, the modulations on the RS-WTRU link may be different from the modulation on the BS-RS link. Finally, in a third option, the error protection (i.e. detecting and/or correcting) codes may be different on the BS-RS and RS-WTRU links.

Figure 28:
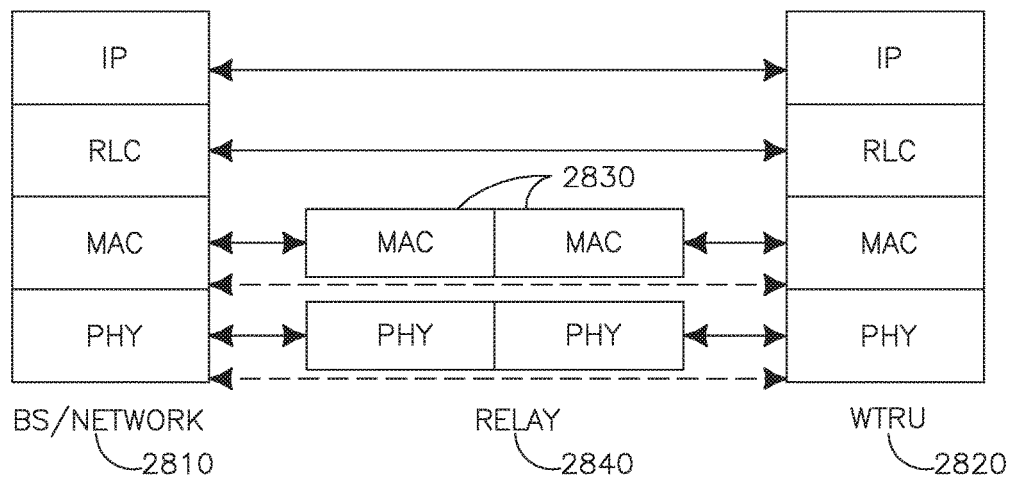
FIG. 28 is a diagram of an example protocol architecture for a MAC-level RS.

FIG. 28 is a diagram of an example protocol architecture for a MAC-level RS 2800. The dotted line indicates the direct connection between the BS 2810 and the WTRU 2820. As in the two hop-case, the introduction of the MAC 2830 in the RS 2840 allows the RS 2840 to participate in the HARQ operation of the system, potentially handle the retransmissions, etc. This flexibility allows for tremendous potential in improving the overall system operation, as will be described when system operation is discussed. For now, it is noted that the usage of the RS MAC 2830 as a mirror is no longer possible.

Figure 29:
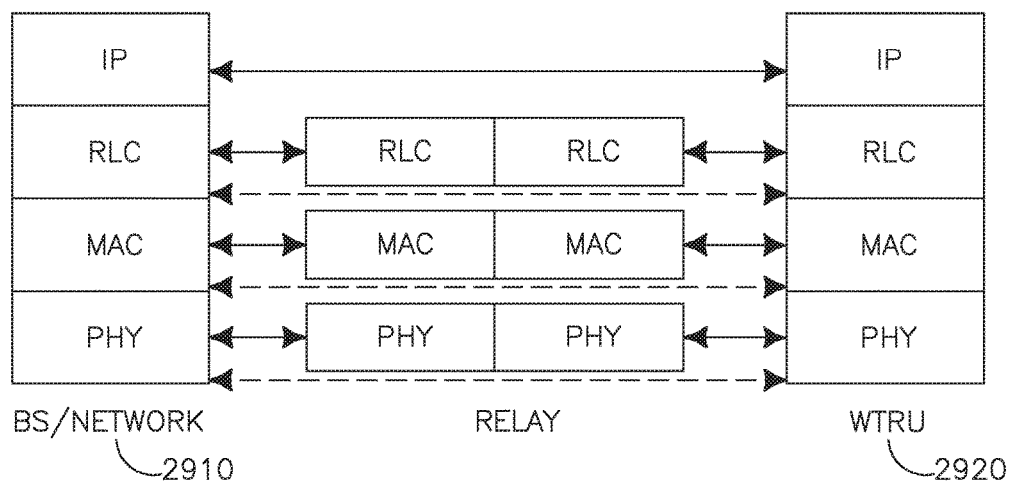
FIG. 29 is a diagram of an example protocol architecture for a RLC-level RS.

FIG. 29 is a diagram of an example protocol architecture for a RLC-level RS 2900. The dotted line indicates the direct connection between the BS 2910 and the WTRU 2920.

Now that the various physical architectures, protocol architectures as well as radio channels have been delineated, the transfer of data between the BS and the WTRU via the RS(s) may be described. The transport of a single IP block will be considered, as above.

Figure 30:
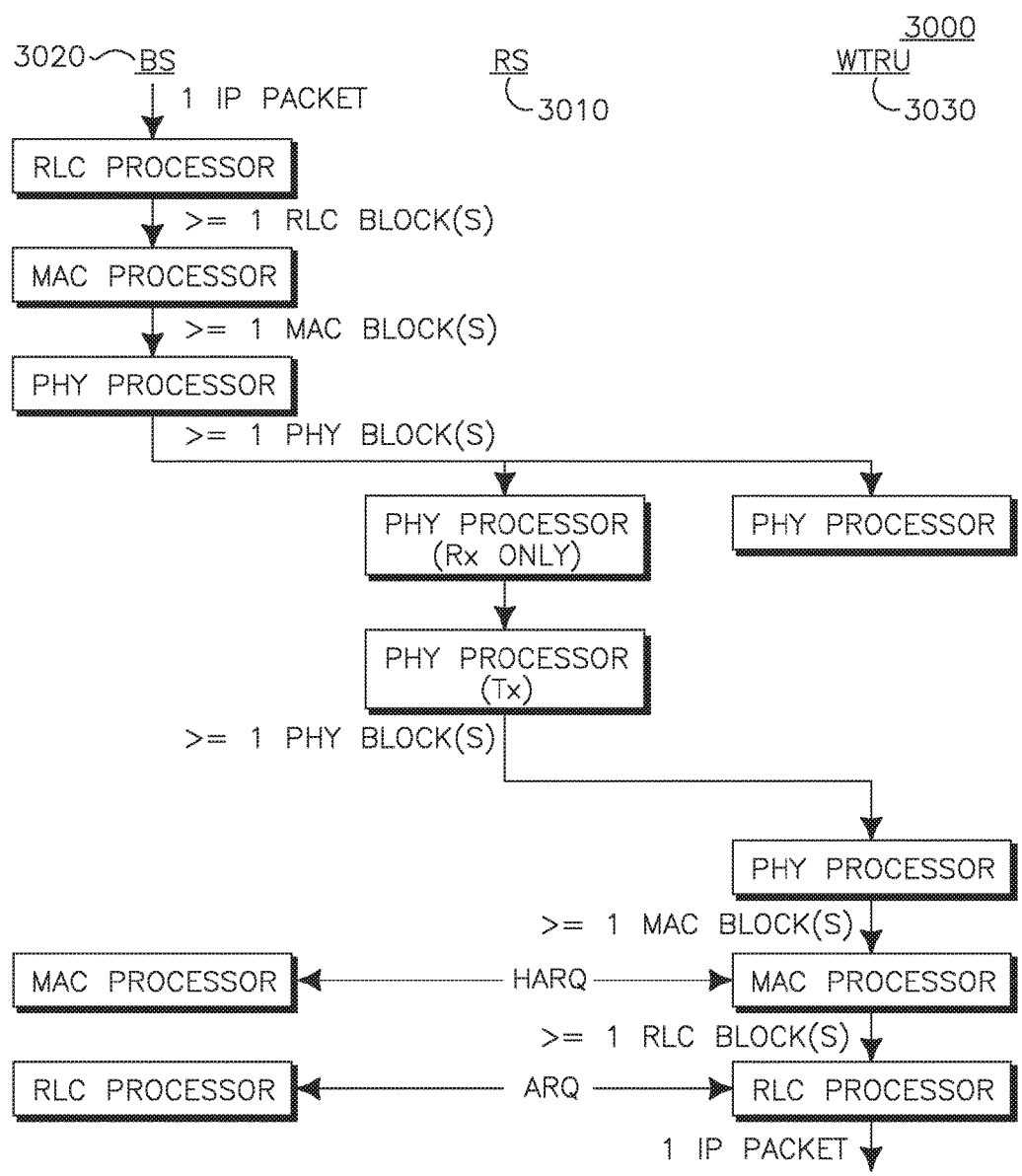
FIG. 30 is a diagram of the sequence of events involved in transferring an IP packet from the BS to the WTRU via the RS.

FIG. 30 is a diagram of the sequence of events 3000 involved in transferring an IP packet from the BS to the WTRU via the RS. The RS 3010 is assumed to be a simple PHY-level using any of the techniques described above. The approach shown applies to the decode-and-forward and demodulate-and-forward approaches. In the case of compress-and-forward and amplify-and-forward, the RS 3010 may continue to receive successive refinements of the packet and transmit these (alternating receiver and transmit operations) until the transmissions is complete (i.e. until the BS 3020 stops sending data).

Scheduling options include the following. In an example where the RS 3010 must decode or demodulate a signal before any transmissions (i.e. excellent assurance of data before any transmission), it may be scheduled by the BS 3120 to transmit in the same TTIs as the BS 3020 or in different TTIs. In either case, since the WTRU 3030 ceases reception of this particular packet, it needs to know when to stop transmission. This may be done in one of the following alternative ways.

In a first alternative, the actual transmissions are scheduled directly by the BS 3020 using a side control channel (which the RS 3010 must receive). In a second alternative, the RS 3010 continues to monitor for re-transmissions, even if it no longer needs them. This carries minimal control overhead, but since the RS 3010 is assumed to be half-duplex, it prevents operation where the BS 3020 and the RS 3010 send in the same TTI using the same RRU. In a third alternative, a PHY-layer control signal is used whereby the BS 3020 notifies the RSs 3010 which packets it is still actively transmitting or when it has stopped transmitting packets. This alternative carries some signaling overhead, but retains full flexibility in scheduling the RS's 3010 RRUs (e.g. to overlap with the BS 3020).

In the case when the RS 3010 is capable of switching between transmit and receive operations dynamically, the options above are still viable. The difference is that now the RS 3010 has several options as to when to start transmitting.

As a first option, if it waits until it has successfully decoded information, the situation is the same as described for the two-hop operation, therefore only cases when relay starts transmitting before full information is available are considered further. As a second option, it can transmit something (what specifically depends on the protocol) after each BS transmission, until it successfully decodes data, at which point it continues transmit only (no receive) until it has stop, as in the decode-and-forward case above. As a third option, alternatively, the relay waits until its accumulated information is above some quality threshold or it has received at least some minimal number of transmissions from the BS.

The MAC level cooperation will now be considered. Given a relay with a PHY+MAC layers, two fundamentally different approaches to cooperative technique may be considered that have to do with how the relay is controlled by the BS. In one case, the BS is not aware of the detailed relay operation and does not apply fine control, and in the other it does. Because the BS transmission is always available, the relaying protocol maybe based either on the decode-and-forward (DF) or compress-and-forward (CF) approach.

Figure 31:
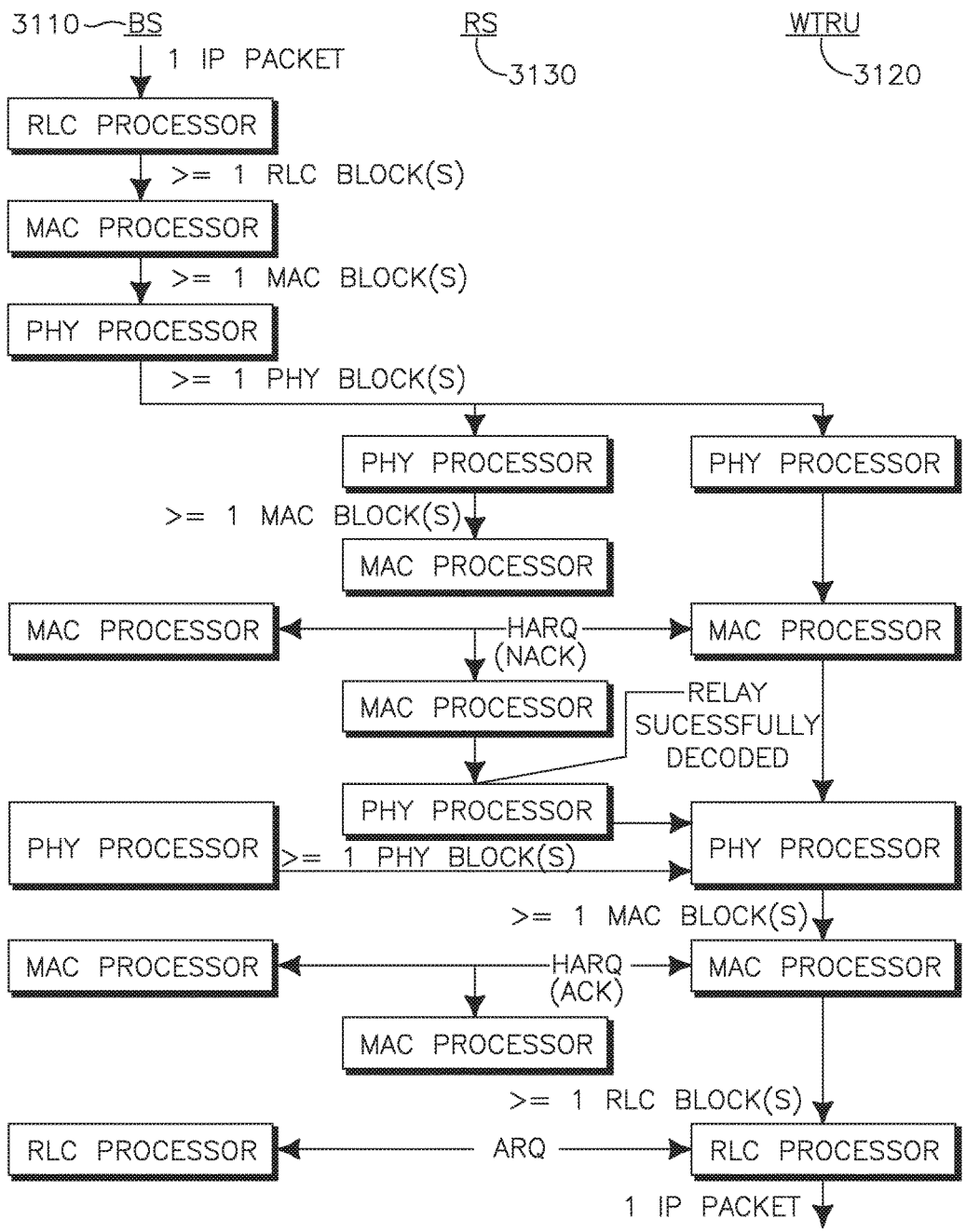
FIG. 31 is a flow diagram of the data transfer operation when the BS is not aware of the detailed relay operation.

In the case when the BS is not aware of the detailed relay operation, the data transfer operates as shown in FIG. 31. The BS 3110 continues sending packets to the WTRUs 3120 until an ACK is received from the WTRU 3120 or the maximum number of transmission times is exceeded. A RS 3130 may join the transmission when it is ready (which depends on whether it is doing CF or DF) and if the WTRU 3120 sends a NACK to the BS 3110. Therefore, in this mode, cooperative transmitter diversity is activated no earlier then for the first re-transmission, and only if the channel to the RS 3130 is truly better, then to the WTRU 3120 (thus allowing the WTRU 3120 to receive the data first).

A key factor in this case is the definition of a RS 3130 being "READY to transmit." If DF is used, this means that the relay has successfully decoded the BS transmission. If CF is used, this means that the relay has accumulated sufficient amount of information about BS transmission to pass some pre-defined threshold.

Two approaches to using a relay without detailed BS control may be defined. In a first approach, called smart relay, every frame includes certain dispersed RRU which are reserved for RSs 3130. Beyond this pre-allocation, the BS 3110 does not know what the RSs 3130 will do with these. A RS 3130 determines which WTRUs are in its "assist set", i.e. whether the BS 3110 can process the CQI information to determine which WTRUs 3120 are in assist set and signal that information to the RS 3130.

Figure 32:
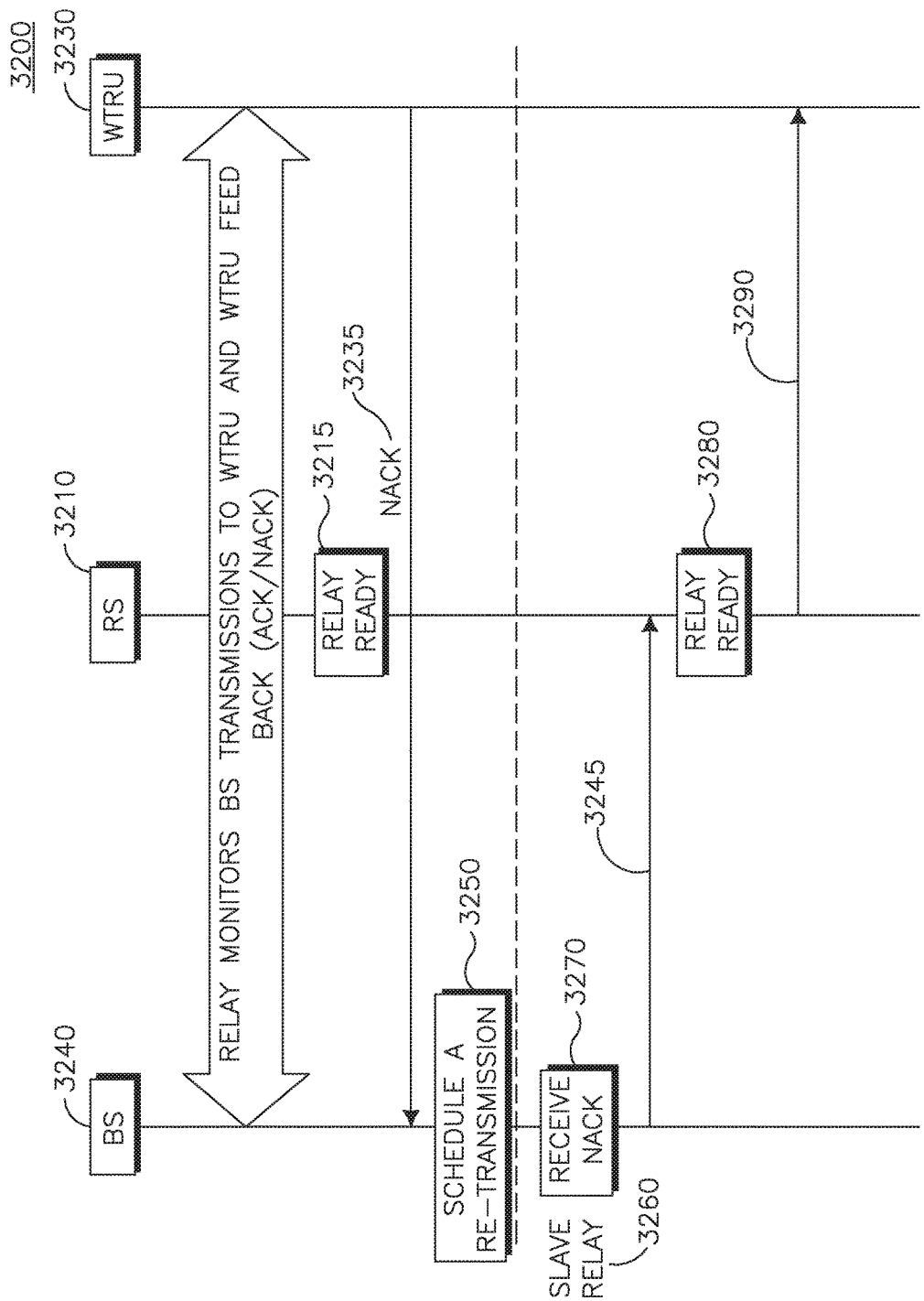
FIG. 32 is a diagram of example signal flows for a smart relay and a slave relay.

FIG. 32 is a diagram illustrating example signal flows 3200 for a smart relay and a slave relay. Referring to FIG. 32, the smart RS 3210 monitors the BS transmissions to these WTRUs 3220. It also monitors the WTRU feedback 3220 (ACK/NACK). Once the RS 3210 is READY 3215 and the WTRU 3230 sends a NACK 3235 (which goes to the BS 3240, but the RS 3210 sees it) it will schedule a re-transmission 3250 to the WTRU 3230. The retransmissions are scheduled slots (as well as other physical resources, such as channelization codes and/or sub-carriers) that are either a) previously assigned by the BS to the RS for transmissions to the WTRU of b) chosen from a set of slots that the relay is allowed to use to schedule to any of the WTRUs that are associated with it. The BS 3240 will in general be aware of the rules that the RS 3210 uses—thus it can estimate which WTRUs 3230 should be in which RS's 3210 "assist set," and make its retransmission decision accordingly (i.e. schedule re-transmissions less frequently hoping the relay will pick up the load. Alternately, the RS 3210 can explicitly signal to the BS 3240 the WTRUs 3230 it is currently assisting or plan to assist in future). A WTRU 3230 that is being assisted is signaled by the RS 3210 with its index. In this way, the WTRU 3230 may switch its receiver operation to support cooperative transmission from this WTRU 3230.

In a second approach, called slave relay 3260, only after BS 3240 gets NACK 3270 from WTRUs 3230 in assist set (similar to Approach 1, BS can base on CQI information to determine which WTRUs are in assist set), the BS 3240 signals 3245 to RS 3210. When READY 3280, RS 3210 begins transmissions 3290 to the WTRU 3230. It continues until signaled to stop. With such an approach, RS 3210 does not need to detect/share the ACK/NACK information sent from the WTRU 3230 to the BS 3240.

Now considered is an example MAC-level cooperation with fine control from the BSs. In this mode of operation, a two-level HARQ is required (between WTRU and BS and between relay and BS). Using a DF or a CF communication scheme, the relay informs the BS when it is ready using a special relay ACK (RAC), which is associated with a particular HARQ process. At this point, the BS uses direct signaling to tell the relay which packets should be transmitted in which RRUs. The scheduling may be performed for each transmission or in bulk (i.e. "until success or timeout"). If it is performed in bulk, the relay may be instructed to stop by the BS, or it may be told to monitor ACK/NACK from WTRU and stop when an ACK is detected. The BS may use any of the following methods to schedule relay transmissions. The first method maximizes MIMO effectiveness by scheduling transmissions in the same RRUs. The second method maximizes time diversity/minimizes interference by scheduling transmissions in different RRUs.

Now considered are WTRU-controlled adaptive NACK transmissions. In this scheme, the WTRU keeps track of the quality of the WTRU-BS and WTRU-RS channels and selectively sends NACK transmissions to either RS or BS or both.

The selection criterion may be, for example, based on the channel quality of the respective channels. That is, the WTRU may select to send the NACK to the network node that is estimated to have a higher probability of successful retransmission.

The selective transmission may be performed at the PHY level or higher levels. At the PHY level, directive antennas at the WTRU may be used to selectively send the NACK transmission to the RS or the BS. At higher levels, the NACK message may contain an identifier, which identifies the message as being meant for the RS or the BS. Non-selective transmission are achieved with omni-antennas (or broad-beamed antennas) at the PHY level and as broadcast messages at higher levels.

Now considered are control plane system operations. The key control-plane operation which must be addressed in the context of a Mode A relay configuration is that of mobility management, i.e. the management of the mobility of a WTRU between different relay groups, including group 0 (no relay in use).

As discussed above, the measurement associated with allocating a WTRU to a particular relay group may be performed in different places in the cell, such as at the WTRU, at the relay or at the BS. A combination of these may be used.

These measurements are provided to the BS/networks irrespective of where the measurements are performed. Based on these measurements, the BS (likely the BS and not the network) allocates the WTRU to a specific relay group and forwards the appropriate command to the relays involved (the originating and receiving relay) and the WTRU. In fact, from a control point of view the BS acts as an RNC in the modern WCDMA system while relays act as BSs. Such an operation necessitates the following changes to the control-plane access stratum protocol stack.

Figure 33A:
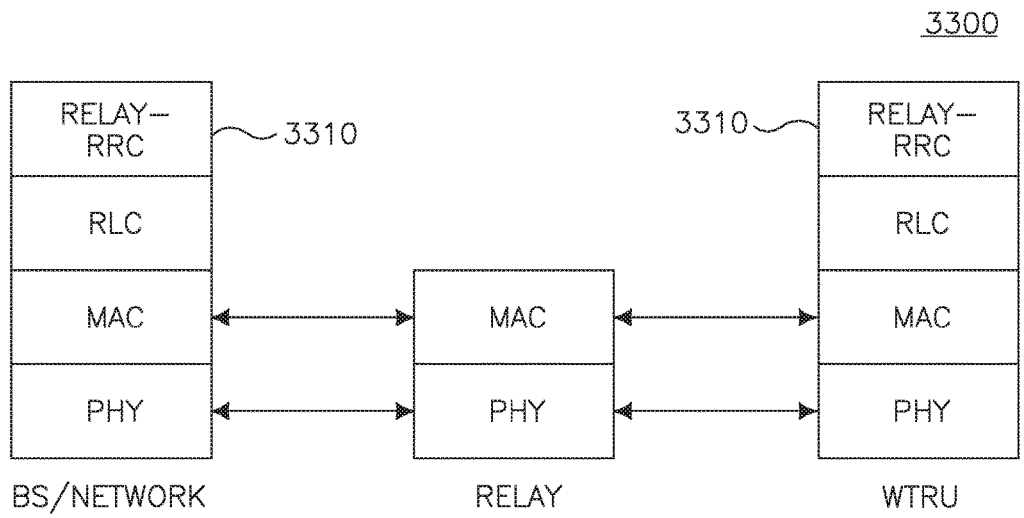
FIGS. 33a and 33b are diagrams of example protocol architectures where the BS and the relay contain a layer 2 contour plane entity.
Figure 33B:
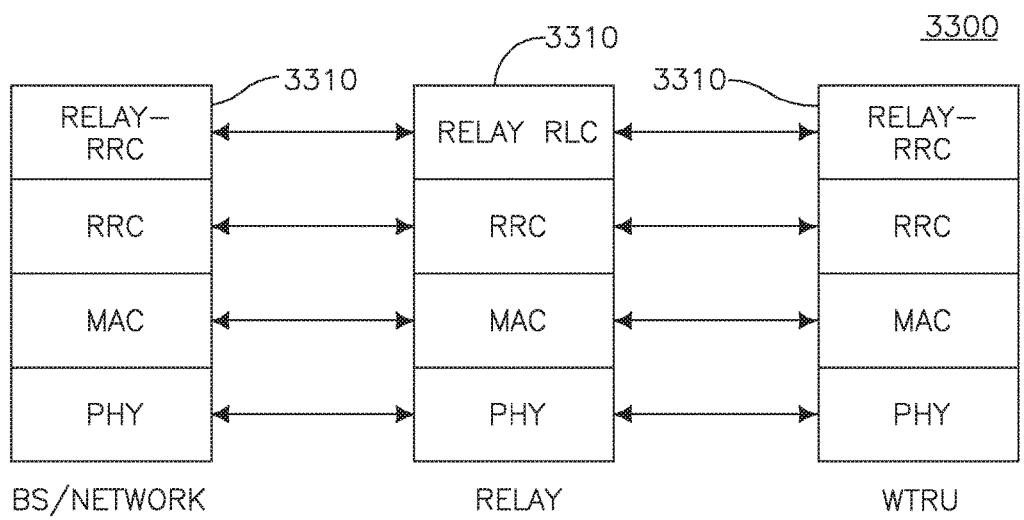

FIG. 33a is a diagram of an example protocol architecture 3300 where the BS and the relay contain a Layer 2 contour plane entity (currently not present in many systems, such as WCDMA as RRC is Layer 3), which we shall call relay-RRC 3310. This entity manages the mobility of WTRUs between relay groups. FIG. 33b is a diagram of an alternate example protocol architecture 3300 where the BS and the relay contain a relay-RRC 3310.

As the WTRU is generally not aware of which group it belongs to, such an entity may not be required at the WTRU. When the WTRU performs the measurements which support inter-relay mobility, the existing RRC operation may need to be modified to provide these to the network. Alternatively, a Layer 2 RRC entity may be defined to report these to the BS.

Figure 34:
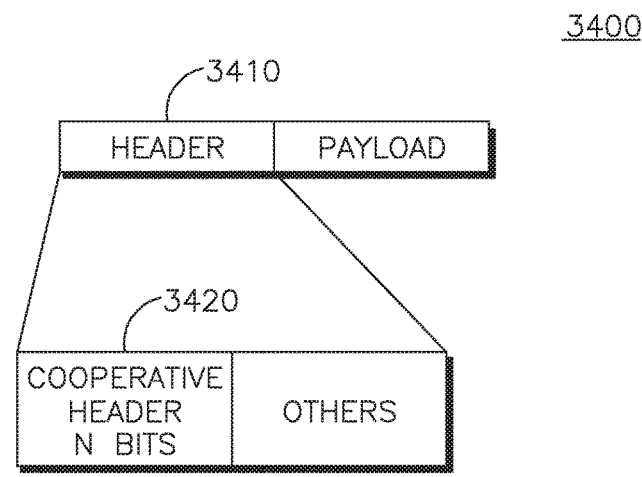
FIG. 34 is a diagram of an example cooperative header.

Turning our attention to the specific coding process in the presence of a relay, consider FIG. 34 which is a diagram of an example cooperative header 3400. Referring to FIG. 34, the cooperative header 3410 includes, but not necessarily limited to 2 bits 3420 indicating M0 or M1 or M2 (each representing a different relay method), k bits indicating the specific embodiment in M1 or M2 or k bits indicating other cooperative scheme specific details. These "information bits" may be compactly coded to generate the cooperative header. For example, the 2 bits indicating M0/M1/M2 and K bits may be coded together thereby eliminating the unused code point in the 2 bit field (because 2 bits=4 code points, where are there are only 3 modes to be coded) and possibly reducing the header size by 1 or more bits (instead of 2+k+k bits).

The Data Packet is further processed for radio transmission (e.g., error correction/detection codes are applied, modulated etc). The transmitted signal s(t) is carried on a "common" radio channel, which is heard by the WTRU, RS1 and RS2, where RS1 and RS2 are associated with the WTRU and "common" refers to the WTRU, RS1, RS2, not necessarily common to other WTRUs or RSs in the system.

Since the channel qualities are different on the BS→RS1, BS→RS2 and BS→WTRU channels, channel coding, modulation similar "transmission related parameters" must be selected such that all 3 entities, namely the WTRU, RS1 and RS2, are able to correctly decode the header. This may be performed using several techniques, some of which are discussed below.

Figure 35:
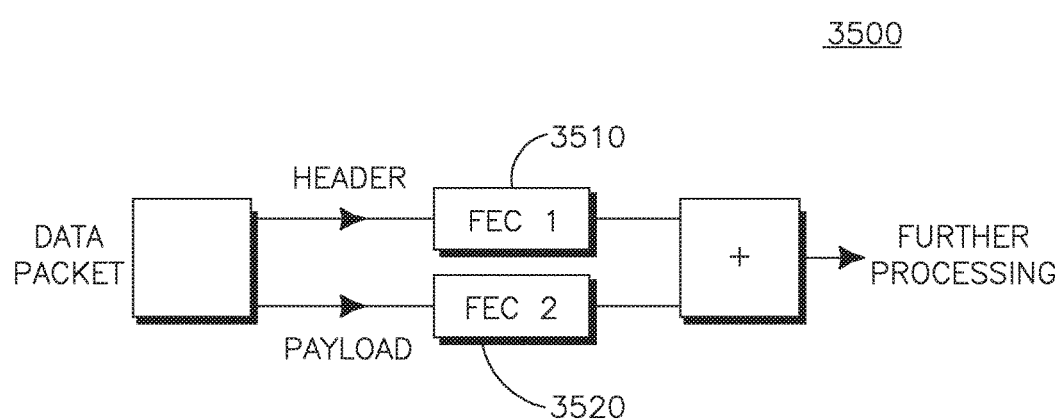
FIG. 35 is a diagram of an example technique that may separate channel coding for the header and the payload.
Figure 36:
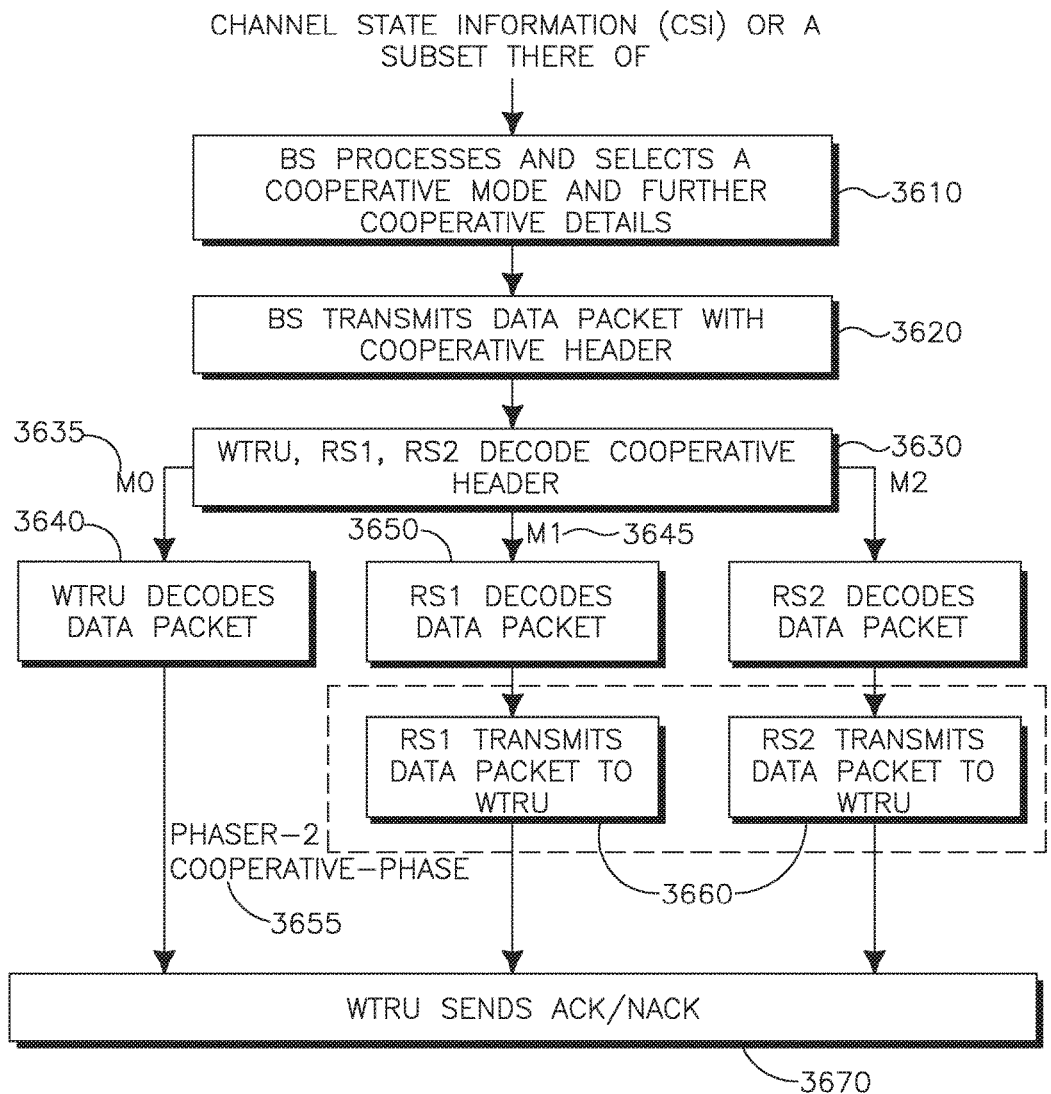
FIG. 36 is a flow diagram of an example technique used to separate channel coding for the header and the payload.

FIG. 35 is a diagram of an example technique 3500 that may separate channel coding for the header and the payload, for example a FEC1 3510 for the header and a FEC2 3520 for the payload, where FEC1 3510 is stronger than FEC2 3520. An example overall flow diagram (shown for DL similar ones apply for UL) is shown in FIG. 36. This technique may use channel coding FEC1 3510 for both header and payload, where FEC1 3510 is chosen to be strong enough for header to be reliably received by WTRU, RS1 and RS2. Robust coding of mode bits, for example 2 mode bits, may be separately coded and modulated and symbols are placed at fixed locations 3610 (which are known to WTRU, RS1 and RS2), so that WTRU, RS1, RS2 may demodulate and decode Mode-Symbols without having to decode the entire header or/and payload. Other similar schemes may be used based on variations of these examples.

The data packet is received by the WTRU, the RS1 and the RS2 3620. Each of them detects, demodulates and decodes the mode bits 3630. Depending on the value of the mode-bits, the nodes (WTRU, RS1, RS2) behave accordingly. That is, if Mode 0 is indicated 3635, RS1 and RS2 will stop further processing of the data block while the WTRU decodes the data packet 3640. The WTRU will continue processing if Mode 1 is indicated 3645, the RS2 and the WTRU will stop further processing, whereas RS1 will continue 3650. If M1 or M2 are chosen, then Phase 2 will commence 3655 after data packet has been correctly received by RS1 or RS2 3660. Upon receiving the decoded data packet, the WTRU sends an ACK/NACK to the BS or RS 3670.

The structure of the data packet sent in Phase 2 of M1 or M2 need not contain the cooperative header. This saves some bits from being unnecessarily transmitted, leading to reduced interference, increased throughput, etc.

DL & UL Coordination

So far, solutions for DL & UL have been described separately. Next described are ways to efficiently coordinate them.

Figure 37:
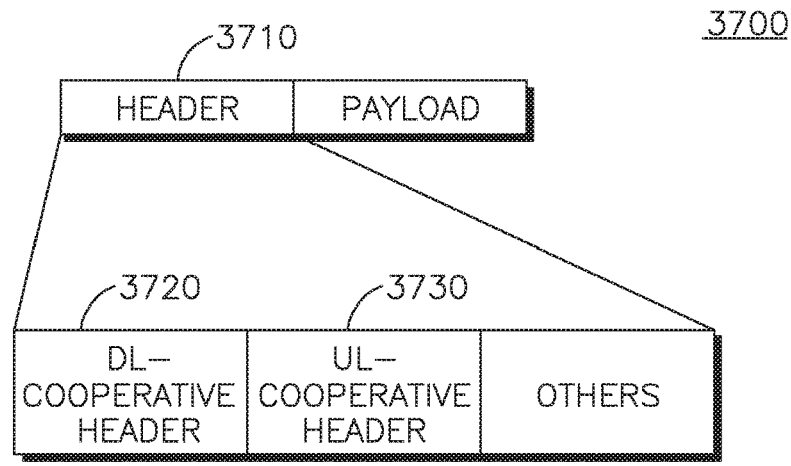
FIG. 37 is a diagram of a downlink data packet having a header and a payload.

The basic idea is that a DL data or control packet contains information about the cooperative scheme to be used for UL transmissions. The following is an example of "piggybacking". FIG. 37 shows a downlink Data Packet having a header and a payload 3700. The header 3710 comprises a DL-coop header 3720, and an UL-coop header 3730 that contains details of the cooperative scheme to be used in the "next" UL-cooperative transmission. As a variation, a time period during which the UL-coop scheme should be used is specified. The specification of the "time-period" may be in terms of "absolute" time (e.g. time slot numbers) or in "logical time" (e.g. Temporary Block Flow identities etc.). The UL-coop header 3730 may also contain the address of WTRU, in case multiple WTRUs are served.

Figure 38:
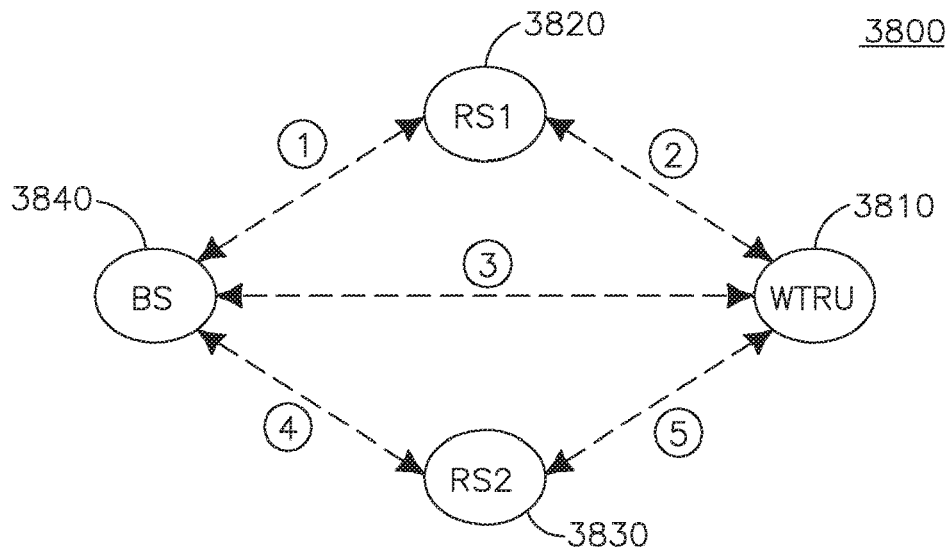
FIG. 38 is a diagram of a relay system using five channel states.

Regarding the availability of channel state information, please note that in the above descriptions, it is assumed that the BS had information about the five channel states 1-5 shown in FIG. 38, or a subset thereof. This information may be acquired in a variety of ways. For example, it may be fed back from the WTRU 3810, RS1 3820, or RS2 3830 on a periodic basis or upon being polled by the BS 3840, RS1 3820 or RS2 3830. The period of feedback reporting may be adjusted dynamically or it may be fixed at the beginning of the communication such that the overhead and latency incurred is acceptable. The BS 3840 or RS 3820,3830 may use interpolation or prediction methods to estimate the channel state values in between feedback reports. In TDD systems, the channel states may be estimated by the BS 3840 on the assumption of reciprocity of the DL and UL channels.

Figure 39:
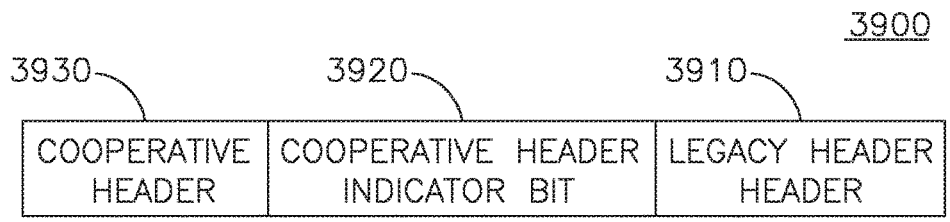
FIG. 39 is a diagram of a transmission header comprising a "legacy" header appended by 1 bit, called "coop. header indicator bit"

FIG. 39 shows a transmission header 3900 comprising a "legacy" header 3910 appended by 1 bit, called "Coop. Header indicator Bit" 3920. One value of this bit denotes the presence of a cooperative header 3930. The other (binary) value of this bit denotes the absence of the cooperative header 3930.

In this example, the cooperative header 3930 denotes only M1 or M2 modes (i.e. all modes involving a relay), excluding the mode M0 (i.e. the direct BS-WTRU communication). So the absence of the cooperative header 3930 denotes mode M0. This will reduce the average header size, when observed over many transmissions.

A variation to using a "bit" to indicate the presence or absence of cooperative header 3930, any unused "codepoint" from the legacy header 3910 may be used. That is, an unused bit pattern of the legacy header is used. A variation is to use rate compatible punctured convolution (RCPC) code, which has the capability to protect different parts of the data packet to different levels.

In one example, the BS and RS transmit the same channel coded data, with distributed beam-forming (BF), so that the WTRU receives the coherently combined signal with improved SINR. This method requires some information feedback from the WTRU to the BS and RS (e.g. channel state information or beam-forming weights), and may be viewed as a variant of the 'closed loop transmit diversity' scheme. In another example, the BS and RS transmit different parts of the coded bit stream, which are received by the WTRU and separated by successive interference cancellation techniques. Subsequently, the two demodulated bit streams are combined at the channel decoding level. Coupling this with the partial data received in Phase 1, the WTRU completes the reconstruction of the data originally transmitted by the BS. These examples are referred to as distributed-BF and distributed-MIMO collaborative schemes.

Protocol 1 Operations

Figure 40:
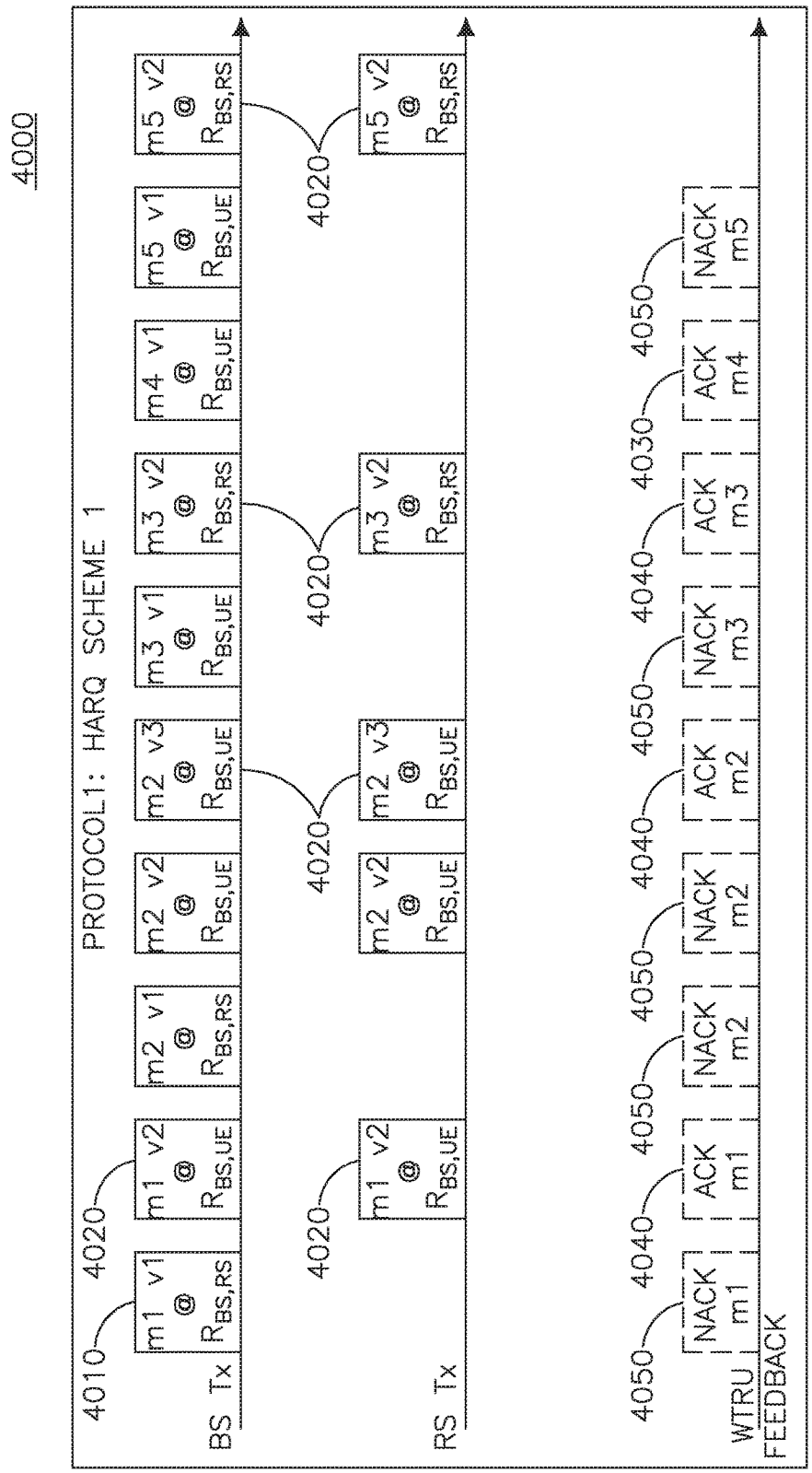
FIG. 40 is a diagram of an example downlink scheme.

Protocol 1—Scheme 1 Downlink is shown in FIG. 40. Referring to FIG. 40, the BS may send data 4010 to the RS in a first TTI using an MCS suitable for the BS-RS link, or one that considers the overall BS-RS, BS-WTRU, RS-WTRU links. The BS and RS may send data 4020 to the WTRU in a subsequent TTI using an MCS suitable for the RS-WTRU link, or one that considers the overall BS-WTRU and RS-WTRU links. The WTRU receives a single codeword (e.g. HARQ PDU) in a TTI, that is transmitted either by the BS alone 4030, or jointly (e.g. using a distributed space-time code) by both the BS and the RS 4040, (or as a third possibility by the RS alone (not shown)).

This may be extended/generalized to multiple codewords, e.g. if MIMO transmission is used from the BS and/or the RS to the WTRU. The codeword transmissions are described/indicated to the WTRU via control channel(s) (i.e. TCC). The WTRU may send HARQ feedback (e.g. ACK 4040/NACK 4050) to indicate whether a codeword has been received successfully or not. Such feedback can be sent using the HCC channel(s). The RS may send HARQ feedback (e.g. ACK/NACK) to the BS (not shown) to indicate whether a codeword transmitted by the BS has been received successfully or not by the RS. Such feedback can be sent using the HCC channel(s).

If the HARQ feedback indicates that the RS has not successfully received the codeword (i.e. NACK or DTX), the BS may re-transmit (not shown). Retransmitted packets will preferably have different IR version. If the BS receives an ACK from the WTRU, the BS moves on to transmit the next message/packet. If the BS and/or RS do not receive an ACK from the WTRU, both the BS and RS will conduct retransmissions to the WTRU (e.g. using a distributed space-time code), until the WTRU acknowledges (sends an ACK) or until HARQ retransmissions are exhausted. Retransmitted packets may have a different IR version. The WTRU combines the received versions (e.g. HARQ combining) in order to improve the decoding of a given packet m. Common identifiers are employed by the BS and RS in order to enable the WTRU to recognize which packets to combine. Such identifiers may be in the form of (using the same) HARQ process ID, pre-defined TTI's (e.g. At TTI # x+y, the RS will send the packet received from BS in TTI # x), or any other identification form. The uplink description is similar to that of downlink but the BS and the WTRU roles are switched.

Figure 41:
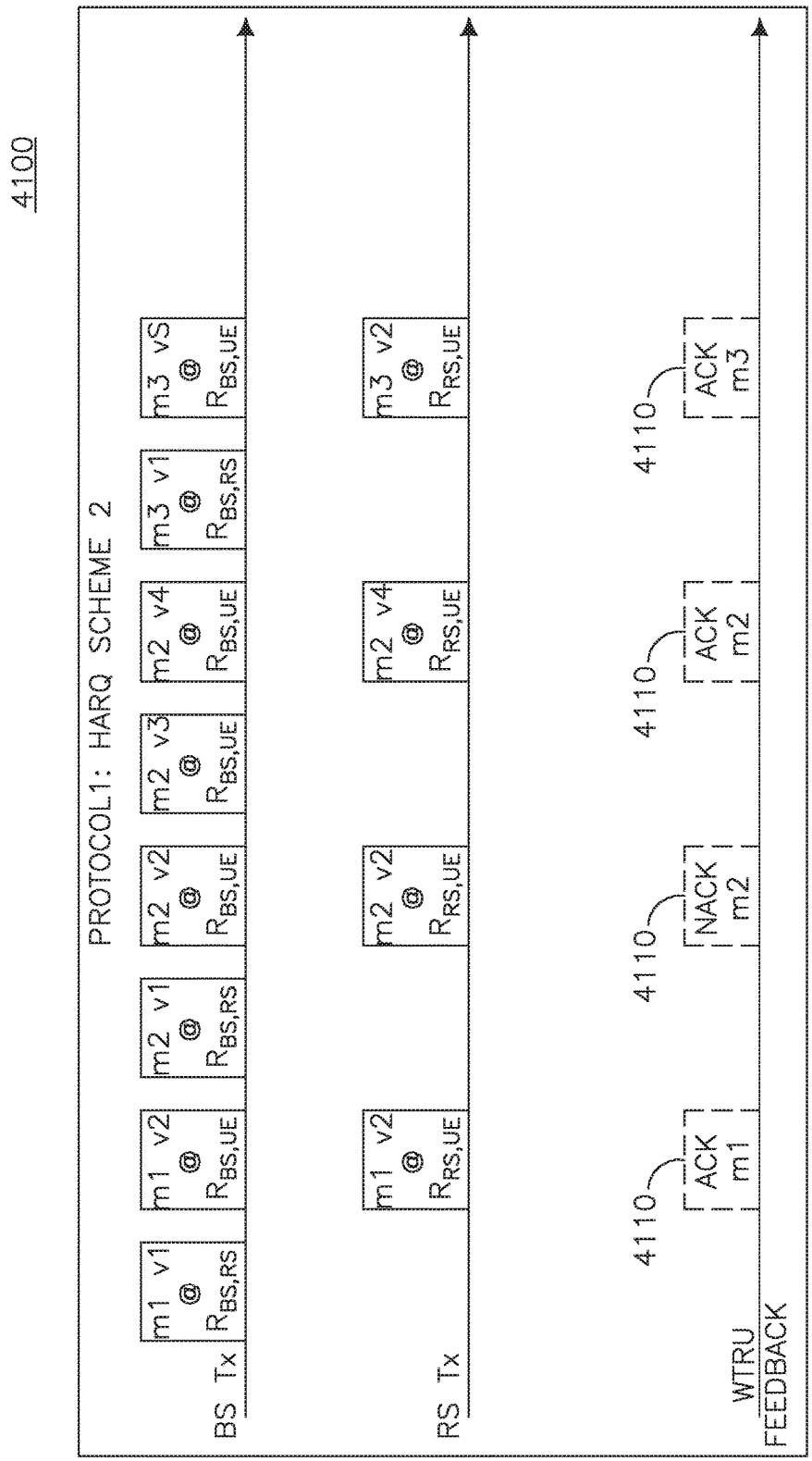
FIG. 41 is a diagram of an example downlink scheme.

Protocol 1—Scheme 2 downlink is shown in FIG. 41, is generally similar to Scheme 1, with the following differences. A pair of TTI's is used such that HARQ feedback is transmitted by the WTRU at the end of the latter TTI 4110 (as opposed to transmitting HARQ feedback in each TTI). This can also be generalized/extended to a 'bundle' of 2 or more TTI's instead of a 'pair' of TTI's. The uplink description is similar to that of downlink but with the BS and the WTRU roles switched.

Protocol 2 Operations

Figure 42:
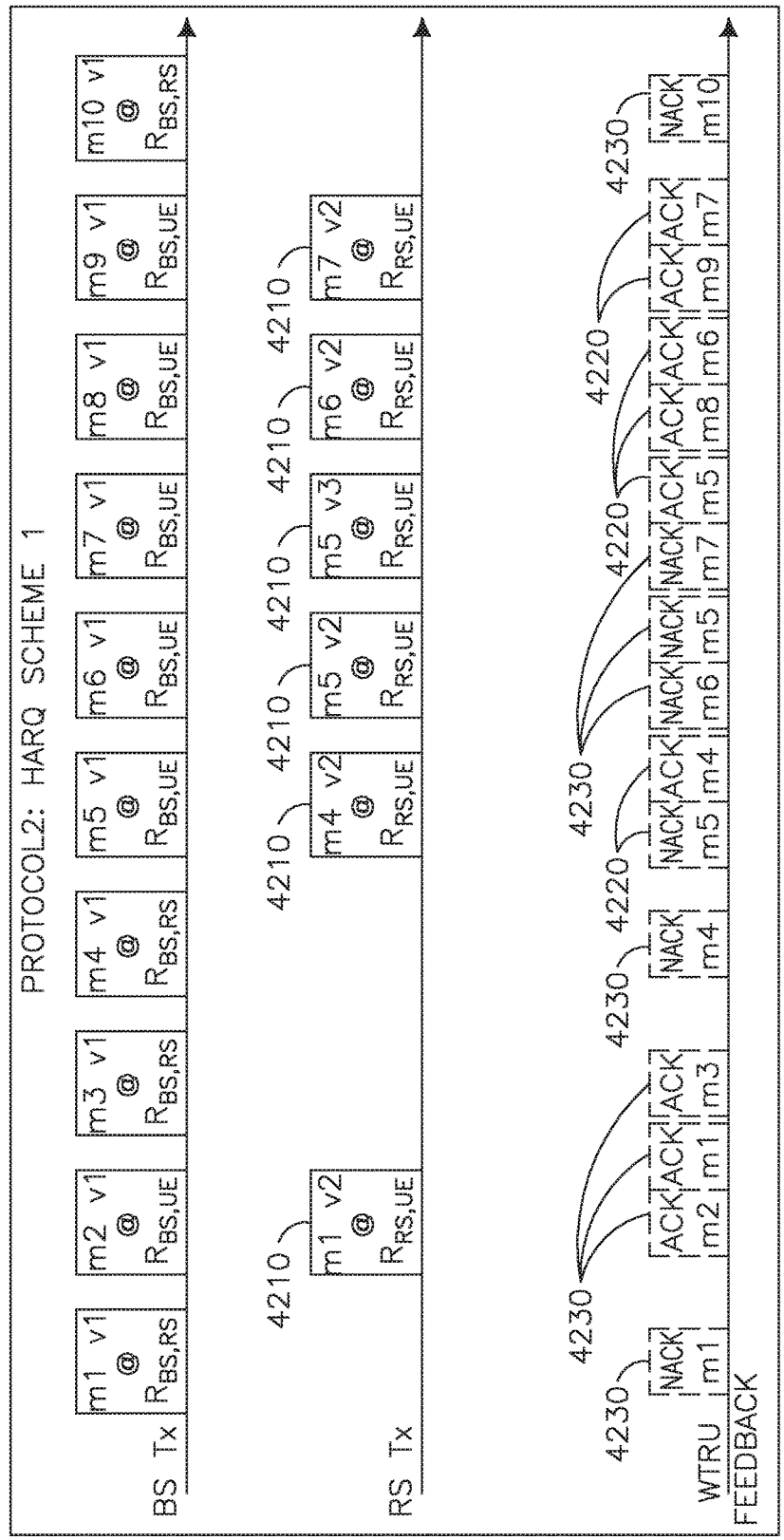
FIG. 42 is a diagram of an example downlink scheme.

Protocol 2—Scheme 1 Downlink as shown in FIG. 42, describes a HARQ scheme for protocol 2 which has a full-duplex relay 4200, i.e. the RS is capable of simultaneous reception and transmission (e.g. on different frequencies). The BS may send data to the RS using an MCS suitable for the BS-RS link. In TTIs when the RS is expected to be (or is) busy transmitting to the WTRU, the BS may send data to the WTRU using an MCS suitable for the BS-WTRU link. In this example, the RS also receives such transmissions 4210 from the BS to the WTRU, because of its full-duplex nature. The RS may send data to the WTRU using an MCS suitable for the RS-WTRU link. The WTRU receives up to two codewords (e.g. HARQ PDUs) in a TTI, one from the BS and one from the RS. This can be extended/generalized to more than 2 codewords, e.g. if MIMO transmission is used from BS and/or RS to WTRU, or if more than one RS is used. The codeword transmissions are described/indicated to the WTRU via control channel(s) (i.e. TCC).

The WTRU may send HARQ feedback (e.g. ACK 4220/NACK 4230) to indicate whether each of the two codewords has been received successfully or not. Such feedback can be sent using the HCC channel(s). The RS may send HARQ feedback (e.g. ACK/NACK) to the BS (not shown) to indicate whether a codeword transmitted by the BS has been received successfully or not by the RS. Such feedback may be sent using the HCC channel(s). If the HARQ feedback indicates that the RS has not successfully received the codeword (i.e. NACK or DTX), the BS may re-transmit (not shown). Retransmitted packets may have a different IR version. If the BS receives an ACK from the WTRU, the BS moves on to transmit the next message/packet. If the BS receives an ACK from the RS, the BS moves on to transmit the next message/packet. HARQ retransmissions may be delegated to the RS. If the RS does not receive an ACK from the WTRU, the RS will conduct retransmissions to the WTRU, until the WTRU acknowledges (sends an ACK) or until HARQ retransmissions are exhausted (reach a limit). Retransmitted packets may have a different IR version. The WTRU combines the received versions (e.g. HARQ combining) in order to improve the decoding of a given packet m. Common identifiers are employed by the BS and RS in order to enable the WTRU to recognize which packets to combine. Such identifiers can be in the form of (using the same) HARQ process ID, pre-defined TTI's (e.g. At TTI # x+y, the RS will send the packet received from the BS in TTI # x), or any other identification form. Flow control signals may also be used from the RS to BS to stop new HARQ transmissions by the BS, when the RS is overloaded with HARQ retransmissions to the WTRU.

The uplink is similar to that of downlink but the BS and the WTRU roles are switched. The description is also similar, just replace BS by WTRU, and WTRU by BS as follows. This example has full-duplex relay, such that the RS is capable of simultaneous reception and transmission (e.g. on different frequencies). The WTRU sends data to the RS (preferably using an MCS suitable for the WTRU-RS link). In TTIs when the RS is expected to be (or is) busy transmitting to the BS, the WTRU may send data to the BS (preferably using an MCS suitable for the WTRU-BS link). The RS may also receive such transmissions from the WTRU to the BS, because of its full-duplex nature. The RS sends data to the BS (preferably using an MCS suitable for the RS-BS link). The BS receives up to two codewords (e.g. HARQ PDUs) in a TTI, one from WTRU and one from RS. [Note: This can be extended/generalized to more than 2 codewords, e.g. if MIMO transmission is used from WTRU and/or RS to BS, or if more than one RS is used.]. The codeword transmissions are described/indicated via control channel(s) (i.e. TCC).

The BS may send HARQ feedback (e.g. ACK/NACK) to indicate whether each of the two codewords has been received successfully or not. Such feedback can be sent using the HCC channel(s). The RS may send HARQ feedback (e.g. ACK/NACK) to the WTRU (not shown) to indicate whether a codeword transmitted by the WTRU has been received successfully or not by the RS. Such feedback can be sent using the HCC channel(s).

If the HARQ feedback indicates that the RS has not successfully received the codeword (i.e. NACK or DTX), the WTRU may re-transmit [Note: this is not shown in the Figure]. Retransmitted packets will preferably have different IR version. If the WTRU receives an ACK from the BS, the WTRU moves on to transmit the next message/packet. If the WTRU receives an ACK from the RS, the WTRU moves on to transmit the next message/packet. HARQ retransmissions will be delegated to the RS. If the RS does not receive an ACK from the BS, the RS will conduct (take care of) retransmissions to the BS, until the BS acknowledges (sends an ACK) or until HARQ retransmissions are exhausted (e.g. reach a predetermined limit). Retransmitted packets may have a different IR version. The BS combines the received versions (e.g. HARQ combining) in order to improve the decoding of a given packet m. Common identifiers are employed by the WTRU and RS in order to enable the BS to recognize which packets to combine. Such identifiers may be in the form of (using the same) HARQ process ID, pre-defined TTI's (e.g. At TTI # x+y, the RS will send the packet received from WTRU in TTI # x), or any other identification form. Flow control signals may also be used from RS to WTRU to stop new HARQ transmissions by the WTRU, when the RS is overloaded with HARQ retransmissions to the BS.

Figure 43:
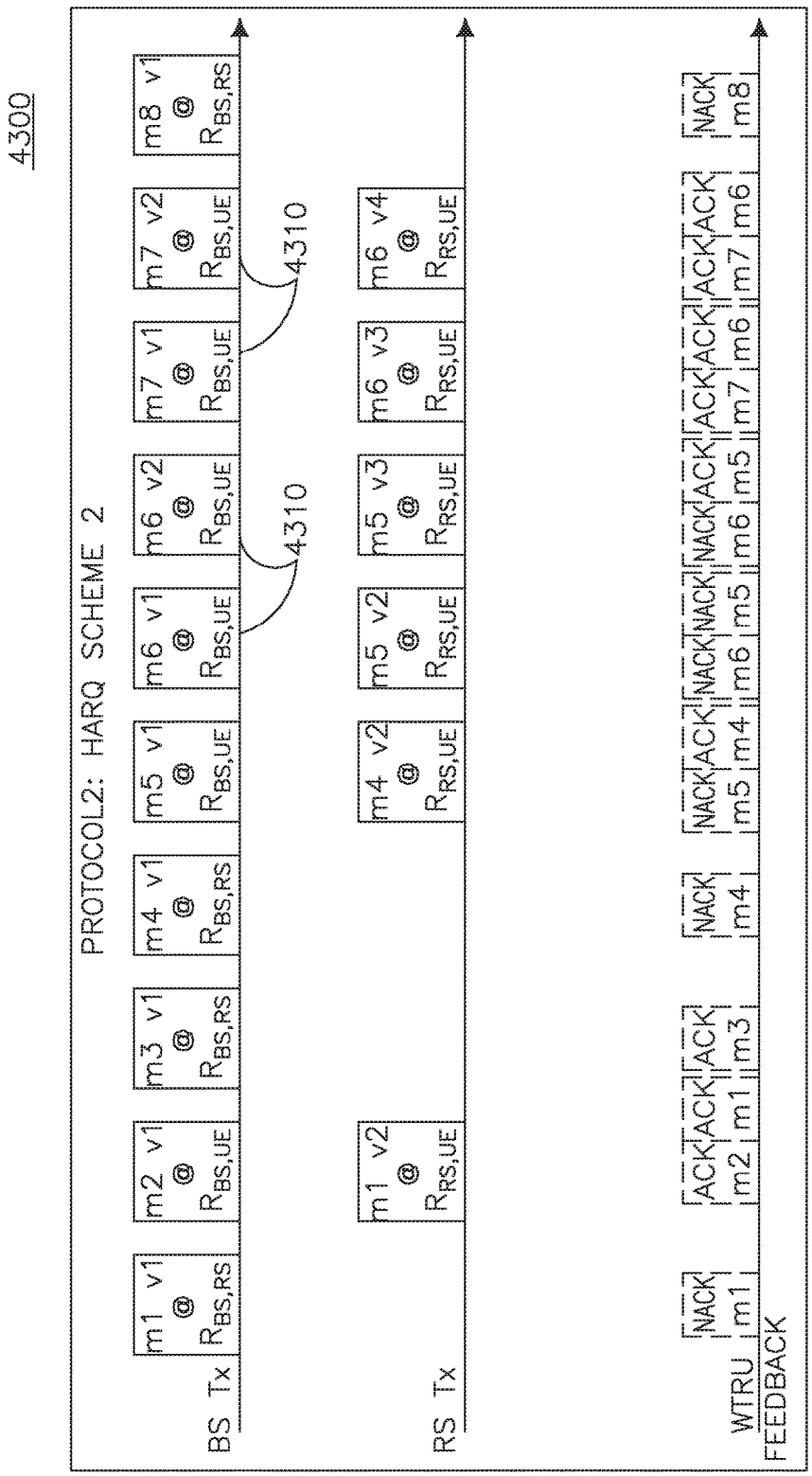
FIG. 43 is a diagram of an example downlink scheme.

Protocol 2—Scheme 2 Downlink is generally similar to Scheme 1 and is shown in FIG. 43, with the following differences. In TTIs when the RS is expected to be (or is) busy transmitting or re-transmitting to the WTRU, the BS may conduct some HARQ retransmissions 4310 to the WTRU using an MCS suitable for the BS-WTRU link. Whether the BS takes care of conducting retransmissions or not can be based on ACK/NACK feedback status from the RS and/or WTRU, and/or RS load. The uplink drawing/figure and description is similar to that of downlink but the BS and the WTRU roles are switched.

Figure 44:
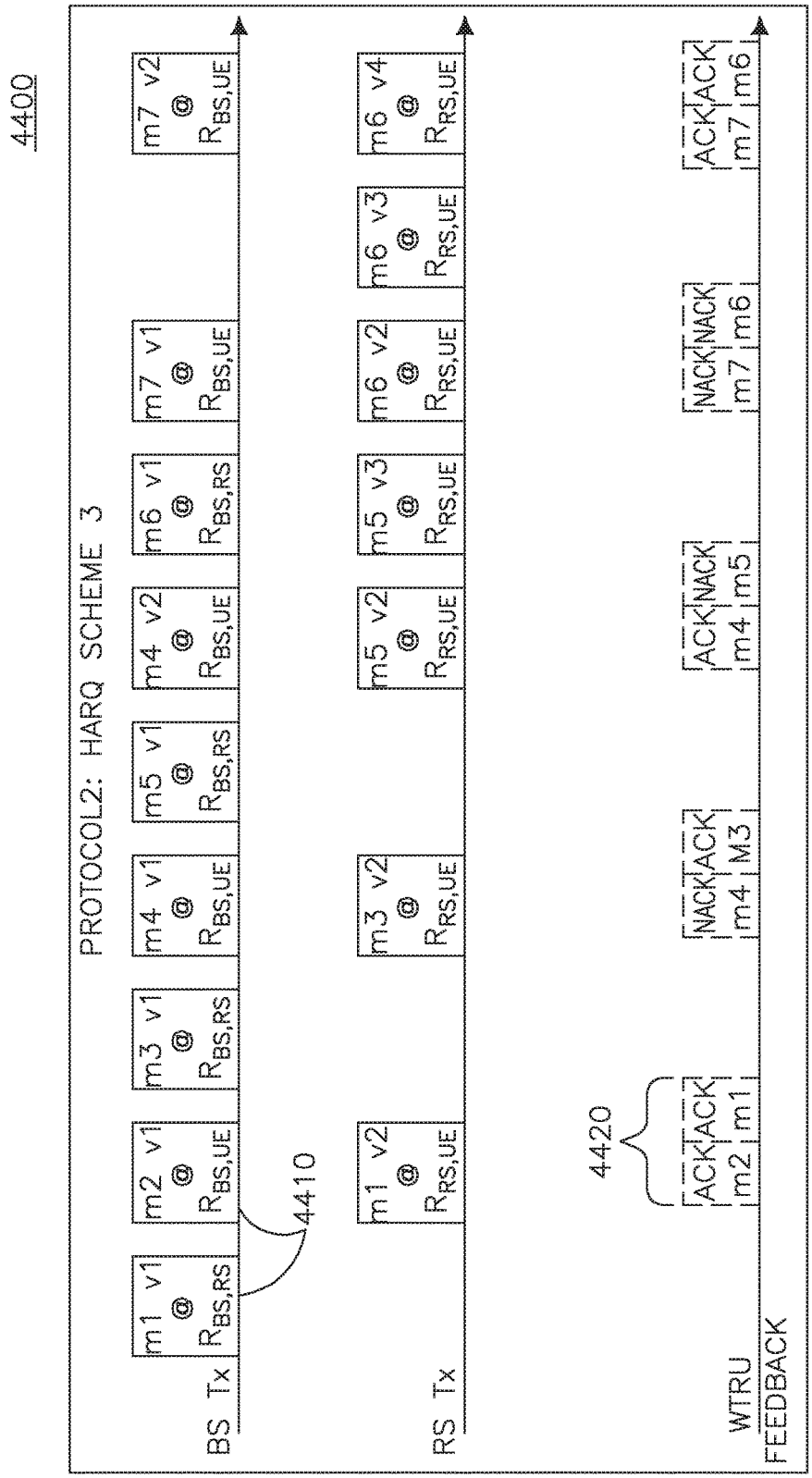
FIG. 44 is a diagram of an example downlink scheme.

Protocol 2—Scheme 3 downlink, as shown in FIG. 44 is generally similar to Scheme 2, with the following differences. First, a pair of TTI's 4410 is used and the HARQ feedback is transmitted by the WTRU 4420 at the end of the latter TTI (as opposed to transmitting HARQ feedback in each TTI). This may also be generalized/extended to a 'bundle' of 2 or more TTI's instead of a 'pair' of TTI's. Second, the uplink description is similar to that of downlink but with the BS and the WTRU roles switched.

Figure 45:
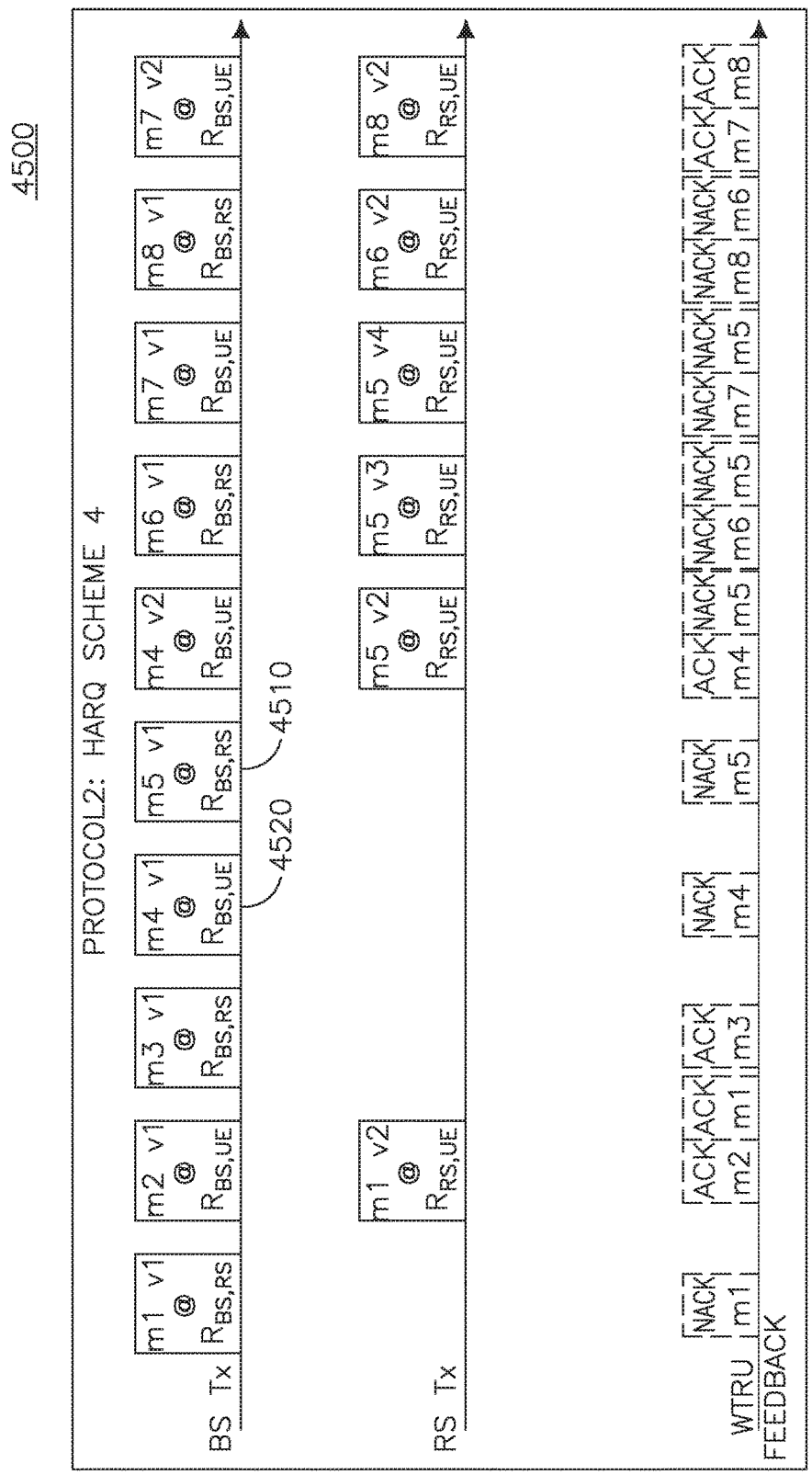
FIG. 45 is a diagram of an example downlink scheme.

Protocol 2—Scheme 4 downlink, as shown in FIG. 45, is generally similar to Scheme 2, with the following differences. First, HARQ retransmissions for some packets will not be delegated from the BS to the RS 4510, but the HARQ retransmissions for some other packets will be delegated from the BS to the RS 4520. Whether to delegate or not can be based on ACK/NACK feedback status from the RS and/or WTRU, and/or RS load. Second, the uplink drawing/figure and description is similar to that of downlink but with switching/re-labeling BS as WTRU, and WTRU as BS.

Figure 46:
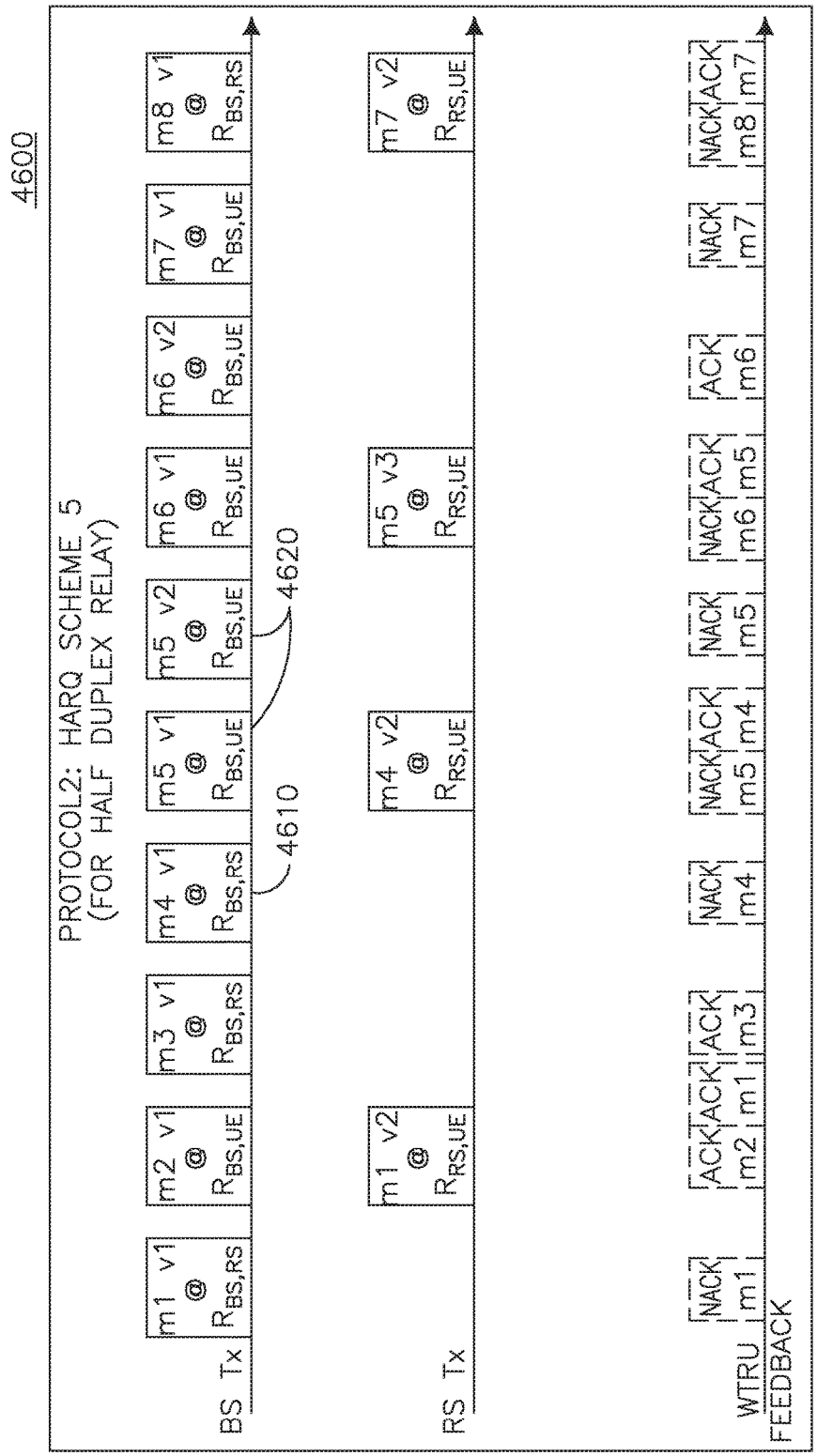
FIG. 46 is a diagram of an example downlink scheme.

Protocol 2—Scheme 5 Downlink, as shown in FIG. 46, is generally similar to Scheme 1, with the following differences. First, this scheme has half-duplex relay, such that the RS is capable of either reception or transmission, but not both at the same time. Second, the HARQ retransmissions for some packets will not be delegated from the BS to the RS 4610, but the HARQ retransmissions for some other packets will be delegated from the BS to the RS 4620. Whether to delegate or not may be based on whether the RS has received the packet from the BS (i.e. whether the RS was receiving or transmitting, since it's half-duplex). Other factors such as ACK/NACK feedback status from the RS and/or WTRU, and/or RS load may also be considered. Third, the uplink description is similar to that of downlink but with the BS and the WTRU roles switched.

Figure 47:
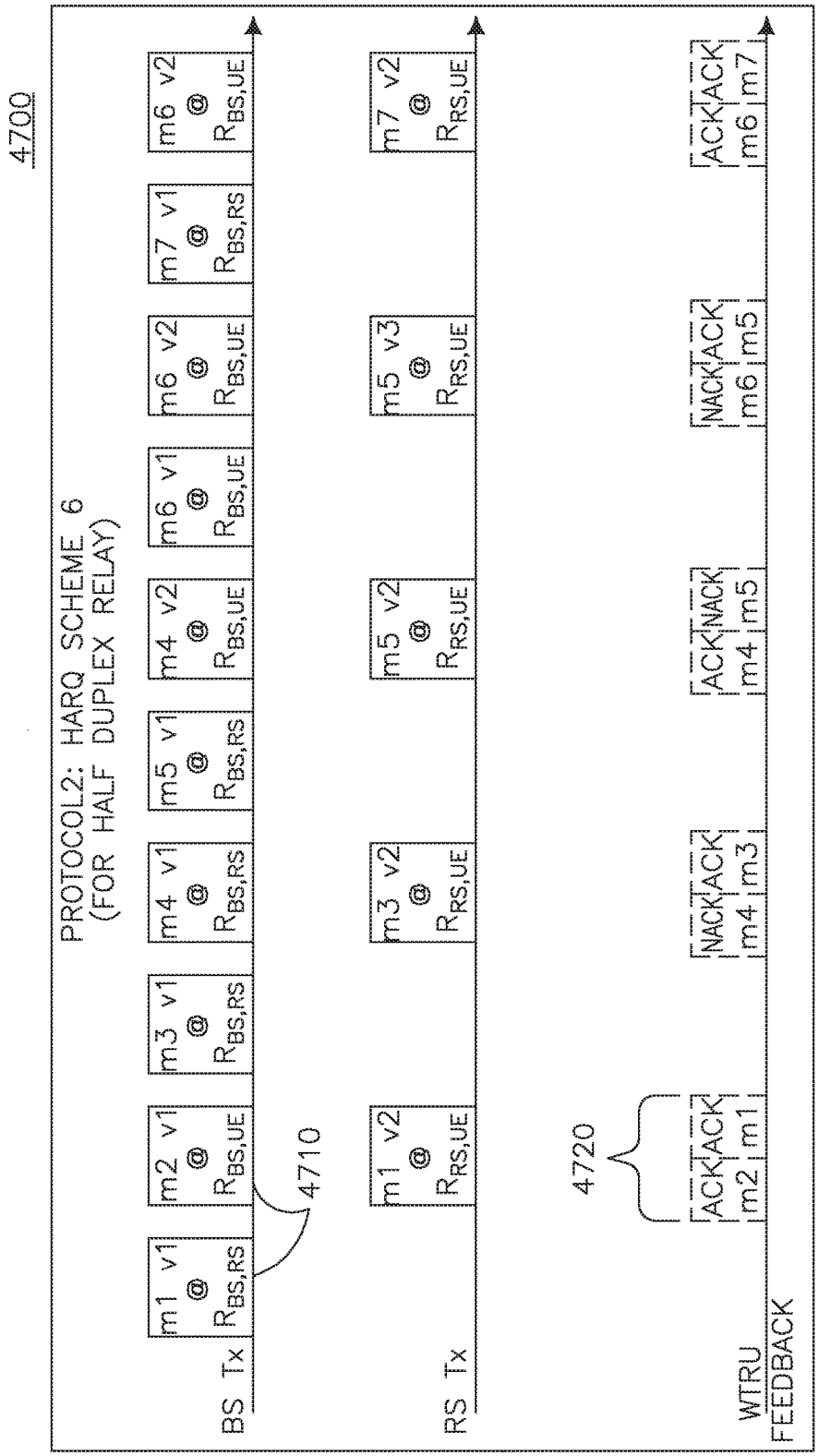
FIG. 47 is a diagram of an example downlink scheme.

Protocol 2—Scheme 6 downlink, as shown in FIG. 47, is generally similar to Scheme 5, with the following differences. A pair of TTI's 4710 is used and the HARQ feedback is transmitted by the WTRU at the end of the latter TTI 4720 (as opposed to transmitting HARQ feedback in each TTI). This may also be generalized/extended to a 'bundle' of 2 or more TTI's instead of a 'pair' of TTI's. The uplink description is similar to that of downlink but with the BS and the WTRU roles switched.

The physical channel denotes and differentiates the various ways in which physical resources are allocated among WTRUs, relay stations and base stations. A physical channel, as used here, is a specific set of resources associated with a specific terminal (i.e. a WTRU), set of terminals, cells etc. More specifically, a physical channel in a cellular system may be defined by a direction (uplink UL or downlink DL), a carrier frequency, a cell or sector of the cellular system, and channelization resources, as appropriate to a specific radio access technology. Thus, in time division multiple access (TDMA), this is a set of time-slots, in code division multiple access (CDMA), this is a set of codes, in orthogonal frequency division multiple access (OFDMA) this is a set of sub-carriers, in time division duplex CDMA (TDD-CDMA) this is a combination of time-slot and code, and so forth.

Channelization resources are allocated as sets of radio resource units (RRUs). A radio resource unit is the smallest particular allocation of resources in a specific radio access technology. For example, for wideband CDMA (WCDMA) HSDPA, 1 RRU=1 SF16 code*1 TTI. For long term evolution (LTE), 1 RRU=1 sub-carrier*1 TTI.

Generally speaking, physical channels assigned to terminals (WTRUs) may be of, but not limited to, the following three types. First, a dedicated physical channel is allocated to a specific WTRU for its exclusive use. This allocation may be dynamic, that is, a shared pool of RRUs may be used, but each RRU is dedicated to a single WTRU. For example, WCDMA HSDPA as originally defined in Release 5 of the UMTS WCDMA standard is a dedicated allocation. Even though the physical HSDPA channel (HS-PDSCH) is shared, each RRU therein is allocated in a dedicated fashion. Second, a shared channel is shared among a well-defined (static or dynamic) set of WTRUs. Third, a common channel is available to any terminal in the specified cell.

The number of available RRUs depends on how RRUs are defined and how they are received. These examples apply to all the approaches to RRU definition and reception described below.

In general it may be assumed that the RRU's are non-interfering or orthogonal (as, for example, time-slots with sufficient gap periods or sub-carriers of OFDM are). While this ensures the best performance for each link, the overall system performance is limited by the availability of orthogonal RRUs.

An alternative to this is to allow some small amount of interference between RRUs and ignore this in the receiver design. This is the case with long-code CDMA with a RAKE receiver. This removes the RRU availability as a factor limiting system performance, however such systems are typically limited by self-interference levels. Thus, while a large number of RRUs is available in principle, very few of these can actually be used simultaneously. The actual RRU efficiency of such systems is often similar to those with orthogonal RRUs (and is often somewhat worse).

A theoretically-optimal approach is to permit some (limited and controlled) interference between RRUs and use a very powerful receiver to jointly receive all RRUs in a self-interference set. A partial step in this direction was taken by WTDD TDSCDMA modes of 3GPP.

Control Channels

The following control channel architecture may be used in conjunction with both Protocol 2 and Protocol 1. Two types of control channels are described herein. TCC's are Control channels that describe or provide information about the associated (data) transmissions. For example, describing when transmissions will occur, the MCS used, new transmissions or retransmissions, IR version, etc. HCC's are Control channels that describe or provide information about the reception status. For example, HARQ ACK/NACK feedback to indicate whether a transmission was received successfully (ACK), unsuccessfully (NACK) or not received (DTX; i.e. no feedback is transmitted).

Figure 48:
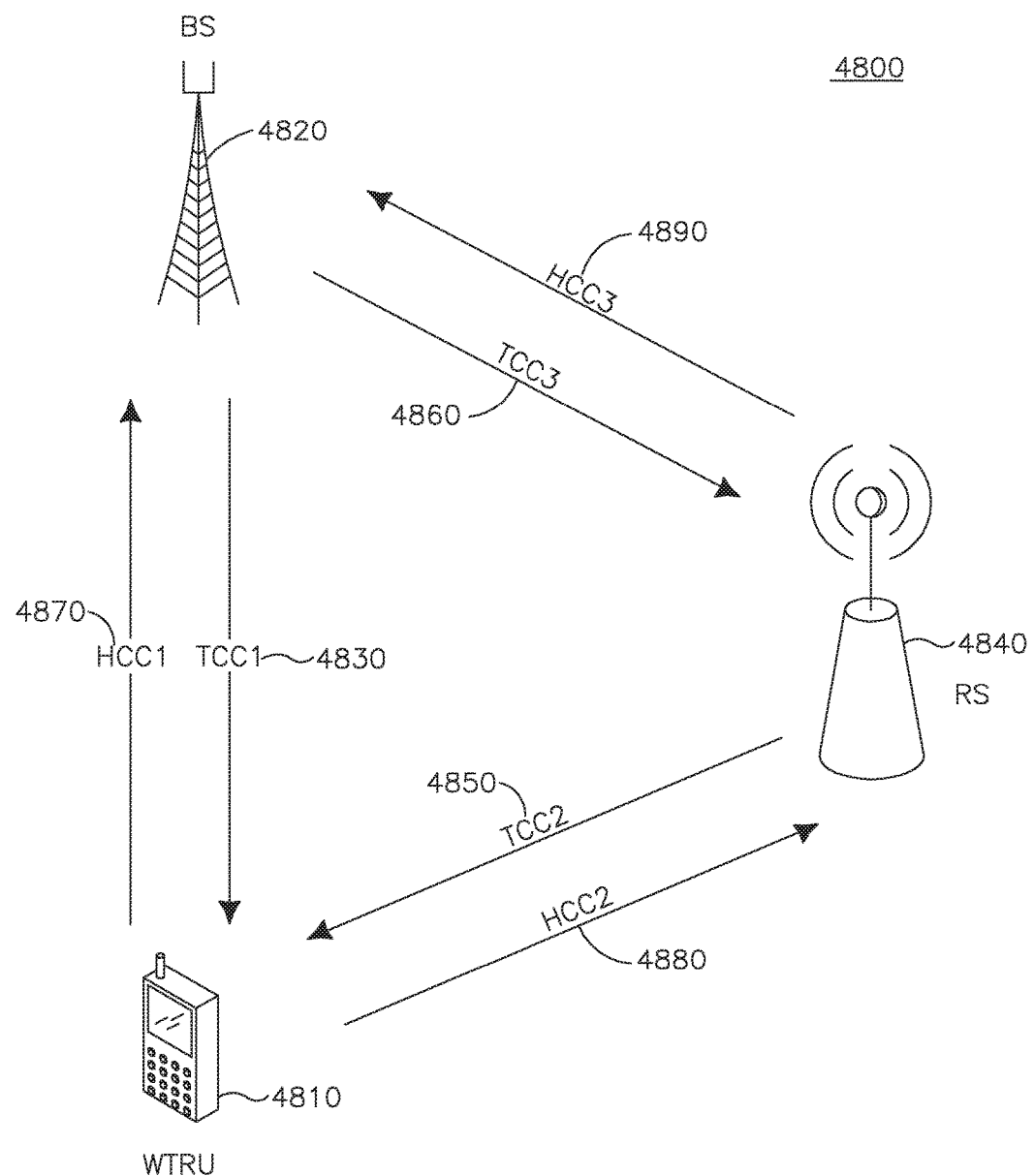
FIG. 48 is a diagram of control channels for the DL.

FIG. 48 shows control channels for the DL 4800. The WTRU 4810 monitors a control channel transmitted by the BS 4820 (referred to as TCC1 4830), that signals information regarding the transmissions from the BS 4820. The WTRU 4810 monitors a control channel transmitted by the RS 4840 (referred to as TCC2 4850), that signals information regarding the transmissions from the RS 4840. Alternatively, TCC2 4850 may be transmitted by the BS 4820 instead, but still signals information regarding the transmissions from the RS 4840. TCC1 4830 and TCC2 4850 may be combined in one control channel (i.e. a single TCC from BS).

The RS 4840 monitors a control channel transmitted by the BS 4820 (referred to as TCC3 4860), that signals information regarding the transmissions from the BS 4820. TCC1 4830 and TCC3 4860 may be the same control channel (i.e. a single TCC from BS). The WTRU 4810 transmits a HARQ feedback control channel (referred to as HCC1 4870) to the BS 4820. The WTRU 4810 transmits a HARQ feedback control channel (referred to as HCC2 4880) to the RS 4840. The RS 4840 transmits a HARQ feedback control channel (referred to as HCC3 4890) to the BS 4820. HCC1 4870 and HCC2 4880 may be the same control channel (i.e. a single HCC from the WTRU).

Figure 49:
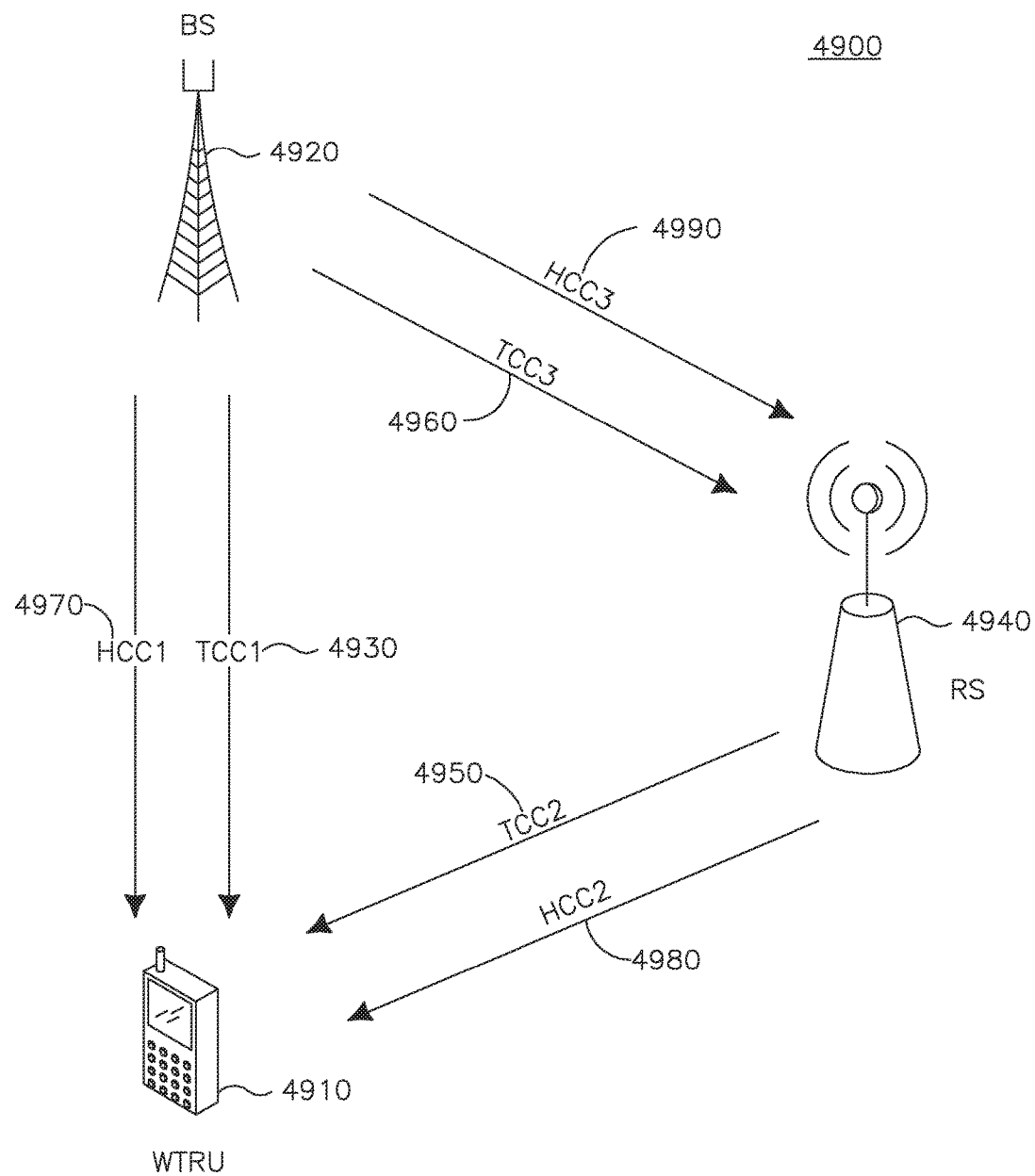
FIG. 49 is a diagram of an example of the control channels for UL.

FIG. 49 shows Variant A of the control channels for UL 4900. The WTRU 4910 monitors a control channel transmitted by the BS 4920 (referred to as TCC1 4930), that signals information regarding the transmissions from the WTRU 4910 (i.e. it instructs the WTRU 4910 when and/or what to transmit to the BS 4920). The WTRU 4910 monitors a control channel transmitted by the RS 4940 (referred to as TCC2 4950), that signals information regarding the transmissions from the WTRU 4910 (i.e. it instructs the WTRU 4910 when and/or what to transmit to the RS 4940). Alternatively, TCC2 4950 may be transmitted by the BS 4920 instead, or yet alternatively TCC1 4930 and TCC2 4950 may be the same control channel (e.g. a single TCC from the BS to the WTRU that instructs the WTRU when and/or what to transmit to either of or both RS and BS).

The RS 4940 monitors a control channel transmitted by the BS 4920 (referred to as TCC3 4960), that signals information regarding the transmissions from the RS 4940 (i.e. it instructs the RS 4940 when and/or what to transmit to the BS 4920 and/or to the WTRU 4910). TCC1 4930 and TCC3 4960 may be the same control channel (i.e. a single TCC from the BS 4920) to the WTRU 4910 and/or the RS 4940 that instructs the WTRU 4910 and the RS 4940 when and/or what to transmit. The WTRU 4910 receives a HARQ feedback control channel (referred to as HCC1 4970) from the BS 4920. The WTRU 4910 receives a HARQ feedback control channel (referred to as HCC2 4980) from the RS 4940. The RS 4940 receives a HARQ feedback control channel (referred to as HCC3 4990) from the BS 4920. HCC1 4970 and HCC3 4990 may be the same control channel (i.e. a single HCC from BS 4920). The UL control channels (TTCx or HCCx) are not necessarily the same as the DL control channels, although the same terms are used in the description.

Figure 50:
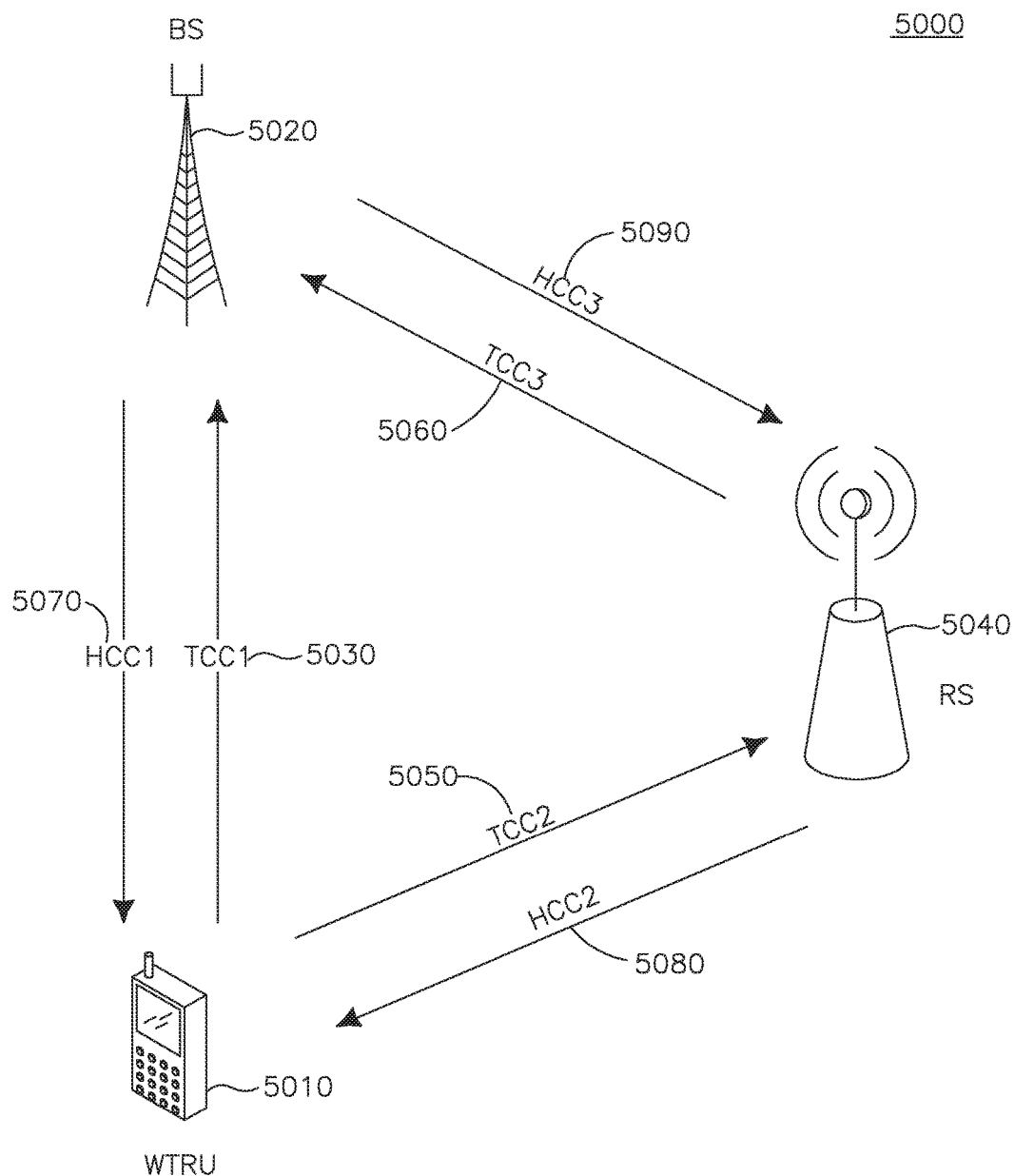
FIG. 50 is a diagram of an example of the control channels for UL.

FIG. 50 shows Variant B of the control channels for UL 5000. Variant B describes a WTRU 5010 that transmits a control channel to the BS 5020 (referred to as TCC1 5030), that signals information regarding the transmissions from the WTRU 5010. The WTRU 5010 transmits a control channel to the RS 5040 (referred to as TCC2 5050), that signals information regarding the transmissions from the WTRU 5010. Alternatively, TCC1 5030 and TCC2 5050 may be the same control channel (i.e. a single TCC from the WTRU 5010).

The RS 5040 transmits a control channel to the BS 5020 (referred to as TCC3 5060), that signals information regarding the transmissions from the RS 5040. The WTRU 5010 receives a HARQ feedback control channel (referred to as HCC1 5070) from the BS 5020. The WTRU 5010 receives a HARQ feedback control channel (referred to as HCC2 5080) from the RS 5040. The RS 5040 receives a HARQ feedback control channel (referred to as HCC3 5090) from the BS 5020. HCC1 5070 and HCC3 5090 may be the same control channel (i.e. a single HCC from BS 5020). The UL control channels (TTCx or HCCx) are not necessarily the same as the DL control channels, although the same terms were used in the description. Other variants are also possible via combining some aspects from Variant A together with other aspects of Variant B.

Several example protocols are described to improve the downlink performance of cellular systems. These protocols are designed to build upon existing cellular packet air interfaces such as high-speed packet access (HSPA) high-speed downlink packet access/high-speed uplink packet access (HSDPA/HSUPA) and long term evolution (LTE). While these protocols are disclosed in the context of HSPA, the protocols as described, apply directly to other systems, such as LTE, WiMAX.

Cooperative Relays in HSUPA

The link between the relay and the WTRU may be classified as one-to-one or one-to-many. In the one-to-one link, the relay is dedicated to a single WTRU. In the one-to-many scenario, the relay is receiving data from multiple WTRUs. Similarly, the link between the relay and the BS may be one-to-one or one-to-many. In the one-to-one scenario, the BS is receiving data from a single relay and in the one-to-many scenario the base station is receiving data from multiple relays. Finally, there is also a direct link between the BS and the WTRU. This link might or might not be present. We could define an architecture where the WTRU cannot communicate directly with the BS, i.e., all communication goes through the relays. This however, would be a limiting architecture because the relay's objective is to help the communication between the WTRU and the BS, and so there will be cases where the relay is not needed, and direct communication between the WTRU and the BS is advantageous. This link is always defined as one-to-many. Finally, the WTRU may be in communication with both the relay and the BS at the same time.

| Uplink communication | | | |
|---|---|---|---|
| | WTRU | Relay | BS |
| WTRU | NA | One-to-one or one-to-many | One-to-many |
| Relay | One-to-one or one-to-many | NA | One-to-one or one-to-many |
| BS | One-to-many | One-to-one or one-to-many | NA |

In order to generalize it here we will assume all links are one-to-many. The one-to-one case is the trivial case when there is a single destination.

HSUPA Serving Grant Methodology

The HSUPA channel is the Enhanced Dedicated Physical Channel (EPDCH). The BS controls the allocation of the E-DPCH among all WTRUs and this controlled scheduling is based on a set of rules on how the WTRU shall behave with respect to specific signaling.

The BS sends a resource indication in the downlink called a "scheduling grant" (SG). This SG indicates to the WTRU the maximum amount of uplink resources it may use. When issuing scheduling grants, the BS may use QoS-related information provided by the SRNC and from the WTRU in Scheduling Requests.

The scheduling grants have the following characteristics: scheduling grants control the maximum allowed E-DPDCH/DPCCH power ratio, and scheduling grants can be sent once per TTI or slower. There are two types of grants.

The absolute grants provide an absolute limitation of the maximum amount of UL resources the WTRU may use. The second grant is the relative grant which directs the WTRU to increase or decrease the resource limitation compared to the previously used value. Absolute grants are sent by the serving E-DCH cell. They are valid for one WTRU, for a group of WTRUs or for all WTRUs in the cell. This is done by allocating up to two identities (called "primary" and "secondary") for each WTRU, and by the UTRAN allocating the same identity to a group of WTRUs. Relative grants may be sent by the serving and non-serving node-Bs as a complement to absolute grants. The WTRU behaviour is exactly the same for relative grants for one WTRU, for a group of WTRUs and for all WTRUs. The relative grant from the serving E-DCH RLS may take one of the three values: "UP", "HOLD" or "DOWN". The relative grant from the non-serving E-DCH RL may take one of the two values: "HOLD" or "DOWN".

The following information is provided by the WTRU to the BS to assist in the scheduling grant allocation. This information is provided in the scheduling information (SI). The logical channel ID of the highest priority channel with data in buffer identifies unambiguously the highest priority logical channel with available data and QoS information related to this indicated logical channel. Some examples of information in the SI include the WTRU Buffer occupancy (in bytes), total buffer status, buffer status for the highest priority logical channel with data in the buffer, as a fraction of the total reported buffer, and WTRU Power Headroom (UPH). The UPH field indicates the ratio of the maximum WTRU transmission power and the corresponding DPCCH code power.

HSUPA Serving Grant Functionality in Cooperative Networks

It should be noted that the objective of the Serving Grants is to provide significant enhancements in terms of user experience (throughput and delay) and capacity. Therefore it is important to make sure that the serving grant functionality and objectives hold true when HSUPA is used in a cooperative environment. Moreover, grants are a function not only of the required QoS but also the channel conditions.

It should be noted that the UPH is a function of the channel conditions between the WTRU and the BS—if the conditions are not favorable, too much power is spent on the DPCCH and little power is left to the EDPCH. This is important because it implies that a grant between the WTRU and the BS might not be necessarily appropriate for communication between the WTRU and the relay.

Link Between BS and Relay

An important piece of the communication is the link between the relay and the BS. For example, if the bandwidth available for communication between the relay-BS link is lower than the bandwidth available for communication between the relay and the WTRUs, the system might become unbalanced and the relay will start to queue and possibly drop the WTRU packets because it is not able to forward such packets to the BS.

Some signaling messages between the relay and the BS are defined in the table below.

| Direction | Message | Description |
|---|---|---|
| BS -> relay | Measurement Request | Request for channel measurements, with specific reporting criteria (e.g., periodic, event triggered). These measurements include UL DPCCH received power for specific WTRUs, total power, interference, etc. |
| relay -> BS | measurement report | Response to "measurement request" message These measurements include UL DPCCH received power for specific WTRUs, total power, interference, etc. |
| BS -> relay | relay polling | Requesting status of the relay |
| relay -> BS | polling response | Response to "relay polling" message. A response indicates that the relay is "In Service" |
| BS -> relay | load request | Request for number of WTRUs associated to that relay, with specific reporting criteria (e.g., periodic, event triggered) |
| relay -> BS | load response | Response to the "load request" message This message contains the number of WTRUs associated with the relay, and possibly the buffer occupancy of each of these WTRUs |

The objective of these messages is to help the BS to perform allocations to the WTRUs associated with a single relay, allocations for communication between each relay and the BS, and balance the allocations between WTRUs associated with different relays.

Example 1: WTRU Communicates with Relay Only

Centralized Scheduling

In the centralized scheduling the BS allocates a scheduling grant (SG) to each WTRU and this SG is sent from the BS to the WTRU via the relay. The relay will simply forward the allocation to the WTRUs.

Because the WTRU communicates directly with the relay, the SI sent by the WTRU will reflect the link between the WTRU and the relay and the BS can use that information to perform the grant allocation. However, the BS also needs to take into account the fact that the relay needs to send the data from all associated WTRUs to the BS. Therefore, there is no advantage in providing a large grant to the WTRU if there is not enough bandwidth between the relay and the BS.

In order to account for that, we introduce a "relay SI," which will reflect the capacity of that relay. The "relay SI,", together with the higher layer signaling messages defined above, can be used to control not only the SG allocation to the WTRUs but also the bandwidth allocated to the BS-relay channel.

Figure 51:
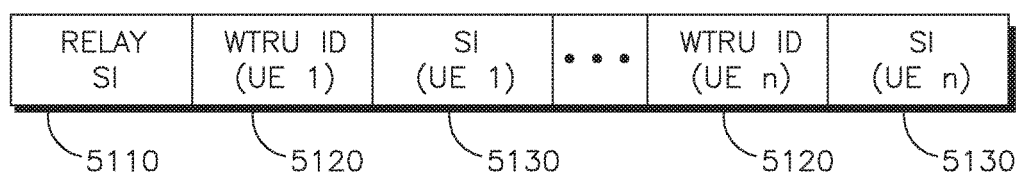
FIG. 51 is a diagram of an example frame structure for an SI.

FIG. 51 is a diagram of an example frame structure for an SI 5100. Referring to FIG. 51, the frame structure for SI reporting from the relay to the BS includes a relay SI 5110, at least one WTRU ID 5120, and at least one SI 5130.

Hierarchical Scheduling

In the hierarchical scheduling the BS assigns grants to the relays, which in turn, based on the grant received, the SIs received from the WTRUs, and some other QoS information related to the WTRUs, assigns grants to the different WTRUs associated to that relay. Note that in this case control of serving grant allocation to the WTRUs is given to the relays.

In order to guarantee that the BS assigns enough grants to the relays, the relay needs to send a "combined SI," which contains the SI combined from all WTRUs.

Difference Between "Combined SI" and "Relay SI"

Note that the "combined SI" and the "relay SI" described above may be different because they serve different purposes.

The "relay SI" is used to reflect the capacity of the relay, so it contains information such as how full the relay buffer and the channel condition between the relay and BS. The BS then uses that information in conjunction with the WTRUs' SIs.

The "combined SI" contains information related to the buffer and channel condition for all WTRUs combined, so that the BS can allocate enough resources to the BS, which will then divide that among the WTRUs. In that case the BS uses the "combined SI" (and not the WTRUs SIs) to assign the Serving Grant to the relay.

Note that for the hierarchical scheduling, the relay could also send the "relay SI" information to the BS, in which case the BS could use both the "combined SI" and the "relay SI" to perform grant allocation to the relay.

In other words, the "relay SI" contains information necessary to control the communication between the relay and the BS (used for both the centralized and hierarchical case). The "combined SI" simply replaces the WTRUs' SIs by combining information for all WTRUs in one SI (used for hierarchical case only).

Example 2: WTRU Communicates with Relay and BS at the Same Time

For the case where the WTRU is communicating with both relay and BS, the scheme might become more complicated. The WTRU may receive the grant directly from the BS or from both BS and relay. Using the same grant for both links (WTRU-relay and WTRU-BS) might not be optimal since the channel conditions are different. One option would be to use a combined approach where the WTRU receives grants for both relay and BS, and it uses the lesser received value. Another option would be for the WTRU to send an SI that reflects the most conservative case (lower power headroom). However, this might not be optimal because it might limit the throughput, since the grant defines the ETFC to be used (amount of data to be transmitted).

Centralized Scheduling

One proposed approach would be for the BS to assign the grant based on combined information between WTRU and relay. Modified SI information may be provided by the WTRU, which reflects UPH related to the channel between WTRU and the BS and between the WTRU and the relay. The information may be provided by the relay with indication of the channel conditions, such as interference level and received power, between the relay and its associated WTRUs. Knowledge of the conditions of the link between the relay and the BS may be provided.

Hierarchical Scheduling

Another approach would be for the BS to assign grants to the WTRUs for communication between WTRU and BS and to the relays, which in turn assigns grants to the WTRUs for communication between the WTRU and relays. The WTRU would then have to handle grants from both BS and relay and somehow coordinate them. The method for coordination will depend on whether or not the WTRU should use the same or different ETFCs for each link (WTRU-BS and WTRU-relay). If different ETFCs can be used, then the WTRU can apply the grants independently. Otherwise, the WTRU needs to merge the grants, and the weakest link will dominate the transmission. This issue is discussed below.

Choosing Between Example 1 and Example 2

In the case where different ETFCs may be used to transmit data between the WTRU and the BS and the WTRU and the relay, then different grants can be applied to each link. In the case where the same ETFC needs to be used to transmit data from the WTRU to BS and from the WTRU to relay, then the same grant should be applied to both links. This will limit the throughput performance. If the link between the WTRU and the relay is much better than the link between the WTRU and the BS, and if the grant will be limited due to the poor communication between the WTRU and the BS, it might be better to choose to have the WTRU communicating only through the relay, instead of through both relay and BS. In this case the WTRU can take advantage of the good channel condition between the WTRU and relay and maximize its throughput. This is shown in Example 1 discussed above.

LTE and Cooperative Networks

In LTE, channel allocations in the uplink are also done via usage of grants. Even though the specific details of the procedure for grant allocation are still evolving in the standards, it becomes clear that the issues and proposed approaches presented in this paper would also be important and applicable to LTE, with the appropriate modifications required for channel allocations in LTE. Note also that, in LTE, the uplink transmissions are always sent in a shared channel (with the usage of grant allocations), in which case the issues described in this paper become even more important for LTE operation in a cooperative network.

Figure 52:
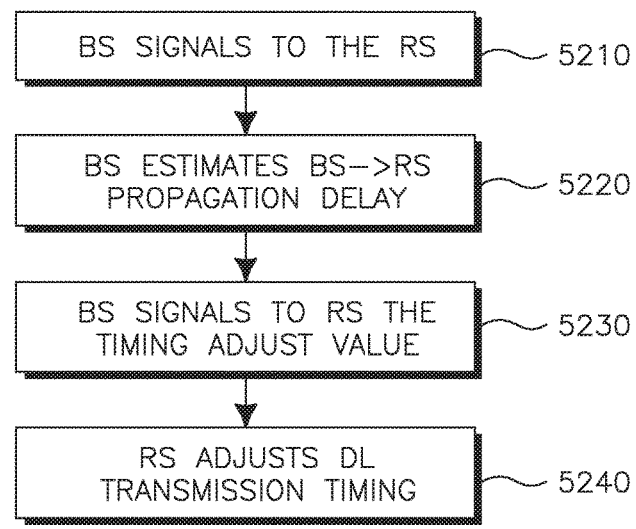
FIG. 52 is a diagram of an example synchronization of the BS and RS DL transmissions to the WTRU using a timing adjust procedure.

FIG. 52 is a diagram of an example synchronization of the BS and RS DL transmissions to the WTRU using timing adjust procedure 5200. Referring to FIG. 52, the BS signals to the RS 5210 and estimates the BS→RS propagation delay 5220. The BS then signals the timing adjust value to the RS 5530. The RS may then adjust the DL transmission timing 5240.

Although the features and elements of the present disclosure are described in the embodiments in particular combinations, each feature or element can be used alone without the other features and elements of the embodiments or in various combinations with or without other features and elements of the present disclosure. The methods or flow charts provided in the present disclosure may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, application specific integrated circuits (ASICs), field programmable gate arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless device comprising:
a transceiver; and
a processor, the transceiver and the processor configured to transmit to wireless transmit/receive units (WTRUs) in a centralized mode and an autonomous mode, the wireless device being configured with a first radio network terminal identifier (RNTI) for base station scheduling of transmissions from the wireless device to WTRUs in the centralized mode and a second RNTI for base station scheduling of transmissions to the base station, the first and second RNTIs being different, the wireless device being pre-configured with a pool of radio resources allocated for any of a plurality of wireless devices, including the wireless device, to use for transmission to groups of WTRUs in the autonomous mode,
the processor and the transceiver configured, on a condition that the wireless device is to be scheduled by the base station, to receive scheduling information for transmission to a WTRU having the first RNTI and to transmit to the WTRU having the first RNTI in response to the received scheduling information,
the processor and the transceiver are further configured, on a condition that the wireless device is to use the pool of radio resources for transmission to groups of WTRUs, to select a resource from the pre-configured pool and transmit to a WTRU of a group of WTRUs without being scheduled by the base station using the selected resource.

2. The wireless device of claim 1, wherein the processor is further configured to have the transceiver transmit information to the base station indicating buffer status associated with a group of WTRUs.

3. The wireless device of claim 2, wherein the processor is further configured to have the transceiver transmit information to the base station indicating buffer status associated with the wireless device that is different than the buffer status associated with the group of WTRUs.

4. The wireless device of claim 1, wherein the processor is further configured to have the transceiver transmit channel quality indicators to the base station.

5. The wireless device of claim 1, wherein the wireless device is a relay station.

6. The wireless device of claim 1, wherein the wireless device is a super WTRU.

7. A method implemented by a wireless device, the method comprising:
transmitting, by the wireless device, to wireless transmit/receive units (WTRUs) in a centralized mode and an autonomous mode, the wireless device being configured with a first radio network terminal identifier (RNTI) for base station scheduling of transmissions from the wireless device to WTRUs in the centralized mode and a second RNTI for base station scheduling of transmissions to the base station, the first and second RNTIs being different, the wireless device being pre-configured with a pool of radio resources allocated for any of a plurality of wireless devices, including the wireless device, to use for transmission to groups of WTRUs in an autonomous mode;
on a condition that the wireless device is to be scheduled by the base station, receiving, by the wireless device, scheduling information for transmission to a WTRU having the first RNTI and transmitting to the WTRU having the first RNTI in response to the received scheduling information; and
on a condition that the wireless device is to use the pool of radio resources for transmission to groups of WTRUs, selecting a resource from the pre-configured pool and transmitting to a WTRU of a group of WTRUs without being scheduled by the base station using the selected resource.

8. The method of claim 7, further comprising transmitting, by the wireless device, information to the base station indicating buffer status associated with a group of WTRUs.

9. The method of claim 8, further comprising transmitting information to the base station indicating buffer status associated with the wireless device that is different than the buffer status associated with the group of WTRUs.

10. The method of claim 7, further comprising transmitting channel quality indicators to the base station.

11. The method of claim 7, wherein the wireless device is a relay station.

12. The method of claim 7, wherein the wireless device is a super WTRU.

* * * * *